United States Patent
Sebastian et al.

(10) Patent No.: US 8,489,673 B2
(45) Date of Patent: *Jul. 16, 2013

(54) CONTENT SET BASED PRE-POSITIONING

(75) Inventors: William B. Sebastian, Quincy, MA (US); Peter Lepeska, Boston, MA (US)

(73) Assignee: Viasat, Inc., Carlsbad, CA (US)

(*) Notice: Subject to any disclaimer, the term of this patent is extended or adjusted under 35 U.S.C. 154(b) by 675 days.

This patent is subject to a terminal disclaimer.

(21) Appl. No.: 12/685,920

(22) Filed: Jan. 12, 2010

(65) Prior Publication Data

US 2010/0179987 A1 Jul. 15, 2010

Related U.S. Application Data

(60) Provisional application No. 61/144,363, filed on Jan. 13, 2009, provisional application No. 61/170,359, filed on Apr. 17, 2009.

(51) Int. Cl.
*G06F 15/16* (2006.01)

(52) U.S. Cl.
USPC ............................. 709/203; 709/223; 709/224

(58) Field of Classification Search
USPC ........................................ 709/203, 223, 224
See application file for complete search history.

(56) References Cited

U.S. PATENT DOCUMENTS

| | | | | |
|---|---|---|---|---|
| 5,905,981 | A * | 5/1999 | Lawler | 715/201 |
| 6,178,461 | B1 * | 1/2001 | Chan et al. | 709/247 |
| 6,182,133 | B1 * | 1/2001 | Horvitz | 709/223 |
| 7,130,890 | B1 * | 10/2006 | Kumar et al. | 709/218 |
| 7,340,510 | B1 | 3/2008 | Liskov et al. | |
| 7,509,667 | B1 * | 3/2009 | Cook | 725/87 |
| 7,680,897 | B1 * | 3/2010 | Carter et al. | 709/217 |
| 7,836,177 | B2 * | 11/2010 | Kasriel et al. | 709/224 |
| 8,230,461 | B1 * | 7/2012 | Ledermann et al. | 725/46 |
| 8,284,773 | B1 * | 10/2012 | Woleben et al. | 370/390 |
| 2001/0043600 | A1 * | 11/2001 | Chatterjee et al. | 370/390 |
| 2002/0154887 | A1 * | 10/2002 | Lu | 386/35 |
| 2005/0010870 | A1 | 1/2005 | Gu et al. | |

(Continued)

FOREIGN PATENT DOCUMENTS

| | | |
|---|---|---|
| WO | WO 01/61886 A2 | 8/2001 |
| WO | WO 01/84777 A2 | 11/2001 |
| WO | WO 02/41527 A1 | 5/2002 |
| WO | WO 2007/051079 A2 | 5/2007 |

OTHER PUBLICATIONS

Frantzeskou et al., "Effective Identification of Source Code Authors Using Byte-Level Information," ACM, New York, USA, May 20-28, 2006, pp. 893-896, XP040040085 Shanghai, China.

(Continued)

*Primary Examiner* — Waseem Ashraf
(74) *Attorney, Agent, or Firm* — Marsh Fischmann & Breyfogle LLP; Daniel J. Sherwinter

(57) ABSTRACT

Methods, apparatuses, and systems are provided for improving utilization of the communications system through various "deltacasting" techniques for handling content sets (e.g., feeds or websites). In some embodiments, within a client-server context, content sets are anticipatorily pre-positioned in client dictionaries using multicasting techniques to share forward link capacity. Pre-positioning determinations are made according to byte-level data, set-level metadata, and/or user preferences. In some embodiments, when locally stored information from the content sets is requested by a user, deltacasting techniques are used to generate fingerprints for use in identifying and exploiting multicasting and/or other opportunities for increased utilization of links of the communications system.

18 Claims, 14 Drawing Sheets

U.S. PATENT DOCUMENTS

| | | | |
|---|---|---|---|
| 2006/0253444 A1 | 11/2006 | O'Toole et al. | |
| 2006/0277257 A1* | 12/2006 | Kromann et al. | 709/206 |
| 2006/0288072 A1* | 12/2006 | Knapp et al. | 709/203 |
| 2007/0111713 A1* | 5/2007 | Silverbrook et al. | 455/414.1 |
| 2007/0220303 A1* | 9/2007 | Kimura et al. | 714/4 |
| 2007/0256021 A1* | 11/2007 | Prager et al. | 715/744 |
| 2007/0288518 A1* | 12/2007 | Crigler et al. | 707/104.1 |
| 2008/0005086 A1* | 1/2008 | Moore | 707/3 |
| 2008/0144713 A1* | 6/2008 | Kimmich et al. | 375/240.02 |
| 2008/0155614 A1* | 6/2008 | Cooper et al. | 725/91 |
| 2008/0175239 A1* | 7/2008 | Sistanizadeh et al. | 370/390 |
| 2008/0205396 A1 | 8/2008 | Dakshinamoorthy et al. | |
| 2008/0256138 A1* | 10/2008 | Sim-Tang | 707/202 |
| 2008/0263130 A1* | 10/2008 | Michalowitz et al. | 709/202 |
| 2009/0049469 A1* | 2/2009 | Small et al. | 725/35 |
| 2009/0055471 A1* | 2/2009 | Kozat et al. | 709/203 |
| 2009/0055862 A1* | 2/2009 | Knoller et al. | 725/34 |
| 2009/0060086 A1* | 3/2009 | Kimmich et al. | 375/295 |
| 2009/0168795 A1* | 7/2009 | Segel | 370/429 |
| 2010/0058430 A1* | 3/2010 | Jones et al. | 725/151 |
| 2010/0083322 A1* | 4/2010 | Rouse | 725/93 |
| 2010/0177642 A1 | 7/2010 | Sebastian et al. | |
| 2010/0179984 A1 | 7/2010 | Sebastian | |
| 2010/0179986 A1 | 7/2010 | Sebastian et al. | |
| 2010/0180046 A1 | 7/2010 | Sebastian et al. | |
| 2010/0185730 A1 | 7/2010 | Sebastian | |
| 2012/0060121 A1* | 3/2012 | Goldberg et al. | 715/823 |

OTHER PUBLICATIONS

International Search Report for PCT Application No. PCT/US2010/020897, mailed Aug. 16, 2010.
International Search Report for PCT Application No. PCT/US2010/020940, mailed Sep. 22, 2010.
U.S. Appl. No. 12/651,909, filed Jan. 4, 2010.
U.S. Appl. No. 12/477,814, filed Jun. 3, 2010.
U.S. Appl. No. 12/685,729, filed Jan. 12, 2010.
U.S. Appl. No. 12/684,648, filed Jan. 8, 2010.
U.S. Appl. No. 12/684,726, filed Jan. 8, 2010.
U.S. Appl. No. 12/686,744, filed Jan. 13, 2010.

* cited by examiner

CONTENT SET BASED PRE-POSITIONING

CROSS-REFERENCES

This application claims the benefit of and is a non-provisional of co-pending U.S. Provisional Application Ser. No. 61/144,363, filed on Jan. 13, 2009, titled "SATELLITE MULTICASTING"; and co-pending U.S. Provisional Application Ser. No. 61/170,359, filed on Apr. 17, 2009, titled "DISTRIBUTED BASE STATION SATELLITE TOPOLOGY," both of which are hereby expressly incorporated by reference in their entirety for all purposes.

This application is also related to U.S. patent application Ser. No. 12/651,909, titled "DELTACASTING," filed on Jan. 4, 2010; and U.S. application Ser. No. 12/685,729, filed on Jan. 12, 2010, titled "CONTENT SET BASED DELTACASTING," both of which are hereby expressly incorporated by reference in their entirety for all purposes.

BACKGROUND

This disclosure relates in general to communications and, but not by way of limitation, to multicast optimization over links of a communications system.

In some topologies of communications systems, groups of users share some or all of the forward link. For example, in some satellite communications systems, users share spot beams for communicating with a service provider (e.g., via a base station and/or gateway). Communication services provided to the users over the shared forward link may be affected by a number of factors, including bandwidth and other link conditions. For example, because all users sharing the forward link also share the link's bandwidth, any unnecessary redundancies in communications may cause sub-optimal utilization of the forward link.

As such, it may be desirable to optimize utilization of the shared forward link by minimizing redundancies.

SUMMARY

Among other things, methods, systems, devices, and software are provided for improving utilization of the communications system through various "deltacasting" techniques for handling content sets (e.g., feeds or websites). In some embodiments, within a client-server context, content sets are anticipatorily pre-positioned in client dictionaries using multicasting techniques to share forward link capacity. Pre-positioning determinations are made according to byte-level data, set-level metadata, and/or user preferences. In some embodiments, when locally stored information from the content sets is requested by a user, deltacasting techniques are used to generate fingerprints for use in identifying and exploiting multicasting and/or other opportunities for increased utilization of links of the communications system.

In one set of embodiments, a method is provided for pre-positioning content over a communications system having a communications path between a server side of the communications system and a plurality of clients, the communications path having a shared forward link over which bandwidth resources are shared during a multicast communication. The method includes: intercepting a data block at the server side of the communications system, the data block including a header portion and a content portion and being communicated as part of a content set over the communications path, the content set including a plurality of content objects and being identified by a content set identifier, the content set identifier being associated with a set-level profile characterizing the content set; associating the data block with the content set identifier; generating a fingerprint using byte-level information comprised by the content portion of the data block; generating an anticipatory content value (ACV) metric at least partially according to the set-level profile associated with the content set identifier; determining whether to anticipatorily pre-position the content set over the communications path according to the ACV metric; and when it is determined to anticipatorily pre-position the content set over the communications path according to the ACV metric, determining whether to multicast the data block over the communications path to a client according to the fingerprint. In certain embodiments, generating the ACV metric comprises estimating a future compression gain achieved by pre-positioning the content set in anticipation of future requests for the content set, the future compression gain being estimated according to the set-level profile associated with the content set identifier, such that the ACV metric is functionally related to the future compression gain.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
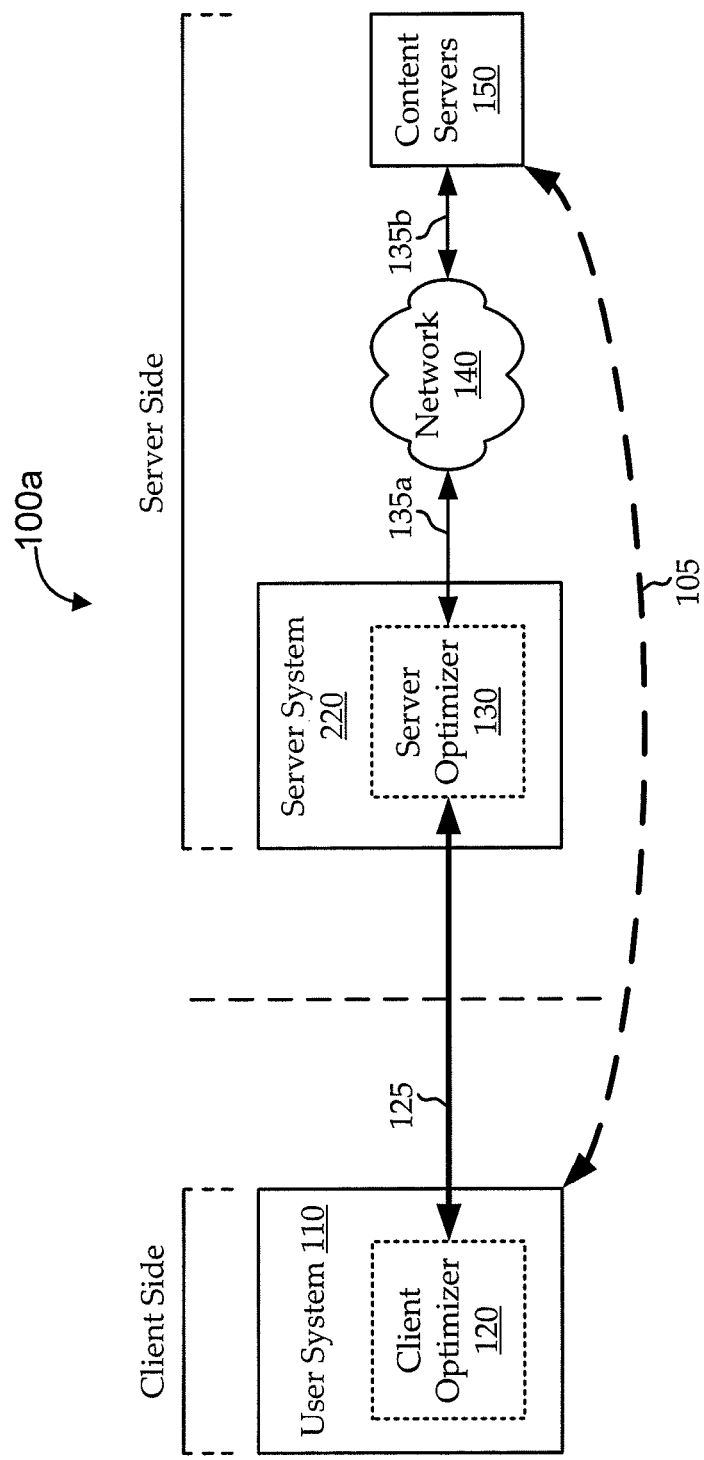
FIG. 1A shows a simplified block diagram of one embodiment of a communications system for use with various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments are described herein for improving utilization of the satellite communications system through various "deltacasting" techniques for handling content sets. As used herein, "content sets" include any grouping of content intended to be called as a group and characterizable as a group by set-level metadata. In one example, a content set is an item in a really simple syndication (RSS) feed, characterized by channel metadata and/or item metadata. In another example, a content set is a web page, characterized by certain HTTP metadata. When a user requests the content set (e.g., by entering a uniform resource locator (URL), clicking on a link in an RSS reader, etc.), a set of content files is invoked.

For example, when a link to a "video" is selected in an RSS reader, the link may, in fact, cause a web page to build using a number of calls to one or more content sources. The resulting web page may include the requested "video" and other content, including a banner advertisement, a logo image, etc. As such, the "video" link is actually a link to a content set characterized at least partially by metadata associated with the link at the set level (e.g., as opposed to the object-level metadata associated with each content object file called as part of the content set).

Various embodiments exploit content sets to provide set-level handling functionality in the context of otherwise substantially transparent client-server transactions. In effect, embodiments provide functionality of a transparent, man-in-the-middle optimizer (e.g., a protocol-agnostic accelerator) with a certain level of content awareness for additional functionality. For example, content sets are multicast (e.g., anticipatorily pre-positioned in a local dictionary) to end users of the communications system and are handled (e.g., at the client side) at the content set level, according to set-level metadata and/or user preferences. In some embodiments, when locally stored information from the content sets is requested by a user, deltacasting techniques are used to generate fingerprints for use in identifying and exploiting multicasting and/or other opportunities for increased utilization of links of the communications system.

Referring first to FIG. 1A, a simplified block diagram is shown of one embodiment of a communications system 100a for use with various embodiments. The communications system 100a facilitates communications between a user system 110 and a content server 150 via a client optimizer 120, a server optimizer 130, and a network 140. The client optimizer 120 and the server optimizer 130 are configured to effectively provide an optimizer tunnel 105 between the user system 110 and the content server 150, including providing certain communications functionality.

Embodiments of the optimizer (e.g., the server optimizer 130, the client optimizer 120, and the resulting optimizer tunnel 105) can be implemented in a number of ways without departing from the scope of the invention. In some embodiments, the optimizer is implemented as a proxy, such that the server optimizer 130 is a proxy server, the client optimizer 120 is a proxy client, and the optimizer tunnel 105 is a proxy tunnel. For example, a transparent intercept proxy can be used to intercept traffic in a way that is substantially transparent to users at the client-side of the proxy tunnel. In other embodiments, the optimizer is implemented as an in-line optimizer. For example, the client optimizer 120 is implemented within a user terminal and the server optimizer 130 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 130 are implemented in the Internet cloud (e.g., on commercial network leased server space). Embodiments of the client optimizer 120 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 130, where it is "intercepted" by being buffered for analysis and processing. For example, the buffering may be used to slow and accumulate traffic for fingerprint generation and analysis, as described more fully below. Notably, certain embodiments described as using an optimizer component (e.g., the server optimizer 130) to intercept the traffic may actually be implemented by having a different component intercept the traffic, from which the optimizer component may receive the intercepted traffic for processing.

Embodiments of the user system 110 may include any component or components for providing a user with network interactivity. For example, the user system 110 may include any type of computational device, network interface device, communications device, or other device for communicating data to and from the user. Typically, the communications system 100a facilitates communications between multiple user systems 110 and a variety of content servers 150 over one or more networks 140 (only one of each is shown in FIG. 1A for the sake of clarity). The content servers 150 are in communication with the server optimizer 130 via one or more networks 140. The network 140 may be any type of network 140 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network 140 supporting data communication between devices described herein, in different embodiments. The network 140 may also include both wired and wireless connections, including optical links.

As used herein, "content servers" is intended broadly to include any source of content in which the users may be interested. For example, a content server 150 may provide website content, television content, file sharing, multimedia serving, voice-over-Internet-protocol (VoIP) handling, and/or any other useful content. It is worth noting that, in some embodiments, the content servers 150 are in direct communication with the server optimizer 130 (e.g., not through the network 140). For example, the server optimizer 130 may be located in a gateway that includes a content or application server. As such, discussions of embodiments herein with respect to communications with content servers 150 over the network 140 are intended only to be illustrative, and should not be construed as limiting.

In some embodiments, when the user system 110 communicates with the content server 150, the server optimizer 130 intercepts the communications for one or more purposes. As described below, the server optimizer 130 may be part of a server system 220 that includes components for server-side communications (e.g., base stations, gateways, satellite modem termination systems (SMTSs), digital subscriber line access multiplexers (DSLAMs), etc., as described below with reference to FIG. 2). The server optimizer 130 may act as a transparent and/or intercepting proxy. For example, the client optimizer 120 is in communication with the server optimizer 130 over a client-server communication link 125, and the server optimizer 130 is in communication with the content server 150 over a content network link 135. The server optimizer 130 may act as a transparent man-in-the-middle to intercept the data as it passes between the client-server communication link 125 and the content network link 135. Some purposes of the interception may include filtering, caching, parsing, and/or otherwise processing the requests and responses. For example, when the user system 110 requests a web object from a content server 150, the server optimizer 130 may intercept and parse the request to implement prefetching and/or other types of functionality.

As described more fully below, embodiments of the server optimizer 130 use various techniques (e.g., dictionary coding) to identify redundancies between incoming data and data previously sent across the links of the communication system 100*a* (e.g., the client-server communication link 125 and the content network link 135). In particular, various techniques (e.g. delta coding, wide dictionary coding, etc.) may allow identification of redundancies in byte sequences traversing the links even when a large history is maintained. These techniques may be used to identify and exploit opportunities for multicasting to increase utilization of the communications links. Use of these techniques to identify and exploit these multicast opportunities is referred to herein as "deltacasting."

It will be appreciated that "delta coding," "dictionary coding," "dictionary," "deltacasting," and other similar terms and phrases are intended to be broadly construed to include use of any type of dictionary-like structure for optimization. Embodiments of the dictionary include chunks of content data (e.g., implemented as delta dictionaries, wide dictionaries, byte caches, and/or other types of dictionary structures). For example, when content data is stored in the dictionary, some or all of the blocks of data defining the content are stored in the dictionary in an unordered, but indexed way. As such, content may not be directly accessible from the dictionary; rather, the set of indexes may be needed to recreate the content from the set of unordered blocks.

It is worth noting that data may be communicated over a communications system 100*a* using one or more protocols that define, among other things, the format for the datagrams (e.g., packets, frames, etc.). Each datagram may typically include a header portion and a content portion. As used herein, the term "header" is intended broadly to include any portions of the datagram other than those used to communicate the actual content (e.g., file data), and is not intended to be limited to any particular datagram format. For example, an Internet protocol (IP) packet may include a header at the beginning of each packet, while other types of datagrams may provide header-types of information in other ways (e.g., using preambles, post-ambles, mid-ambles, spread-ambles, sub-frames, separate signaling or control data, etc.). These header portions may include information, such as source address, destination address, priority, packet length, coding information, modulation information, etc. Of course, those of skill in the art will appreciate that similar categories of header-portion and content-portion information may be found within datagrams of other protocol formats (e.g., HTTP, FTP, etc.).

Much can be gleaned from the header portions of data. For example, the header portion may include metadata or other information about the content portion that can be used to help characterize the content portion of the data. In fact, this technique may be used by certain types of content delivery systems, like a video-on-demand (VOD) system. A VOD system may include an application running at a VOD content server and/or at the end viewer's customer premises equipment (CPE) (e.g., on a set-top box) for parsing and translating proprietary metadata from packet headers of user requests. Notably, while use of the metadata may provide relatively straightforward knowledge of the content being requested, using proprietary tags in this way may require having access to (e.g., and running an application on) the content server.

For example, a parsed URL may look as follows: "http://www.VOD.com/movieplayer?70AX05nkd4868PR1D5g." The illustrative URL includes a string of characters generated as part of a proprietary application function, and may be decoded by the VOD server application to identify information, including the particular download requested, an identifier for the session, user or account data, shopping cart data, client playback capabilities, etc. As such, another request for the same VOD movie, even from the same content server, may have different URLs (e.g., different request headers). While the VOD application server may be able to understand the requests as being for the same movie (e.g., the VOD applications server will understand which bytes specify the content), a transparent intercept proxy, like that of embodiments of the server optimizer 130, may not be able to determine this from the metadata alone.

Embodiments of the server optimizer 130 generate fingerprints (e.g., fingerprints, digests, signatures, hash functions, etc.) from the content portion of the data traversing the communication links. The server optimizer 130 intercepts and analyzes the byte-level data of the content portion in a way that is substantially transparent to the user. Embodiments of the fingerprints are generated so as to be useful in identifying redundancies between the incoming intercepted data and previously processed data. For example, hashing functions are applied to traffic, after being intercepted by the server optimizer 130, for use as identifiers (e.g., "weak" identifiers) that are at least strong enough to identify candidate matches with blocks stored in a dictionary. Some embodiments of the fingerprints are generated so as to be useful further as strong identifiers for representing substantially identical matching blocks stored in a dictionary.

A number of difficulties arise from implementing this type of optimizer to use fingerprints (e.g., rather than metadata or other header information). In one example, as described above, header data (e.g., particularly proprietary metadata) may be used to make a number of determinations (e.g., precisely what object file is being requested) that may be difficult or impossible to make from the content data alone. In another example, proprietary data or limited content environments may allow certain assumptions to be made. For example, when someone requests a VOD movie, the server may know exactly what bytes are being requested (e.g., whatever bytes are associated with that particular movie file on the VOD server), how large the file is, that the viewer is likely to watch the movie sequentially, where the movie is stored, etc. However, by using the content portion of the data to generate fingerprints, embodiments of the server optimizer 130 are relatively agnostic to the content being analyzed, which may provide certain functionality even where the server optimizer 130 has little or no access to proprietary metadata and/or other header information.

In some embodiments, for example, the server optimizer 130 generates fingerprints of data being received over the content network link 135 in response to various requests from different users on a shared spot beam of a satellite communications system (e.g., where the requests are fulfilled by the server optimizer 130 over the client-server link 125 of the communications system 100a). The server optimizer 130 determines from the fingerprints that multiple users are requesting the same content at substantially the same time. In response, the server optimizer 130 creates a multicast service flow (e.g., on the client-server link 125) over which it multicasts the requested data to all the requesting users, thereby saving bandwidth relative to unicasting multiple copies of the content to the multiple users.

It is worth noting that embodiments of the client-server communication link 125 (e.g., between the client optimizer 120 and the server optimizer 130) and the content network link 135 (e.g., between the server optimizer 130 and the content servers 150 via the networks 140) can be implemented as various types of links have different and/or changing link characteristics, including, for example, differences in bandwidth, latency, cost per bit, etc. For example, while certain embodiments are described in the context of a satellite communications system, where the client-server communication link 125 includes at least one satellite link, other topologies and link types are possible.

Figure 1B:
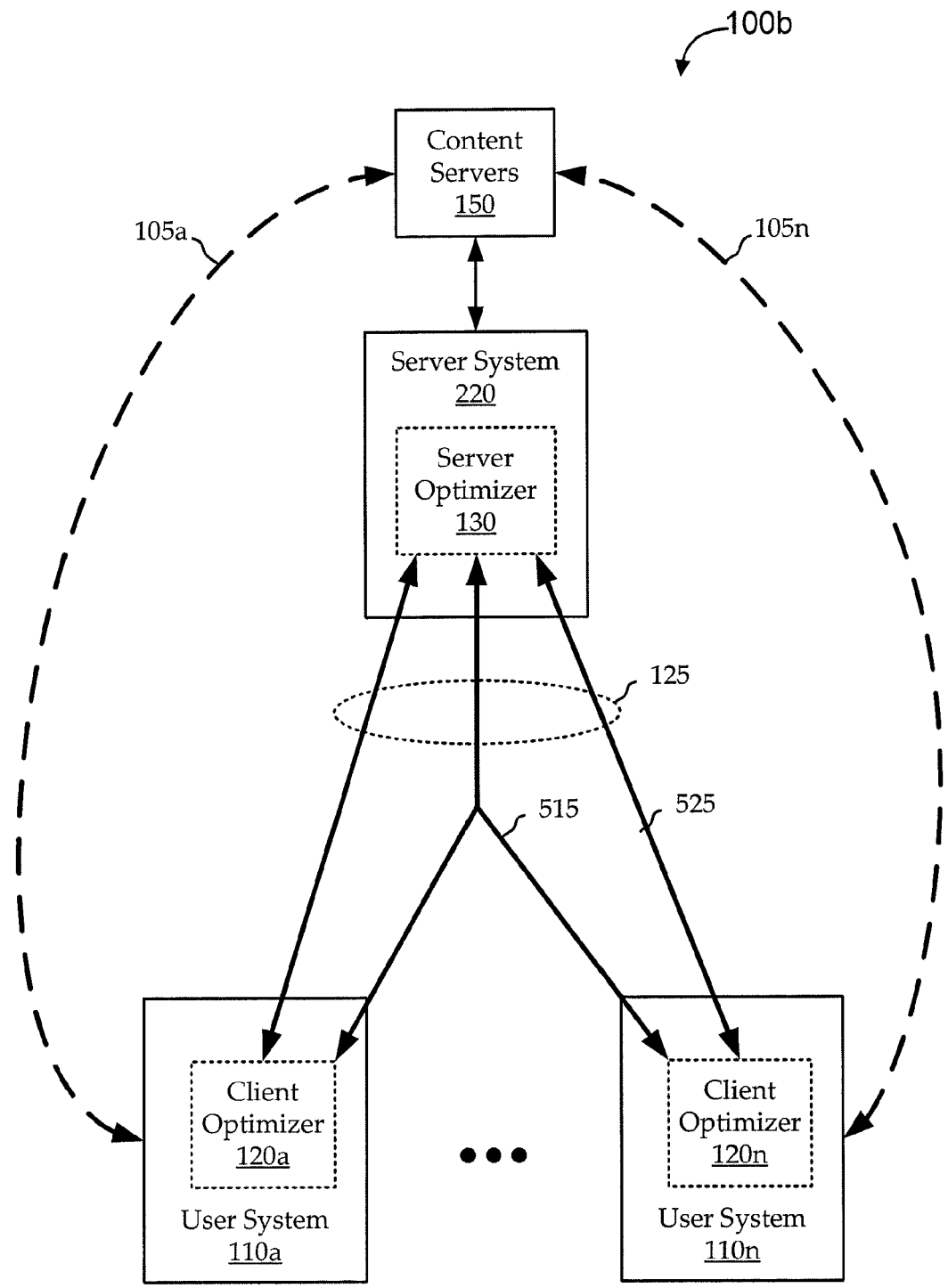
FIG. 1B shows a simplified block diagram of another embodiment of a communications system having multiple optimizer tunnels for use with various embodiments.

While the communications system 100a illustrated in FIG. 1A shows only one optimizer tunnel 105 between one server system 220 and one user system 110, embodiments typically operate in the context of, and take advantage of, multiple optimizer tunnels 105. FIG. 1B shows a simplified block diagram of another embodiment of a communications system 100b having multiple optimizer tunnels 105 for use with various embodiments. The communications system 100b facilitates communications between a server system 220 and multiple user systems 110, via a respective server optimizer 130 and multiple client optimizers 120. The client optimizers 120 and the server optimizer 130 are configured to effectively provide tunnels 105 between the user systems 110 and content servers 150.

A client-server communication link 125 between the server optimizer 130 and the client optimizers 120 supports one or more unicast service flows 525 and one or more multicast service flows 515 for supporting unicast and multicast traffic, respectively. In one embodiment, the client-server communication link 125 includes a satellite communications link. It will be appreciated that satellites may effectively broadcast all their downstream traffic to all receivers that are tuned to a particular carrier, beam, etc. As such, unicasting or multicasting to one or more user systems 110 may, in fact, involve broadcasting the data over the satellite link and also broadcasting control data to direct receivers to either accept or ignore relevant portions of the broadcast data. Notably, while some system resources may be expended in setting up a multicast service flow 515 and in related logistics, it "costs" the satellite communications system substantially the same bandwidth resources to send a packet to one user system 110 or to all user systems 110 (e.g., on a particular spot beam).

Similarly, in another embodiment, the client-server communication link 125 includes a cable communications link. For example, a cable company may run a cable line to a neighborhood aggregator, from which individual coaxial lines communicate last mile traffic to individual households. Each individual coaxial cable may carry all the traffic for the entire neighborhood, even where some of that traffic is destined only for particular households. As in the satellite embodiment described above, since all the cable subscriber households in the same neighborhood effectively receive all the traffic, bandwidth resources can be shared by multicasting traffic, where appropriate. Of course, satellite and cable networks are only two illustrative embodiments of client-server communication links 125. Embodiments of the client-server communication link 125 can include any type of communications link that has limited bandwidth resources, where the bandwidth resources can be at least partially shared through multicasting.

Figure 2:
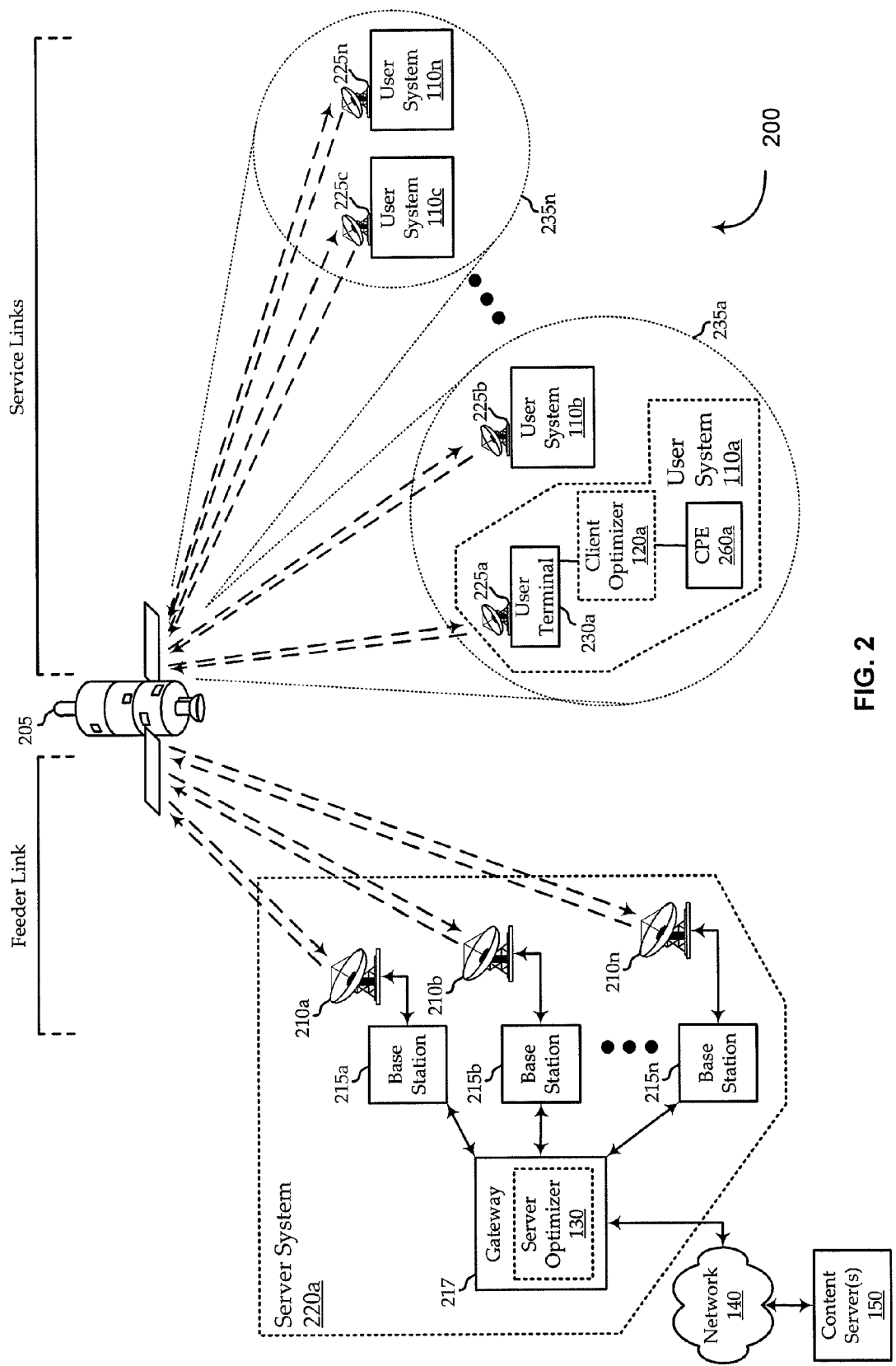
FIG. 2 shows a block diagram of an embodiment of a satellite communications system having a server system in communication with multiple user systems via a satellite over multiple spot beams, according to various embodiments.

It will now be appreciated that embodiments of the client-server communication link 125, and the resulting optimizer tunnels 105, effectively provide transparent acceleration functionality to the user systems 110. This functionality will be described in more detail with respect to illustrative systems in FIGS. 2-5. FIG. 2 shows a block diagram of an embodiment of a satellite communications system 200 having a server system 220 in communication with multiple user systems 110 via a satellite 205 over multiple spot beams 235, according to various embodiments. The server system 220 may include any server components, including base stations 215, gateways 217, etc. A base station 215 is sometimes referred to as a hub or ground station. In certain embodiments, as described below, the base station 215 has functionality that is the same or different from a gateway 217. For example, as illustrated, a gateway 217 provides an interface between the network 140 and the satellite 205 via a number of base stations 215. Various embodiments provide different types of interfaces between the gateways 217 and base stations 215. For example, the gateways 217 and base stations 215 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 220 are in communication with one or more content servers 150 via one or more networks 140.

In some embodiments, the gateway 217 is configured to implement relatively simple routing functions. For example, the gateway 217 may receive traffic from the network 140, determine which of the base stations 215 should receive the traffic, and route the traffic accordingly. In other embodiments, the gateway 217 performs relatively complex functions, including, for example, network security, accounting, content acceleration, trend analysis, signal processing and/or encoding, etc. In still other embodiments, the gateway 217 and the base stations 215 share some or all of the desired network functionality. For example, it may be desirable to perform certain functions in one location, perform other functions in a distributed manner, and perform still other functions in a redundant manner.

As traffic traverses the satellite communications system 200 in multiple directions, the gateway 217 may be configured to implement multi-directional communications functionality. For example, the gateway 217 may send data to and receive data from the base stations 215. Similarly, the gateway 217 may be configured to receive data and information directed to one or more user systems 110, and format the data and information for delivery to the respective destination device via the satellite 205; or receive signals from the satellite 205 (e.g., from one or more user systems 110) directed to a destination in the network 140, and process the received signals for transmission through the network 140.

In one embodiment, the satellite communications system 200 includes a number of gateways 217 distributed over a large geographic region. Each gateway 217 is in communication with the network 140 via a high-speed connection (e.g., a dedicated high-bandwidth fiber link). Each gateway 217 is also in communication with, and handles communications for, up to twenty base stations 215 (e.g., twenty feeder links). Each of the twenty base stations 215 is configured to service up to four user links by communicating content for those user links to the satellite 205 using an antenna 210.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Embodiments of the satellite 205 may be implemented as a geostationary satellite 205, a low earth orbit ("LEO") satellite 205, or aerial payloads not in orbit and held aloft by planes, blimps, weather balloons, etc. Other embodiments could have a number of satellites 205 instead of just one. In one embodiment, the satellite 205 is configured as a "bent pipe" satellite, wherein the satellite 205 may frequency convert the received carrier signals before retransmitting these signals to their destination, but otherwise perform little or no other processing on the contents of the signals. There could be a single carrier signal for each service spot beam 235 or multiple carriers in different embodiments. Similarly, single or multiple carrier signals could be used for feeder spot beams. A variety of physical layer transmission modulation and coding techniques may be used by the satellite 205 in accordance with certain embodiments, including those defined with the DVB-S2 standard. For other embodiments, a number of configurations are possible (e.g., using LEO satellites, mesh networks, star networks, etc.).

The satellite 205 may operate in a multi-beam mode, transmitting a number of spot beams 235, each directed at a different region of the earth. Each spot beam 235 may be associated with one of the user links, and used to communicate between the satellite 205 and a large group (e.g., thousands) of user systems 110 (e.g., user terminals 230 within the user systems 110). The signals transmitted from the satellite 205 may be received by one or more user systems 110, via a respective user antenna 225. In some embodiments, some or all of the user systems 110 include one or more user terminals 230 and one or more CPE devices 260. User terminals 230 may include modems, satellite modems, routers, or any other useful components for handling the user-side communications. Reference to "users" should be construed generally to include any user (e.g., subscriber, consumer, customer, etc.) of services provided over the satellite communications system 200 (e.g., by or through the server system 220).

In a given spot beam 235, some or all of the users (e.g., user systems 110) serviced by the spot beam 235 may be capable of receiving all the content traversing the spot beam 235 by virtue of the fact that the satellite communications system 200 employs wireless communications via various antennae (e.g., 210 and 225). However, some of the content may not be intended for receipt by certain customers. As such, the satellite communications system 200 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 230, send control information to user systems 110 to direct the user systems 110 to ignore or accept certain communications, etc. Each user system 110 may then be adapted to handle the received data accordingly. For example, content destined for a particular user system 110 may be passed on to its respective CPE 260, while content not destined for the user system 110 may be ignored. In some cases, the user system 110 stores information not destined for the associated CPE 260 for use if the information is later found to be useful in avoiding traffic over the satellite link, as described in more detail below.

In some embodiments, each user system 110 implements a client optimizer 120 that is in communication with a server optimizer 130 located in the server system 220 (e.g., in the gateway 217). The client optimizers 120 and server optimizer 130 may act to create a virtual tunnel between the user systems 110 and the content servers 150, as described with reference to FIG. 1A. In a topology, like the satellite communications system 200 shown in FIG. 2, vast amounts of traffic may traverse various portions of the satellite communications system 200 at any given time. As discussed above, at least some of the traffic traversing the network may be intercepted by the server optimizer 130 for further processing and for additional functionality. The functionality of the server optimizer 130 may also be assisted and/or exploited by other components of the server system 220 and the user systems 110. Some of this and other functionality of components of an illustrative server system 220 and an illustrative user system 110 are described with reference to various types of functional blocks in FIGS. 3 and 4, respectively.

Figure 3:
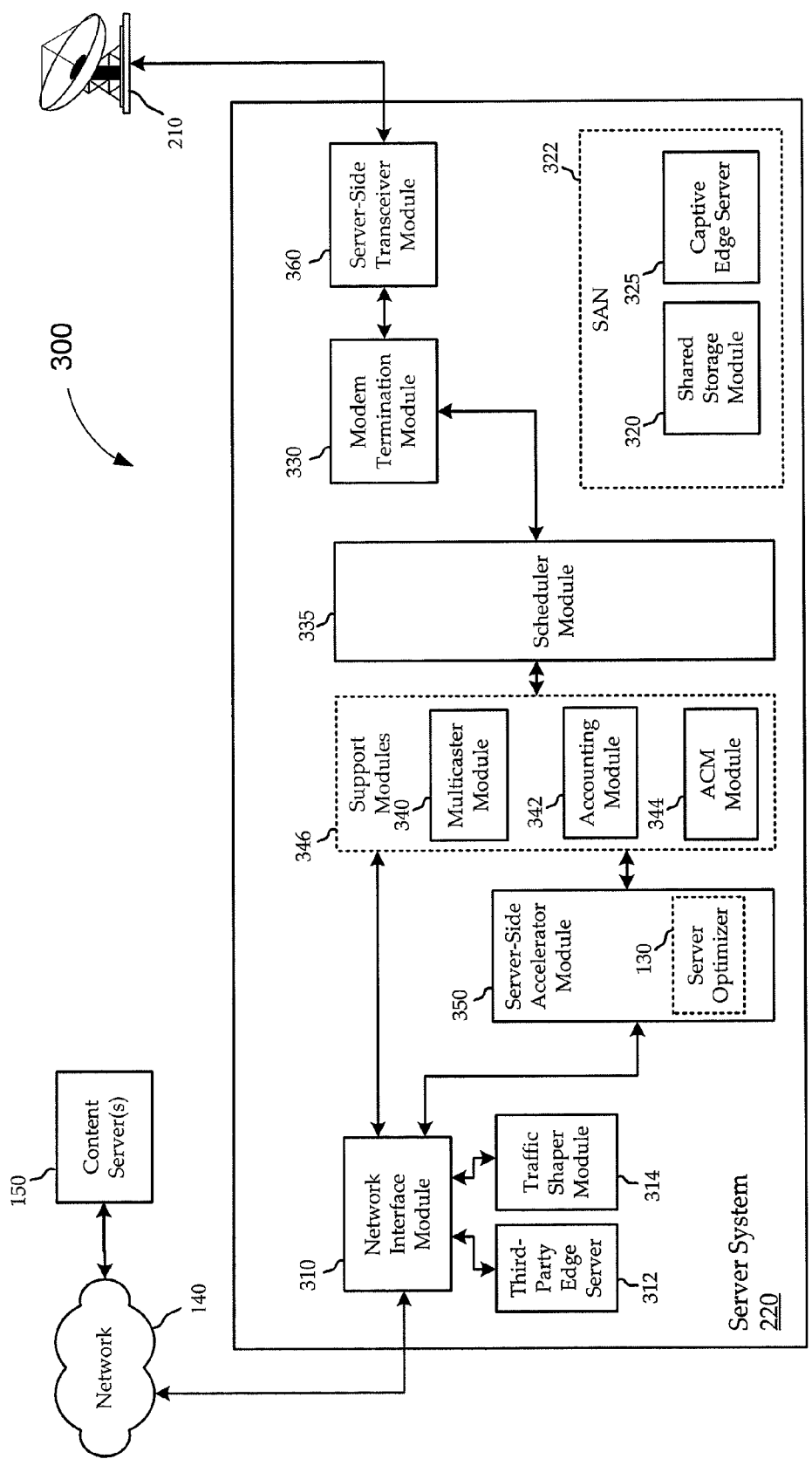
FIG. 3 shows a simplified block diagram illustrating an embodiment of a server system coupled between a network and an antenna, according to various embodiments.

FIG. 3 shows a simplified block diagram 300 illustrating an embodiment of a server system 220 coupled between a network 140 and an antenna 210, according to various embodiments. The server system 220 has a number of components, including a network interface module 310, a modem termination module 330, and a server-side transceiver module 360. Components of the server system 220 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

Embodiments of the server system 220 receive data from the network 140 (e.g., the network 140 of FIG. 1A), including data originating from one or more content servers 150 (e.g., or other types of servers, as discussed above) and destined for one or more users in a spot beam (e.g., at a user system 110 in a spot beam 235, as shown in FIG. 2). The data is received at the network interface module 310, which includes one or more components for interfacing with the network 140. For example, the network interface module 310 includes a network switch and a router.

In some embodiments, the network interface module 310 interfaces with other modules, including a third-party edge server 312 and/or a traffic shaper module 314. The third-party edge server 312 may be adapted to mirror content (e.g., implementing transparent mirroring, like would be performed in a point of presence ("POP") of a content delivery network ("CDN")) to the server system 220. For example, the third-party edge server 312 may facilitate contractual relationships between content providers and service providers to move content closer to users in a communications network (e.g., the satellite communications network 200 of FIG. 2). The traffic shaper module 314 controls traffic from the network 140 through the server system 220, for example, to help optimize performance of the communications system (e.g., by reducing latency, increasing effective bandwidth, etc.). In one embodiment, the traffic shaper module 314 delays packets in a traffic stream to conform to a predetermined traffic profile.

Traffic is passed from the network interface module 310 to one or more processing modules. In some embodiments, the processing modules include a server-side accelerator module 350, a scheduler module 335, and support modules 346. In some embodiments, all traffic from the network interface module 310 is passed to the server-side accelerator module 350 for handling, as described more fully below. In other embodiments, some or all of the traffic from the server-side accelerator module 350 is passed to the support modules 346. For example, in one embodiment, real-time types of data (e.g., User Datagram Protocol ("UDP") data traffic, like Internet-protocol television ("IPTV") programming) bypass the server-side accelerator module 350, while non-real-time types of data (e.g., Transmission Control Protocol ("TCP") data traffic, like web video) are routed through the server-side accelerator module 350 for processing. Embodiments of the server-side accelerator module 350 provide various types of application, WAN/LAN, and/or other acceleration functionality. In one embodiment, the server-side accelerator module 350 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the user system 110 (e.g., in the user terminal 230 and/or the CPE 260).

In some embodiments, the server-side accelerator module 350 is adapted to provide high payload compression. This allows faster transfer of the data and enhances the effective capacity of the network. The server-side accelerator module 350 can also implement protocol-specific methods to reduce the number of round trips needed to complete a transaction, such as by prefetching objects embedded in HTTP pages. In other embodiments, functionality of the server-side accelerator module 350 is closely integrated with the satellite link through other modules, including the support modules 346, the scheduler module 335, the modem termination module 330, etc., to reduce upload bandwidth requirements and/or to more efficiently schedule to the satellite link. For example, the link layer may be used to determine whether packets are successfully delivered, and those packets can be tied more closely with the content they supported through application layer information. In certain embodiments, these and/or other functions of the server-side accelerator module 350 are provided by a server optimizer 130 resident on (e.g., or in communication with) the server-side accelerator module 350.

In some embodiments, the server optimizer 130 is implemented with multiple servers. Each of the multiple servers may be configured to handle a portion of the traffic passing through the server-side accelerator module 350. It is worth noting that functionality of various embodiments described herein use data which, at times, may be processed across multiple servers. As such, one or more server management modules may be provided for processing (e.g., tracking, routing, partitioning, etc.) data across the multiple servers. For example, when one server within the server optimizer 130 receives a request from a user (e.g., from a user system 110 on a spot beam 235, as shown in FIG. 2), the server management module may process that request in the context of other requests received at other servers in the server optimizer 130. In one embodiment, coordination between servers is implemented in support of singular storage of data. For example, it may be desirable to avoid caching the same byte sequence twice in two servers that are in communication with each other (e.g., where both servers are part of a storage area network 322 ("SAN") in the server system 220). In another embodiment, servers are configured to communicate to facilitate the identification of deltacasting (e.g., including multicasting and/or other) opportunities, as described more fully below.

It will be appreciated that, while the server optimizer 130 is illustrated as part of the server system 220, this should not be construed as limiting the location or implementation of the server optimizer 130. In one embodiment, the server optimizer 130 is implemented by a server in communication with the server system 220 over the network 140. For example, a third party may lease server space that is accessible over the Internet or a private connection (e.g., a high-speed fiber connection). The leased server space may be used for serving the server optimizer 130.

Data processed by the server-side accelerator module 350 may pass through the support modules 346 to the scheduler module 335. Embodiments of the support modules 346 include one or more types of modules for supporting the functionality of the modem termination module 330, for example, including a multicaster module 340, a fair access policy ("FAP") module 342, and an adaptive coding and modulation ("ACM") module 344. In certain embodiments, some or all of the support modules 346 include off-the-shelf types of components.

Embodiments of the multicaster module 340 provide various functions relating to multicasting of data over the links of the communications system. Certain embodiments of the multicaster module 340 use data generated by other processing modules (e.g., the server-side accelerator module 350) to prepare traffic for multicasting. For example, the multicaster module 340 may prepare datagrams as a multicast stream. Other embodiments of the multicaster module 340 perform more complex multicasting-related functionality. For example, the multicaster module 340 may contribute to determinations of whether data is unicast or multicast to one or more users (e.g., using information generated by the server-side accelerator module 350), what modcodes to use, whether data should or should not be sent as a function of data stored at destination user terminals 230, how to handle certain types of encryption, etc.

Embodiments of the accounting module 342 implement various accounting-related functions. In one embodiment, the accounting module 342 collects data from multiple components to determine how much network usage to attribute to a particular user. For example, the accounting module 342 may determine how to count upload or download traffic against a user's fair access policy (FAP). In another embodiment, the accounting module 342 dynamically adjusts FAPs according to various network link and/or usage conditions. For example, the accounting module 342 may adjust FAPs to encourage network usage during lower traffic times. In yet another embodiment, the accounting module 342 affects the operation of other components of the modem termination module 330 as a function of certain FAP and/or other accounting conditions. For example, the accounting module 342 may direct the multicaster module 340 to multicast certain types of data or to prevent certain users from joining certain multicast streams as a function of FAP or other considerations.

Embodiments of the ACM module 344 implement various ACM functions. For example, the ACM module 344 may track link conditions for certain spot beams, users, etc., for use in dynamically adjusting modulation and/or coding schemes. In some embodiments, the ACM module 344 may help determine which users should be included in which customer groupings or multicast streams as a function of optimizing resources through modcode settings. In certain embodiments, the ACM module 344 implements ACM-aware encoding of data adapted for progressive encoding. For example, MPEG-4 video data may be adapted for progressive encoding in layers (e.g., a base layer and enhancement layers). The ACM module 344 may be configured to set an appropriate modcode separately for each layer to optimize video delivery.

When traffic has been processed by the server-side accelerator module 350 and/or the support modules 346, the traffic is passed to the scheduler module 335. Embodiments of the scheduler module 335 are configured to provide various functions relating to scheduling the links of the communications system handled by the server system 220. For example, the scheduler module 335 may manage link bandwidth by scheduling license grants within a spot beam.

In some embodiments, functionality of the server system 220 involves communication and interaction with the SAN 322. Embodiments of the SAN 322 include a shared storage module 320, which may include any useful type of memory store for various types of functionality of the server system 220. For example, the shared storage module 320 may include volatile or non-volatile storage, servers, files, queues, etc. In certain embodiments, the SAN 322 further includes a captive edge server 325, which may be in communication with the shared storage module 320. In some embodiments, the captive edge server 325 provides functionality similar to that of the third-party edge server 312, including content mirroring. For example, the captive edge server 325 may facilitate different contractual relationships from those of the third-party edge server 312 (e.g., between the server system 220 provider and various content providers). In certain embodiments, the captive edge server 325 and/or the third-party edge server 312 are in communication with server-side storage (e.g., within the SAN 322).

It will be appreciated that components of the server system 220 may provide many different types of functionality. For example, some embodiments oversee a variety of decoding, interleaving, decryption, and unscrambling techniques. Other embodiments manage functions applicable to the communication of content downstream through a satellite (e.g., the satellite 205 of FIG. 2) to one or more users (e.g., user systems 110 of FIG. 2). As described more fully below with reference to various embodiments, the server system 220 may handle different types of traffic in different ways. For example, some uses of the communications system involve contractual relationships and/or obligations with third-party content providers to interface with their edge servers (e.g., through the third-party edge server 312), while other uses involve locally "re-hosting" certain content (e.g., through the captive edge server 325). Further, some use cases handle real-time types of data (e.g., UDP data) differently from non-real-time types of data (e.g., TCP data). Many other uses are possible.

In certain embodiments, some or all of these downstream communications functions are handled by the server-side transceiver module 360. Embodiments of the server-side transceiver module 360 encode and/or modulate data, using one or more error correction techniques, adaptive encoding techniques, baseband encapsulation, frame creation, etc. (e.g., using various modcodes, lookup tables, etc.). Other functions may also be performed by the server-side transceiver module 360 or other components of the server system 220, including upconverting, amplifying, filtering, tuning, tracking, etc. For example, in the context of the satellite communications system 200 of FIG. 2, the server-side transceiver module 360 may communicate data to one or more antennae 210 for transmission via the satellite 205 to the user systems 110. Embodiments of the server system 220 also include the modem termination module 330 for receiving modem traffic over the satellite link from users. In some embodiments, the modem termination module 330 is configured substantially as a satellite modem termination system ("SMTS").

In other embodiments, downstream functions and or other functions of the server system 220 are centralized and/or distributed according to various embodiments of the invention. For example, as shown in FIG. 2, a server system 220 may include a number of base stations 215, gateways 217, and/or other components (e.g., hubs, cross-connects, cores, etc.). Similarly, in other types of communications systems, multiple server system 220 components may perform various functions on the server-side of the communications system. In some embodiments, substantially each server system 220 node (e.g., each base station 215, gateway 217, etc.) is capable of performing substantially all the server system 220 functionality. In other embodiments, much of the advanced processing server system 220 functionality is implemented in edge nodes (e.g., base stations 215) of the server system 220, while other nodes (e.g., gateways 217, cores, cross-connects, etc.) provide more basic routing and/or switching functions. In still other embodiments, edge node functionality is fairly limited, while advanced processing functions are more centralized (e.g., in gateways 217, core nodes, etc.).

Figure 4:
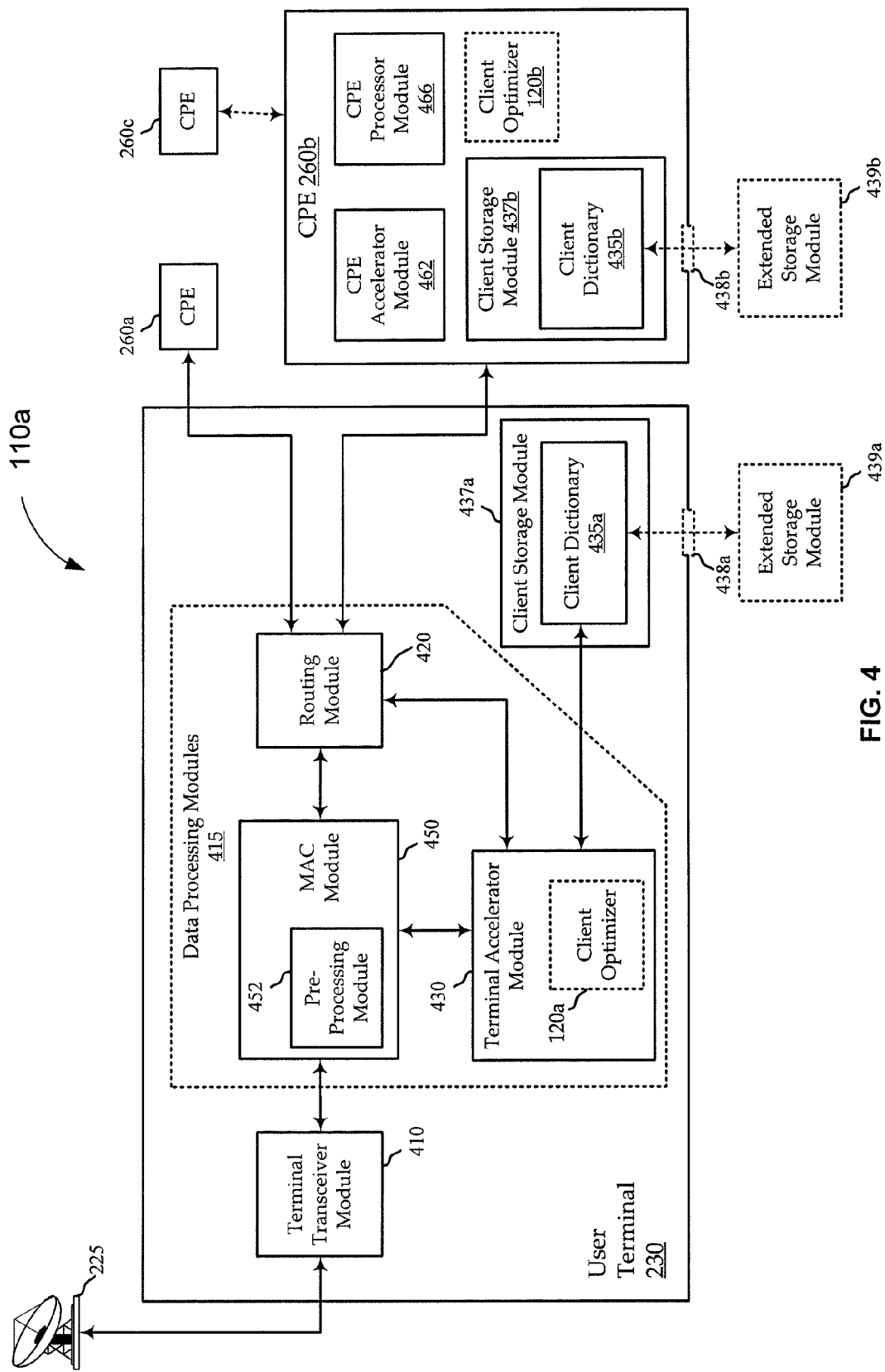
FIG. 4 shows a simplified block diagram of an embodiment of a user system, including an embodiment of a user terminal coupled between a user antenna and a CPE, according to various embodiments.

As described above (e.g., with reference to FIGS. 1 and 2), the server system 220 communicates with one or more user systems 110 configured to perform various user-side (e.g., client-side) communications functions. FIG. 4 shows a simplified block diagram of an embodiment of a user system 110a, including an embodiment of a user terminal 230 coupled between a user antenna 225 and a CPE 260, according to various embodiments. Some embodiments of the user system 110 are configured, as shown in FIG. 2, to communicate over a satellite communications system 200 by interfacing with a server system 220 over a satellite link (e.g., the server system 220 of FIG. 3). Interfacing and other functionality of the user system 110 may be provided by components of the user terminal 230, including a terminal transceiver module 410, data processing modules 415, and a client storage module 437. Embodiments of the data processing modules 415 include a MAC module 450, a terminal accelerator module 430, and a routing module 420.

The components may be implemented, in whole or in part, in hardware. Thus, they may include one or more ASICs adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, FPGAs, and other Semi-Custom ICs), which may be programmed. Each may also be implemented, in whole or in part, with instructions embodied in a computer-readable medium, formatted to be executed by one or more general or application specific processors.

A signal from the user antenna 225 is received by the user terminal 230 at the terminal transceiver module 410. Embodiments of the terminal transceiver module 410 may amplify the signal, acquire the carrier, and/or downconvert the signal. In some embodiments, this functionality is performed by other components (either inside or outside the user terminal 230).

In some embodiments, data from the terminal transceiver module 410 (e.g., the downconverted signal) is communicated to the data processing modules 415 for processing. For example, data is communicated to the MAC module 450. Embodiments of the MAC module 450 prepare data for communication to other components of, or in communication with, the user terminal 230, including the terminal accelerator module 430, the routing module 420, and/or the CPE 260. For example, the MAC module 450 may modulate, encode, filter, decrypt, and/or otherwise process the data to be compatible with the CPE 260.

In some embodiments, the MAC module 450 includes a pre-processing module 452. The pre-processing module 452 implements certain functionality for optimizing the other components of the data processing modules 415. In some embodiments, the pre-processing module 452 processes the signal received from the terminal transceiver module 410 by interpreting (e.g., and decoding) modulation and/or coding schemes, interpreting multiplexed data streams, filtering the digitized signal, parsing the digitized signal into various types of information (e.g., by extracting the physical layer header), etc. In other embodiments, the pre-processing module 452 pre-filters traffic to determine which data to route directly to the routing module 420, and which data to route through the terminal accelerator module 430 for further processing.

Embodiments of the terminal accelerator module 430 provide substantially the same functionality as the server-side accelerator module 350, including various types of applications, WAN/LAN, and/or other acceleration functionality. In one embodiment, the terminal accelerator module 430 implements functionality of AcceleNet™ applications, like interpreting data communicated by the server system 220 using high payload compression, handling various prefetching functions, parsing scripts to interpret requests, etc. In certain embodiments, these and/or other functions of the terminal accelerator module 430 are provided by a client optimizer 120 resident on (e.g., or in communication with) the terminal accelerator module 430. Notably, in some embodiments, the client optimizer 120 is implemented as client optimizer 120*a* on the user terminal 230 and/or client optimizer 120*b* on the CPE 260*b*. Data from the MAC module 450 and/or the terminal accelerator module 430 may then be routed to one or more CPEs 260 by the routing module 420.

In some embodiments, output from the data processing modules 415 and/or the terminal accelerator module 430 is stored in the client storage module 437*a*. Further, the data processing modules 415 and/or the terminal accelerator module 430 may be configured to determine what data should be stored in the client storage module 437*a* and which data should not (e.g., which data should be passed to the CPE 260). It will be appreciated that the client storage module 437*a* may include any useful type of memory store for various types of functionality of the user system 110. For example, the client storage module 437*a* may include volatile or non-volatile storage, servers, files, queues, etc. Embodiments of the client storage module 437*a* are configured to store some or all of a client dictionary 435, as described more fully below.

In certain embodiments, storage functionality and/or capacity is shared between an integrated (e.g., on-board) client storage module 437*a* and an extended (e.g., off-board) storage module 439*a*. For example, the extended storage module 439*a* may be implemented in various ways, including as an attached peripheral device (e.g., a thumb drive, USB hard drive, etc.), a wireless peripheral device (e.g., a wireless hard drive), a networked peripheral device (e.g., a networked server), etc. In some embodiments, the user terminal 230 interfaces with the extended storage module 439*a* through one or more ports 438*a*. In one embodiment, functionality of the client storage module 437 is implemented as storage integrated into or in communication with CPE 260 (e.g., as client storage module 437*b* in CPE 260*b*).

Some embodiments of the CPE 260 are standard CPE 260 devices or systems with no specifically tailored hardware or software (e.g., shown as CPE 260*a*). Other embodiments of the CPE 260, however, include hardware and/or software modules adapted to optimize or enhance integration of the CPE 260 with the user terminal 230 (e.g., shown as alternate CPE 260*b*). For example, the alternate CPE 260*b* is shown to include a CPE accelerator module 462, a CPE processor module 466, and a client storage module 437*b*. Embodiments of the client storage module 437*b* are configured to store some or all of the client dictionary 435*b*. Embodiments of the CPE accelerator module 462 are configured to implement the same, similar, or complementary functionality as the terminal accelerator module 430. For example, the CPE accelerator module 462 may be a software client version of the terminal accelerator module 430. In some embodiments, some or all of the functionality of the data processing modules 415 is implemented by the CPE accelerator module 462 and/or the CPE processor module 466. In these embodiments, it may be possible to reduce the complexity of the user terminal 230 by shifting functionality to the alternate CPE 260*b*.

Embodiments of the client storage module 437*b* may include any type of dictionary, object or byte caching, data serving, and/or other storage-related components in or in communication with the alternate CPE 260*b* (e.g., a computer hard drive, a digital video recorder ("DVR"), etc.). In some embodiments, the client storage module 437*b* is in communication with an extended storage module 439*b*, for example, via one or more ports 438*b*. Of course, many types of CPE 260 are possible, and the functionality of the CPE 260 may be implemented in a number of different types of devices or systems. In some embodiments, the CPE 260 is a fixed or mobile end device for displaying content to the user, like a television, personal computer, home theater system, cellular telephone, portable music or video player, personal digital assistant, etc. In other embodiments, the CPE 260 is an intermediate device, configured to communicate to another CPE 260 end device (or even to another CPE 260 intermediate device). For example, the CPE 260 may include a set-top box, a home networking component (e.g., a router, a hub, a femtocell, etc.), or any other type of intermediate device. As shown, CPE 260*c* is in communication with the user terminal 230 indirectly through CPE 260*b*, where CPE 260*b* is acting as an intermediate device.

Further, in some embodiments, the CPE 260 is integrated, partially or completely, with the user terminal 230. For example, a home theater system may be built around a main interface component that includes a network interface having user terminal 230 functionality, certain CPE 260 functionality, and ports for wired or wireless communication with additional CPE 260 devices. Embodiments of user terminals 230 and/or CPEs 260 may also be configured for compatibility with certain communication standards. For example, CPEs 260 may be configured to support plug-and-play functionality (e.g., through the Digital Living Network Alliance (DLNA) standard), wireless networking (e.g., through the 802.11 standard), etc.

In certain embodiments, the user terminal 230 is configured to transmit data back to the server system 220. Embodiments of the data processing modules 415 and the terminal transceiver module 410 are configured to provide functionality for communicating information back through the communications system (e.g., through the satellite communications system 200 of FIG. 2 for directing provision of services). For example, information about what is stored in the client dictionary 435 may be sent back to the server system 220 for limiting repetitious file transfers, as described more fully below.

It will be appreciated that the communications system may be used to provide different types of communication services to users. For example, the satellite communications system 200 of FIG. 2 may provide content from content servers 150, through the network 140, to a user's CPE 260, including Internet content, broadcast television and radio content, on-demand content, voice-over-Internet-protocol (VoIP) content, and/or any other type of desired content. It will be further appreciated that this content may be communicated to users in different ways, including through unicast, multicast, broadcast, simulcast, and/or other communications.

As described above, a number of additional and/or improved communications functions may be facilitated by exploiting content sharing and/or other types of opportunities through deltacasting. For example, in a typical communication system, like the satellite communications system 200 of FIG. 2, multiple customers may request the same or substantially similar content at the same or different times. By exploiting this feature of the communication system, it may be possible to optimize (at least partially) the provision of various communication services. For example, link conditions (e.g., bandwidth utilization) may be improved, enhanced services may be offered to customers, costs relating to service provision may be reduced, etc.

Content sharing may be implemented in many different ways, according to embodiments. For example, certain content may be multicast to a number of users in a spot beam, thereby allowing multiple user systems 110 to share channels (i.e., potentially increasing effective throughput). Rather than transmitting a copy of the content to each requesting user through a private unicast channel, fewer copies of the content may be shared by multiple users. In certain embodiments, custom or off-the-shelf components are used to provide this functionality by evaluating multiple communication streams and collapsing them into a single stream within some tolerance (e.g., a small "jitter window," accounting for inter-packet delay variances). In other embodiments, dedicated components in the server system 220 implement this functionality.

According to various embodiments, deltacasting and related functionality may be implemented at least partially through client-server interactions. As discussed above, a server optimizer 130 may determine what content is traversing the various links in the communication system using fingerprints. For example, the fingerprints may be used to identify fingerprint trends (e.g., patterns of byte-sequence communications) and/or to identify actual content features (e.g., information from layers 4-7 of the OSI IP protocol stack). These determinations may then be used to identify and exploit opportunities for improving the communication services over the communications system.

Figure 5:
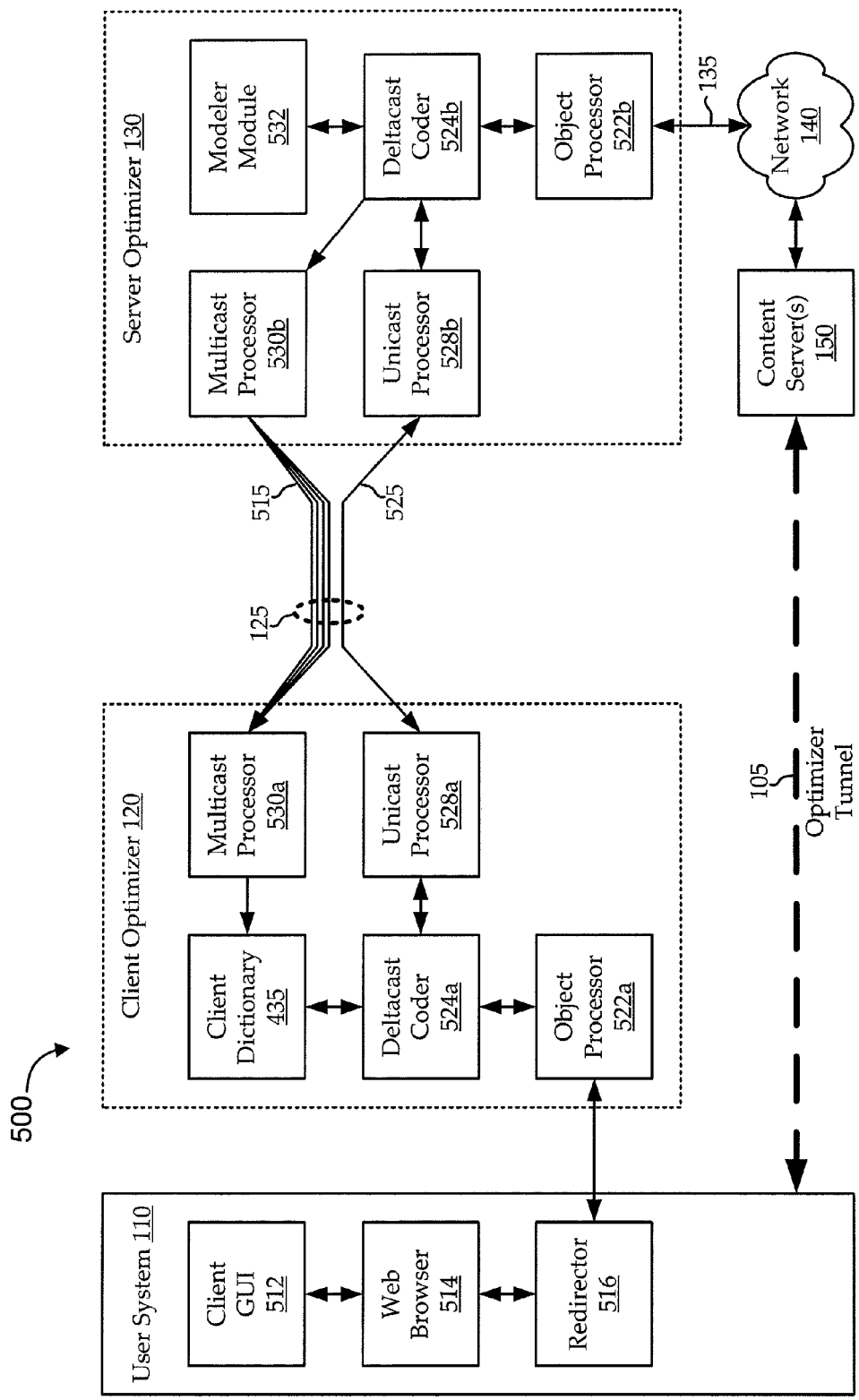
FIG. 5 shows a block diagram of an embodiment of a communications system, illustrating client-server interactivity through a client optimizer and a server optimizer, according to various embodiments.

FIG. 5 shows a block diagram of an embodiment of a communications system 500, illustrating client-server interactivity through a client optimizer 120 and a server optimizer 130, according to various embodiments. In some embodiments, the communications system 500 is an embodiment of the communications system 100a of FIG. 1A or the satellite communications system 200 of FIG. 2. As shown, the communications system 500 facilitates communications between a user system 110 and one or more content servers 150 via at least one client-server communication link 125 and at least one content network link 135. For example, interactions between the client optimizer 120 and the server optimizer 130 effectively create a tunnel 505 between the user system 110 and the content servers 150. In some embodiments, the content network link 135 includes links through a network 140, like the Internet. Also, as illustrated, embodiments of the client-server communication link 125 support one or more unicast service flows 525 and one or more multicast service flows 515.

In some embodiments, the user system 110 includes a client graphical user interface (GUI) 512, a web browser 514, and a redirector 516. The client GUI 512 may allow a user to configure performance aspects of the user system 110 (e.g., or even aspects of the greater communications system 500 in some cases). For example, the user may adjust compression parameters and/or algorithms, alter content filters (e.g., for blocking illicit websites), or enable or disable various features used by the communications system 500. In one embodiment, some of the features may include network diagnostics, error reporting, as well as controlling, for example, components of the client optimizer 120 and/or the server optimizer 130.

In one embodiment, the user selects a universal recourse locator (URL) address through the client GUI 512 which directs the web browser 514 (e.g., Internet Explorer®, Firefox®, Netscape Navigator®, etc.) to a website (e.g., cnn.com, google.com, yahoo.com, etc.). The web browser 514 may then issue a request for the website and associated objects (i.e., a content set) to the Internet. It is worth noting that the web browser 514 is shown for illustrative purposes only. While embodiments of the user system 110 may typically include at least one web browser 514, user systems 110 may interact with content providers 150 in a number of different ways without departing from the scope of the invention. Also, as discussed above, various types of content sets may be requested in various ways (e.g., feed links may be requested through feed readers, etc.).

The content set request from the user system 110 (e.g., from the web browser 514) may be intercepted by the redirector 516. It is worth noting that embodiments of the redirector 516 are implemented in various ways. For example, embodiments of the redirector 516 are implemented within a user modem as part of the modem's internal routing functionality. The redirector 516 may send the request to the client optimizer 120. It is worth noting that the client optimizer 120 is shown as separate from the user system 110 (e.g., in communication over a local bus, on a separate computer system connected to the user system 110 via a high speed/low latency link, like a branch office LAN subnet, etc.). However, embodiments of the client optimizer 120 are implemented as part of the user system 110 in any useful client-side location, including as part of a user terminal, as part of a user modem, as part of a hub, as a separate hardware component, as a software application on the client machine, etc.

In one embodiment, the client optimizer 120 includes an object processor 522a. The object processor 522a may be configured to perform a number of different processing functions, including Java parsing and protocol processing. Embodiments of the object processor 522a may process hypertext transfer protocol (HTTP), file transfer protocol (FTP), various media protocols, metadata, header information, and/or other relevant information from the request data (e.g., packets) to allow the client optimizer 120 to perform its optimizer functions. For example, the request may be processed by the object processor 522a to determine which objects are being requested and whether data needed to generate the requested object is already stored locally (e.g., from a prefetch operation, a pre-positioning operation, a multicast caching operation, a previous deltacasting operation, etc.). Various embodiments exploit byte sequences stored locally in the client dictionary 435. Certain embodiments may also exploit object data and/or other data stored locally (e.g., in browser cache, etc.), where appropriate.

In some embodiments, the object processor 522a sends the processed request data to a deltacast coder 524a. The deltacast coder 524a may encode the request into a compressed version of the request using one or more data compression algorithms. For example, these algorithms may employ dictionary coding with the client dictionary 435 configured to store strings so that data from previous web objects can be used to compress data from new pages. Of course, other types of coding are possible according to other embodiments of the deltacast coder 524a.

The processed and/or coded request data may then be further processed by a unicast processor 528a in some embodiments in preparation for communicating the data over the client-server communication link 125 (e.g., as private IP traffic). In various embodiments, the unicast processor 528a processes the data according to one or more protocols, for example a unicast protocol, depending at least on the type of communication links implemented as part of the client-server communication link 125. For example, the client-server communication link 125 may include a wireless link, a cellular link, a satellite link, a dial-up link, etc. In certain embodiments, the unicast processor 528a is configured to implement Intelligent Compression Technology's® (ICT) transport protocol (ITP). In one embodiment, ITP maintains a persistent connection between the client optimizer 120 and the server optimizer 130. The persistent connection may enable the communications system 500 to reduce or eliminate inefficiencies and overhead costs associated with creating a new connection for each request.

In some embodiments, the communication is received at the other end of the client-server communication link 125 by a unicast processor 528b in the server optimizer 130. In some embodiments, the unicast processor 528b in the server optimizer 130 is implemented as substantially an identical component to the unicast processor 528a in the client optimizer 120. In other embodiments, implementations of the unicast processors 528 may be tailored to their location (e.g., in the client optimizer 120 or the server optimizer 130). When the request data is received by the unicast processor 528b, the unicast processor 528b may process the request (e.g., as part of a content set, as discussed below) according to the applied one or more protocols. For example, the unicast processor 528b may be configured to implement ITP, such that data sent from the unicast processor 528a according to the ITP protocol can be processed accordingly.

As discussed above, the data received at the server optimizer 130 from the client optimizer 120 may be coded (e.g., dictionary coded) and/or otherwise processed (e.g., according to one or more protocols, like HTTP). Embodiments of the server optimizer 130 include an object processor 522b and a deltacast coder 524b. In some embodiments, the object processor 522b and the deltacast coder 524b are configured to handle processing and/or coding of the request data implemented by the object processor 522a and the deltacast coder 524a of the client optimizer 120, respectively. For example, embodiments of the object processor 522b use features of the deltacast coder 524b and/or dictionary types of information, which may be stored, or modeled, in a modeler module 532 to decode the request data. The request may thus be processed (e.g., translated, decoded, etc.) into a format that is accessible to a source of the requested content (e.g., a website). Of course, in certain embodiments, additional features of the request may be processed by these or other components. For example, if the request includes instructions (e.g., set-level metadata, a cookie or a directive, such as a "referred by" or type of encoding accepted, etc.), information about the instructions may be stored as part of a model in the modeler module 532 or another location.

Embodiments of the object processor 522b may then forward the decoded request to an appropriate destination (e.g., a content server 150) over the content network link 135 (e.g., via a network 140). The content network link 135 may include, for example, a cable modem connection, a digital subscriber line (DSL) connection, a T1 connection, a fiber optic connection, etc. As discussed above, in some embodiments of the communications system 500, the content network link 135 manifests substantially lower latency than that of the client-server communication link 125.

Response data may be received by the object processor 522b, in response to the request, from the appropriate destination (e.g., the content server 150) over the content network link 135. It will be appreciated that the response data may include various types of information, such as one or more attachments (e.g., media files, text files, etc.), references to "in-line" objects needed to render a web page, etc. For example, as discussed above, the response data may be identified as part of a content set and handled as such. Embodiments of the object processor 522b may be configured to interpret the response data, which may, for example, be received as HTML, XML, CSS, Java Scripts, or other types of data. As described more fully below, a fingerprint of the response data may be generated by the deltacast coder 524b (e.g., using dictionary coding techniques) and used for various types of deltacasting and/or other optimization functions.

The fingerprint may be used to determine how to further handle the response data, as described below. In some embodiments, processed and/or coded (e.g., compressed) response data is sent over the client-server communication link 125 to the client optimizer 120. The data may be sent as a unicast service flow 525 from the unicast processor 528b in the server optimizer 130 to the unicast processor 528a in the client optimizer 120; and/or the data may be sent as one or more multicast service flows 515 from the multicast processor 530b in the server optimizer 130 to the multicast processor 530a in the client optimizer 120. In certain embodiments, standard protocols are adapted for use with the unicast service flows 525 and/or the multicast service flows 515. For example, the Pragmatic General Multicast ("PGM") protocol, the Negative-Acknowledgment ("NACK") Oriented Reliable Multicast ("NORM"), or "RFC 3940," protocol from the Internet Engineering Task Force ("IETF"), or other protocols may be used to implement multicasting.

Further, when the client-server communication link 125 includes multiple multicast service flows 515, the multicast service flows 515 may be configured in various ways. In various embodiments, for example, the multicast service flows 515 are configured to each communicate at a different modcode point, on a different spot beam, and/or on a different carrier. This may allow for more efficient communication of traffic to groups of user systems 110 having particular characteristics. For example, if certain traffic is determined to be destined for a user system 110 capable of communicating at a particular modcode point, the traffic may be multicast on a multicast service flow 515 that operates at or near this modcode point for maximum efficiency (e.g., rather than at the lowest modcode point needed to transmit to all user systems 110 in the multicast group). While this may, in certain cases, cause some of the user systems 110 in the multicast group to be unable to reliably receive all the multicast data, there may still be an overall improvement in the operation of the communications system 500.

In other embodiments, modcodes may be handled (e.g., selected, adapted, optimized, etc.) for various effects. In one embodiment, as described above, the modcode is selected according to link conditions between the server optimizer 130 and the client optimizer 120 associated with a requesting client, if any (i.e., so that at least the requesting client can reliably receive the communication). In another embodiment, the modcode is selected so that at least some threshold group (e.g., number) of clients can reliably receive the communication. In still other embodiments, the modcode is adapted to changes in link conditions between the server optimizer 130 and one or more client optimizers 120. For example, adaptive coding and modulation techniques may be used. The modcode may be adapted by estimating or monitoring link conditions from the server-side (e.g., estimating signal-to-noise ratios, bandwidth, etc.) or via feedback from the client-side. In one embodiment, the client optimizer 120 communicates information, like whether packets are reliably received, as feedback to the server optimizer for dynamically adjusting the modcode.

The data received at the client optimizer 120 from the server optimizer 130 may be coded (e.g., dictionary coded) and/or otherwise processed (e.g., according to one or more protocols, like HTTP). Embodiments of the object processor 522a and the deltacast coder 524a in the client optimizer 120 are configured to handle processing and/or decoding of the response data, respectively. For example, embodiments of the object processor 522a use features of the deltacast coder 524a, including functionality of the client dictionary 435, to decode the response data. Embodiments of the object processor 522a may then forward the decoded response to the user system 110 (or to other components of the user system 110, where the client optimizer 120 is part of the user system 110). The response may then be used by components of the user system 110. For example, a media object received as part of the response data may be played back through a media player at the user system 110, used to render a web page through the client web browser 514, etc.

It will be appreciated that, while the above description focuses on browser requests and responses to those requests, embodiments of the invention function within many other contexts. For example, embodiments of the communication system 500 are used to provide interactive Internet services (e.g., access to the world-wide web, email communications, file serving and sharing, etc.), television services (e.g., satellite broadcast television, Internet protocol television (IPTV), on-demand programming, etc.), voice communications (e.g., telephone services, voice-over-Internet-protocol (VoIP) telephony, etc.), networking services (e.g., mesh networking, VPN, VLAN, MPLS, VPLS, etc.), and other communication services. As such, the "response" data discussed above is intended only as an illustrative type of data that may be received by the server optimizer 130 from a content source (e.g., a content server 150). For example, the "response" data may actually be pushed, multicast, or otherwise communicated to the user without an explicit request from the user.

For illustrative purposes, traffic over the communications system 500 may be categorized into private-interest traffic and public-interest traffic. Private-interest traffic may include any traffic for which multicasting the traffic to multiple user systems 110 is deemed inefficient. For example, where the traffic is of interest to only one user system 110, or a very small number of user systems 110, it may cost more to set up and process a multicast service flow than to simply unicast the traffic to each interested user system 110. Notably, a user system 110 may act as an intermediate node (e.g., a hub, switch, router, etc.) that forwards information to multiple end users. For example, in a LAN, data may be received at the client-side for all computers in the LAN by a switch, which may then forward the data to appropriate users in the LAN; traffic that is of interest to only one user system 110 may, in fact, be of interest to many users within a LAN serviced by the one user system 110. Alternatively, each user in the LAN may be considered a separate user system 110 running a separate client optimizer 120. As such, the relevant determination may be, from the perspective of the server optimizer 130, how many unicast service flows 525 on the client-server communication link 125 would be needed to unicast the data to all interested users. In contrast to private-interest traffic, public-interest traffic may include any traffic for which multicasting the traffic to multiple user systems 110 is deemed more efficient than unicasting the traffic to each interested user system 110.

Notably, a number of types of traffic may be either private-interest traffic or public-interest traffic, depending on the context. One example is control traffic, which may be used for various types of control of the communications system. For example, control traffic may be used to send control signals to the client optimizer 120 to direct the client optimizer 120 to accept a particular multicast service flow 515. In one embodiment, individual control traffic is sent as unicast service flows 525 to particular client optimizers 120. In another embodiment, certain control traffic is sent to groups of client optimizers 120 (e.g., to some or all of the user systems 110 serviced by a particular spot beam of a satellite communications system) as one or more multicast service flows 515.

Another type of traffic that may be either private-interest traffic or public-interest traffic is media object data. In one embodiment, a first user takes video with a digital camera as part of a videoconference with a second user. The video file may be considered private-interest traffic, as it may be of interest only to the recipient and may never be requested, or even be made accessible, to other users on the communications system 500. In another embodiment, a reporter for CNN takes video with a digital camera as part of a live feed to CNN.com. The video file may be considered public-interest traffic, as it may be accessed by thousands of users on the communications system 500.

Of course, the determination of whether to classify traffic as private-interest traffic or public-interest traffic can be made in a number of ways and may involve many factors. The factors used to make the determination may be derived from the traffic itself or from other sources (e.g., from an evaluation of current link conditions or current system usage, from third-party information, etc.). When analyzing the traffic itself, information may be derived from the header portion and/or the content portion of the datagrams. As noted above, the header portion may provide straightforward sources of information about the communication and/or the content of the communication (e.g., through protocol information, metadata, public or proprietary tags, etc.). However, the information from the header portion may often be limited from the perspective of a man-in-the-middle type of server optimizer 130. For example, relevant header information may be encoded in a proprietary format, may be misleading as to the underlying by sequence, etc.

The content portion of the traffic received at the server optimizer 130 includes the actual objects (e.g. content file data) being sent to users via respective user systems 110. It will be appreciated that it may be difficult or impossible to obtain certain types of information looking only at the content portion of the traffic datagrams. Of course, various types of data processing (e.g., statistical analysis) can be used to derive information from the byte sequence, but it may be difficult to derive high-level information, such as the file type associated with the data. For example, a movie is streamed from a VOD server (e.g., as the content server 150) to a user terminal 110. Proprietary tags in the header portion of the traffic may indicate the name of the movie and the file type for processing at the user's playback device, while the content portion may include only the sequence of bytes that define the actual movie content. When the streaming traffic is intercepted by the server optimizer 130, the server optimizer 130 may be unable to read the header portion of the traffic, and may, therefore, be unable to use that information for making multicast and/or other determinations.

Notably, however, there are many cases when requests and/or responses can be characterized and handled at a set level, for example, according to a Content Set identifier and set-level metadata. Set-level handling may allow embodiments to perform certain high-level functions with content traffic, even while acting as a substantially transparent optimizer. For example, certain traffic optimizations (e.g., pre-positioning determinations) may be implemented according only to byte-level content portion data, while allowing certain high-level functionality to be implemented according to set-level characterizations.

Figure 6:
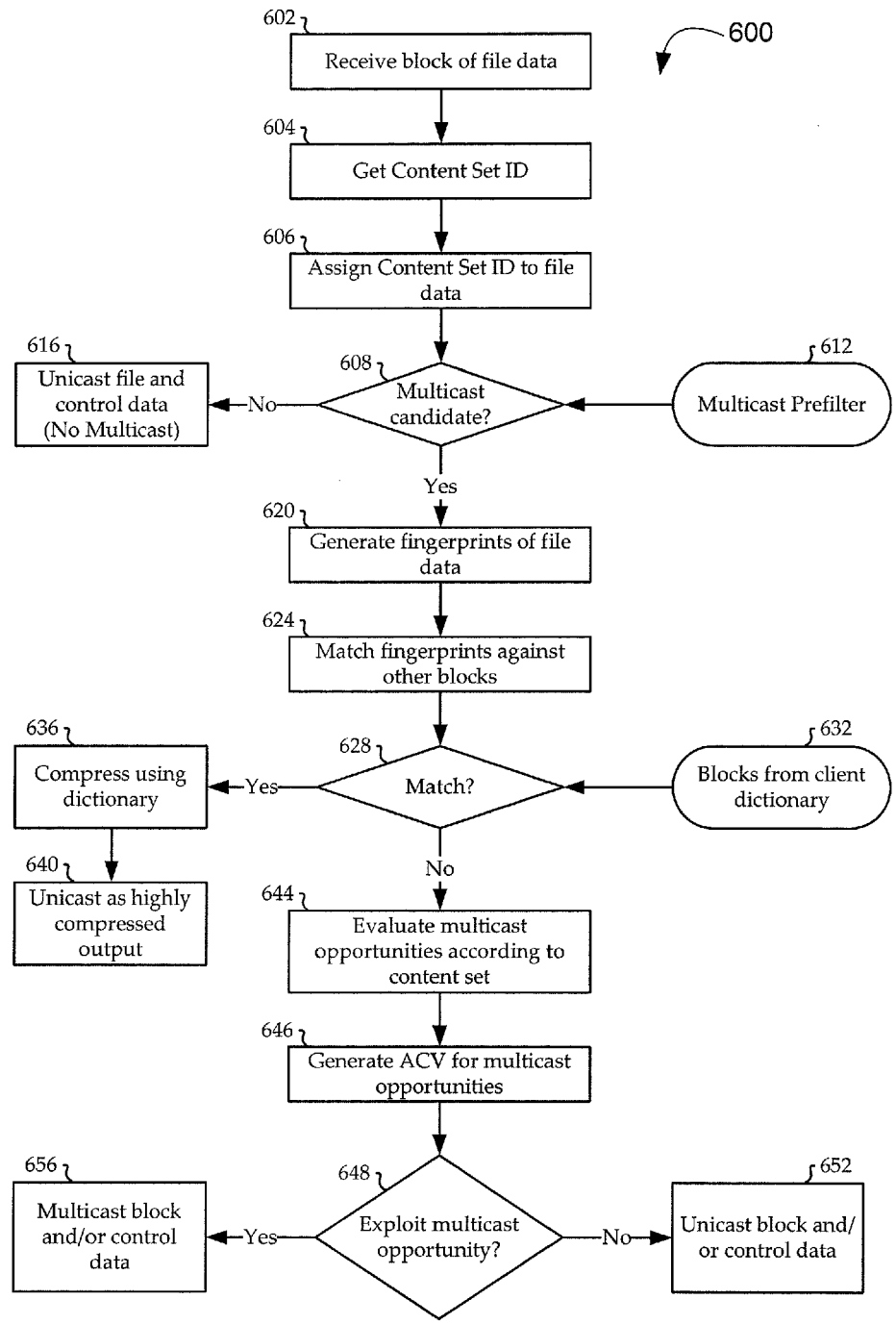
FIG. 6 is a flow diagram of an illustrative method for using deltacasting to handle content set traffic over a communications system, according to various embodiments.

FIG. 6 is a flow diagram of an illustrative method 600 for using deltacasting to handle content set traffic over a communications system, according to various embodiments. For the sake of clarity, the method 600 is described in the context of the communications system 500 of FIG. 5. It will be appreciated, however, that various modifications may be made to the communications system 500 without limiting the scope of the method 600.

Embodiments of the method 600 begin at block 602 by receiving a block of content data. For example, the content data block (e.g., file data, streaming data, web object data, etc.) may be received as part of traffic intercepted by the server optimizer 130 from a content server 150 over the content network link 135. In some embodiments, the content data block is identified as part of a content set. Where the content data block is part of a content data set, the method 600 may get an appropriate content set identifier ("Content Set ID") in block 604. The Content Set ID may then be assigned to the block of data in block 606. Of course, there may be many ways to identify data as part of a content set and to get and assign an appropriate Content Set ID, according to various embodiments.

Figure 7A:
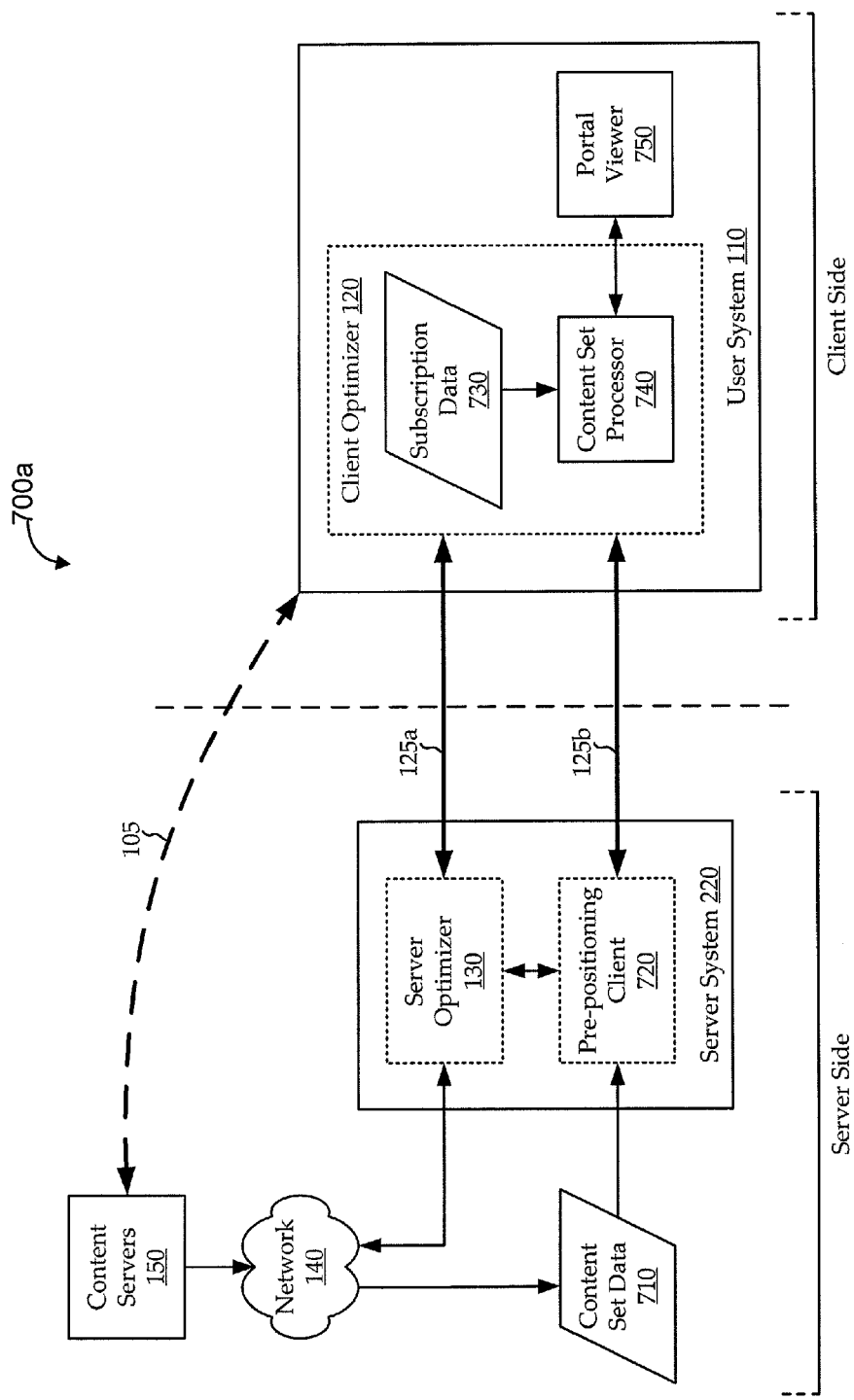
FIG. 7A shows a simplified block diagram of a communications system having a server-side pre-positioning client for use with various feed-based embodiments.
Figure 7B:
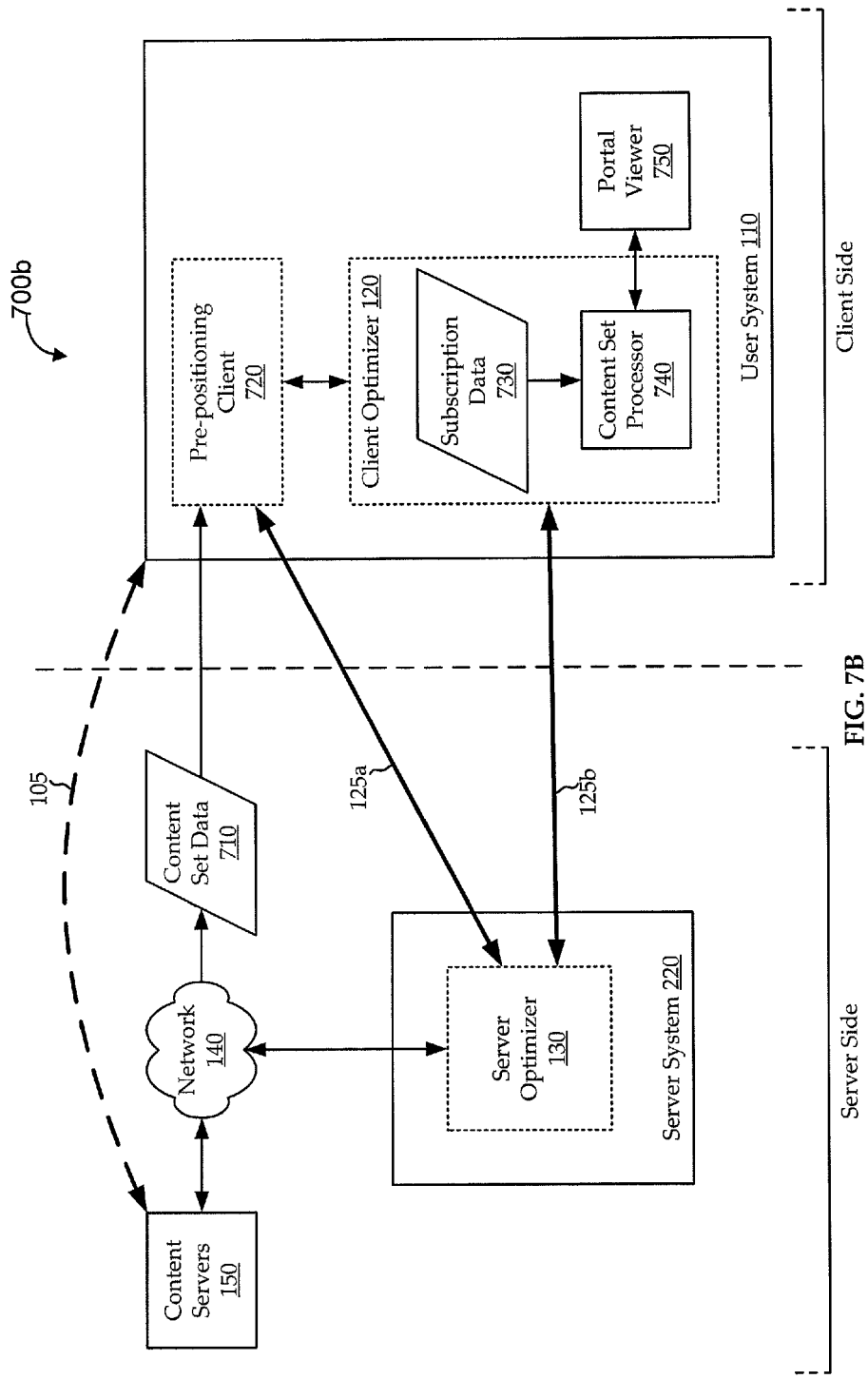
FIG. 7B shows a simplified block diagram of a communications system having a client-side pre-positioning client for use with various feed-based embodiments.

In one set of embodiments, a pre-positioning client (e.g., as shown in FIGS. 7A and 7B) is configured to run a pre-positioning routine. When the pre-positioning routine initiates (e.g., each night at 2:00 am, when a certain level of under-subscription or excess capacity of a communication link is detected, etc.), one or more session streams may be established to communicate particular content sets. Each session stream may carry a Content Set ID, and all content set traffic being communicated over the session stream may be tagged with the Content Set ID.

For example, in one embodiment, a list of feeds (e.g., RSS feeds) are identified as having popular content, and the pre-positioning client is configured to push updates to these feeds to all interested clients (e.g., users that have subscribed to the feeds) overnight. Each night, the pre-positioning client creates a number of session streams to push the feed updates, and each feed update carries a Content Set ID. For example, the Content Set ID may be generated and/or provided by the pre-positioning client as part of its pre-positioning routine. All file data received as part of each session stream may be assumed to relate to the requested content set, and all the file data received on the session stream can be associated with the session stream's Content Set ID. Some embodiments of pre-positioning clients and pre-positioning routines, for example, in the context of feed-based content sets, are described with reference to FIGS. 7A, 7B, 8A, and 8B, below.

In another set of embodiments, set-level handling is invoked as a result of a client-side request. A user may request a content set by sending a request to a content server 150. For example, the user may request a URL through the web browser 514, request a feed item through a feed reader, etc. The request may be intercepted by the client optimizer 120 and identified (e.g., tagged) as a content set request. When a session stream is established to handle the request (e.g., to communicate response data to the user in response to the user's request), the session stream may be configured to assign a particular Content Set ID to all its response data traffic received at block 602.

In various embodiments, the Content Set ID may be generated and/or assigned to the session stream at either the client side or the server side. For example, the server optimizer 130 may be configured to assign the Content Set ID according to a directive from the client optimizer 120 that carries the Content Set ID. Alternatively, the server optimizer 130 may determine that the request is for a content set and assign a Content Set ID, accordingly.

In yet another set of embodiments, set-level handling is invoked as a result of server-side determinations. For example, the server optimizer 130 may maintain a list of popular content sets. When a request for the content set is received at the server optimizer 130, a session stream may be established and an appropriate Content Set ID may be assigned. For example, a request is received for the homepage of a popular news website that is constantly updated throughout the day, such that the response data will include the most up-to-date version of the homepage and its associated content objects (the content set). The server optimizer 130 may establish a session stream and associate all the response traffic on the session stream with a Content Set ID (e.g., and additional metadata) that characterizes the data as part of the content set.

In some embodiments, the server optimizer 130 determines that some or all of a content set is being requested according to fingerprints of the data generated at block 620, as described below. For example, the fingerprint of a received data block may be analyzed by a content set referrer (e.g., compared against a global content set fingerprint list) to determine that the received data block is part of a content set. The data block may accordingly be tagged with an appropriate Content Set ID.

It will be appreciated that other ways of handling Content Set IDs are possible, according to other embodiments. Further, embodiments also associate set-level (e.g., URL-level, feed item level, feed channel level, etc.) metadata with the session stream data and/or with the Content Set ID. For example, each data block may be tagged at the server optimizer 130 with certain set-level metadata indicating its association with the content set for appropriate handling by the client optimizer 120. Alternatively, the Content Set ID may be associated with particular set-level metadata, and the client optimizer 120 may handle all data received on the associated session stream according to that set-level metadata.

As used herein, "set-level metadata" includes any type of set-level characterization information. For example, set-level metadata may be implemented as HTTP metadata inserted into the header portion of packets being received on a session stream, as entries in an associative database that indexes received data blocks and associates them with characterization information, etc. Embodiments can use the set-level metadata to perform certain high-level functions on the data and to affect multicasting and/or other determinations, while otherwise handling the received file data at the byte level (e.g., without the use of the file metadata), as described below. For example, the content set can be handled as such, even while treating the received blocks of file data as substantially meaningless sequences of bytes.

It is worth noting that some content set requests may not invoke set-level handling. Rather, set-level handling may be restricted to cases where it is deemed efficient to handle the request and resulting response data as part of a content set. In some embodiments, a list of popular content sets (e.g., and associated Content Set IDs) is maintained at the server-side and/or the client-side of the communications system 500. In other embodiments, various types of metrics are maintained to determine whether a requested content set is popular enough to warrant assigning a Content Set ID and handling the data as such. In still other embodiments, other types of cost-benefit analyses are performed to determine whether to invoke set-level handling. As such, discussions herein of determining that data is part of a content set may be assumed in cases where the data is determined to be part of a content set for which set-level handling is invoked.

Further, when the response data is not part of a content set (e.g., or not part of a content set determined to invoke set-level handling), the data may be handled in various ways, according to various embodiments. In one embodiment, no Content Set ID is received or assigned at blocks 604 and 606, respectively. In another embodiment, one or more types of Content Set ID are assigned to designate the data block as not part of a content set (e.g., or, more accurately, as part of a category of content for which set-level handling is not invoked). In still other embodiments, the method 600 is invoked only after set-level handling has been invoked. For example, the method 600 begins at block 602 only after a session stream has been established for a content set, when the request is made by a special pre-positioning client (e.g., as described above), etc.

Even further, before, during, and/or after the Content Set ID is received and assigned at blocks 604 and 606, respectively, some embodiments may determine whether the content data block is a multicast candidate at block 608. The determination in block 608 may be made as a function of one or more criteria used to define a multicast prefilter 612. In one embodiment, the determination is made by the object processor 522b.

The multicast prefilter 612 may be defined according to any type of multicast or similar filtering criteria known in the art. In one embodiment, the multicast prefilter 612 is based on the file size of the content data block. For example, only files larger than a certain minimum size may be considered for multicasting. In another embodiment, information from the header portion of the traffic is used by the multicast prefilter 612. For example, the multicast prefilter 612 may be defined to make the initial multicast determination in block 608 according to source IP address, host URL, destination IP address, file type, protocol, HTTP metadata, etc. For example, all video files over a certain size coming from YouTube.com may be considered multicast candidates, while video files being sent as an email attachment to a single recipient may not be considered multicast candidates.

In some embodiments, data relevant to the multicast prefilter 612 is enhanced through trusted source relationships. For example, contractual relationships may be formed with content and service providers to allow visibility by the service providers into the content traversing the network. Embodiments of the trusted source relationships include access to encryption keys (e.g., including master keys), authorization to re-serve or re-host content (e.g., through a mirroring relationship as described more fully below), etc. In the context of these relationships, the server optimizer 130 may be able to use certain types of proprietary metadata to make initial multicasting determinations.

Of course, the determination made in block 608 may or may not relate to whether the received content is part of a content set. In one example, the file data may be associated with a Content Set ID in block 606 and then determined in block 608 to be part of a file that is too small to be worth multicasting. In another example, for example where substantial processing is needed to determine whether received data is part of a content set, the determination in block 608 may be used to pre-filter received data prior to making the content set determination (e.g., prior to receiving and assigning the Content Set ID in blocks 604 and 606, respectively).

When it is determined at block 608 that the content data block is not a multicast candidate, at block 618, the content data block (e.g., or at least a portion of the content data block) may be unicast, along with any relevant control data, to the appropriate user system(s) 110. For example, as described above, the content data block may be processed by the object processor 522b and/or the deltacast coder 524b, and sent as a unicast service flow 525 over the client-server communication link 125 via the unicast processors 528. The data may then be received by the client optimizer 120, processed and/or decoded, and forwarded, as appropriate, to components of the user system(s) 110.

When it is determined at block 608 that the content data block is a multicast candidate (e.g., according to the multicast prefilter 612 criteria), the content data block is further processed by the server optimizer 130 to determine if any or all of the content data block will, in fact, be sent over one or more multicast service flows 515. At block 620, a fingerprint is generated (e.g., a fingerprint is calculated). In some embodiments, the fingerprint is generated at block 620 by the deltacast coder 524b of the server optimizer 130.

In certain embodiments, the fingerprint is generated using cryptographic hash functions (e.g., generated by a Message-Digest algorithm 5 (MD5) technique), non-secure hash functions (e.g., generated by a cyclic redundancy check (CRC) technique), or other similar techniques. In other embodiments, the fingerprint can be generated in any way, such that the resulting fingerprint can be used to indicate that one particular byte sequence (or a portion of the byte sequence)

matches another particular byte sequence (e.g., or a portion of another byte sequence). Embodiments of dictionary coding (e.g., particularly delta coding) and related techniques are described in more detail in U.S. patent application Ser. No. 12/477,814, entitled "METHODS AND SYSTEMS FOR UTILIZING DELTA CODING IN ACCELERATION PROXY SERVERS" (026841-002110US), filed on Jun. 3, 2009, which is incorporated herein by reference for any and all purposes.

In some embodiments, the fingerprint is essentially a compressed version of the byte sequence. In other embodiments, the fingerprint is a checksum, hash, or other technique applied to some or all of the object data. This fingerprint may then be compared to other fingerprints to find a match. For example, the fingerprint may be used to find matching byte sequences regardless of a starting location within a content stream. Notably, embodiments may ultimately seek multicast opportunities and/or other opportunities for optimization of the communications system 500. As such, it may be inefficient to generate fingerprints on very small blocks of data (e.g., at high densities), since it may not be efficient to exploit opportunities where only small blocks are identified as matches. Further, decreasing the size of blocks may increase the size of the dictionary. Some embodiments, therefore, generate fingerprints at a particular density determined to be efficient according to parameters of the communications system 500 or types of data.

It is worth noting that the traffic may include more than just the content data block for which a fingerprint is being generated, or the traffic may include multiple different content data blocks for which fingerprints are generated. In one example, a media file is received at the object processor 522*b* of the server optimizer 130. The object processor 522*b* and/or the deltacast coder 524*b* may strip off data (e.g., header information) that is not needed for generating the fingerprint at block 620. In another example, an email is received having the media file as an attachment. The object processor 522*b* and/or the deltacast coder 524*b* may perform an extra step of stripping off the email data, in addition to the header and other data, to effectively isolate the byte sequence for fingerprint generation at block 620. Of course, as described above, some embodiments may take steps to maintain the relationship between the byte sequence and the content set, even while other types of information are stripped off.

In block 624, the fingerprint is matched against other fingerprints of other content data blocks in the communications system 500. Determining which other content data blocks are "in the communications system 500" may include different types of analyses for different use cases. For example, in one embodiment, it is desirable to know whether the fingerprint indicates a matching content data block already stored at a particular user system 110 (e.g., in the client dictionary 435, etc.). In another embodiment, it is desirable to know whether the fingerprint indicates a matching data block currently being communicated over a unicast service flow 525 or one or more multicast service flows 515. In various embodiments, the modeler module 532 in the server optimizer 130 is configured to store models that may be useful for making various determinations (e.g., models of client dictionaries 435, models of server-side caches or dictionaries, models of past and current streams sent as either unicast service flows 525 or multicast service flows 515, etc.).

It will be appreciated that a number of different types of determinations may be made, depending on which blocks are being evaluated to find a match, each opening up potential deltacasting opportunities. One such determination is made in some embodiments in block 628, where the fingerprint of the content data block generated in block 620 is compared with blocks from the client dictionary model 632 to determine whether there is a match. For example, embodiments of the client dictionary 435 in the client optimizer 120 represent what is stored at a particular client (e.g., at a user system 110), and embodiments of the modeler module 532 at the server optimizer 130 store a model of the each client dictionary 435. If the content data block is destined for a particular client, the server optimizer 130 may use the model of the respective client dictionary 435 stored in the modeler module 532 to look for matches.

If a match is identified, this indicates that the byte sequence (or the portion of the byte sequence) is already stored local to the client (e.g., in the client's client dictionary 435). In that case, at block 636, all or relevant portions of the content data block may be compressed using the dictionary model (e.g. dictionary indexes). At block 640, the highly compressed version of the content data block may then be unicast to the client. In some embodiments, the content data block is compressed by the server-side deltacast coder 524*b* and communicated as a unicast service flow 525 to the client optimizer 120 via the unicast processors 528.

If no match is found at block 628, one or more types of multicast opportunities are evaluated at block 644. Notably, even when no match is found at block 628, a number of features of the data may be known. For example, it may be assumed, according to blocks 604 and 606, that the data is part of a content set and associated with a Content Set ID. It may be further assumed, according to block 628, that the data does not match data already stored in one or more client dictionaries 435. Based on these assumptions, the data may be assumed to be public-interest content (e.g., as described above) that has not yet been multicast to potentially interested users. Further, according to block 608, the data may already have been determined to be a multicast candidate according to the multicast pre-filter 612, which may constitute at least an initial indication that it would be efficient to multicast the data (e.g., barring other information, such as finding of a match at block 628).

For these and/or other reasons, some embodiments of the method 600 may consider the data to be multicastable without any further analysis. For example, based on the above assumptions, it is determined to be efficient enough to consider the data multicastable without evaluating any further opportunities or information in block 644. Alternatively, embodiments use the evaluations in block 644 to further refine the determination of multicastability of the data. In one embodiment, as described above, all data received at block 602 is assigned a Content Set ID at block 606, even when the Content Set ID sometimes indicates that the data should not be handled at the set level. In block 644, it may be determined that data carrying a Content Set ID that indicates no set-level handling should be handled as unicast data.

Of course, even where it is determined that the data is multicastable, there may still be reasons not to multicast the data or to affect how the data is multicast. As such, when multicast opportunities are evaluated in block 644, a determination may be made at block 648 as to whether multicast opportunities exist and if they should be exploited. For example, even where a multicast opportunity exists, it may be inefficient to spend the resources to exploit the opportunity (e.g., to set up a multicast service flow 515). In one embodiment, the communications system 500 has limited multicast capacity (e.g., a limited number of available multicast service flows). The determination in block 648 may account for the availability of multicast service flows, including, for example, whether it is possible to use up one of the available service flows (or whether it is efficient to use the flow for this traffic at the expense of taking multicast capacity away from other traffic). In another embodiment, the Content Set ID is evaluated in block 648 to determine an appropriate multicast group (e.g., a group of potentially interested users) for the content set. Based on one or more factors (e.g., modcode point(s) needed for reliable multicasting to the multicast group), the data may be unicast, communicated over multiple unicast and/or multicast service flows, etc. to optimize forward-link capacity sharing.

In some embodiments, as described more fully below, an anticipatory content value (ACV) is determined with respect to one or more of the multicast opportunities identified in block 644. In particular, multicast opportunities relating to pre-positioning of content set data may provide certain types of features in various contexts, and reprective ACVs may be determined accordingly.

In one type of embodiment, pre-positioning is used to satisfy explicit requests (e.g., subscriptions) for content sets, though typically not at the time the request is made. For example, users may subscribe to many different types of content sets (e.g., feeds), and pre-positioning may be used to facilitate off-hours (e.g., overnight) multicasting of the content sets to the subscribing users. Subscription data or other information may be used (e.g., by a pre-positioning client, the server optimizer 130, the client optimizer 120, etc.) to determine which users are subscribers, whether to filter content sets, when to pre-position data, etc.

In another type of embodiment, pre-positioning is used to anticipate requests for content sets from users. For example, when one or more users requests a content set, a determination may be made as to whether it would be desirable (e.g., efficient) to communicate the content to other non-requesting users. It may be determined that a non-requesting user is likely to request the content at a later time, and forward link capacity could be saved by anticipatorily multicasting the content to this non-requesting user along with the requesting users.

Notably, these types of embodiments (e.g., satisfying explicit requests, anticipating future requests, etc.) may all relate to anticipatory pre-positioning—both may involve evaluating whether a user will ultimately access the pre-positioned content in a way that will save system resources (e.g., forward-link bandwidth). For example, when satisfying an explicit request for an RSS feed, there may be a very high probability that the user will ultimately request the pre-positioned feed content. Still, the probability may not be one-hundred percent, as even a user that subscribes to an RSS feed may not access the feed every day, and may not access all items pre-positioned as part of the feed.

Further, even when there is a high likelihood of future request by a user, other factors may affect a determination of whether content sets should be pre-positioned. For example, if a user is guaranteed to request a certain content set, but the content set will almost completely change between the time it is pre-positioned and the time it is requested, it may not be cost-effective to pre-position the content set. For these and/or other reasons, embodiments of the ACV represent an analysis of the costs of pre-positioning a content set as compared with the benefits.

In various embodiments, the ACV weighs costs and benefits differently (e.g., depending on certain types of relationships). In one embodiment, the ACV determination is made by a provider of bandwidth over communications links, and the bandwidth provider desires to use the ACV as a measure of compression gain. For example, benefits of pre-positioning may be calculated as a number of times a pre-positioned content set is likely to be accessed after pre-positioning, and costs of pre-positioning may be calculated as a percentage of the content set likely to have changed between each access of the content set: ACV=Number of Content Set Accesses Per Day/(Portion of Content Set Changing Per Access+Amortized Cost of the Initial Download)≈Compression Gain.

In another embodiment, the ACV determination is made by a content service provider. For example, benefits of pre-positioning may relate to revenue from encouraging users to access a content set (e.g., ad revenue), an appearance to users of content availability and speed of access (e.g., goodwill), etc.; and costs of pre-positioning may relate to an opportunity cost of providing one content set over another, license fees for providing the content, etc. Of course, other ACV embodiments are possible, and may be determined according to the same and/or other factors.

The ACV may effectively represent a net value (e.g., benefits less costs) of anticipatorily multicasting a particular content set to a set of users. As such, the ACV generated in block 646 can be used to affect an evaluation of whether to exploit one or more multicast opportunities identified in block 644. At block 648, a determination may be made as to whether identified multicast opportunities should be exploited. Embodiments make this determination at least partially as a function of the ACV generated at block 646. In certain embodiments, additional factors may also affect the determination that are not part of the particular ACV. For example, an ACV may be determined according to a compression gain measure, as described above. In addition to the compression gain, the determination in block 648 may account for such system resource factors as an availability of multicast service flows (or whether it is efficient to use the flow for this traffic at the expense of taking multicast capacity away from other traffic), whether creating or expanding a multicast group for the content set would adversely affect the modcode point(s) needed for reliable communication, etc.

Further, multicast opportunities may be evaluated and fingerprint generation can be tailored in various ways depending on the types of opportunities being evaluated (e.g., the fingerprint may, itself, be a sequence of bytes or part of a more complex system of determining the associated byte sequence). By way of example, the fingerprints may be used in the context of identifying multicast opportunities with current service flows (e.g., to see if content requested by one user is currently being unicast or multicast to other users). To facilitate this type of identification, one embodiment generates maps having keys being the various fingerprints identifying the content data block and payloads that provide data about transfers underway or other useful information.

In certain embodiments, the maps are kept to a reasonable size to avoid unnecessary processing of data. For example, techniques are used to restrict the cases where the fingerprint is added to the map. In one embodiment, protocols that are "uninteresting" are excluded. For example, fingerprints may be created only for protocols known (e.g., predetermined) to be interesting, such as HTTP, certain media download protocols, etc. (e.g., as prefiltered in block 608). In another embodiment, small objects are excluded, as described above with reference to block 608. For example, if the size of the requested object is known (or predictable) in advance, it may be used as a filter—if the object is smaller than some threshold size, the fingerprint is not added to the map. When the object size is unknown (or not practically predictable), embodiments may wait until at least a minimum amount of data has been received, then filter out the noise (e.g., very small objects). Of course, it may be important to avoid delaying the map entry too long, such that it would cause the optimizer to miss a certain match with a new download. In some embodiments, when the download is complete, the fingerprint is removed from the map.

If a determination is made at block 648 that either no multicast opportunities exist, or that the multicast opportunities should not be exploited, the content data block data and/or any related control data is unicast at block 652, where appropriate. In some embodiments, unicasting the data at block 652 involves communicating the data as a unicast service flow 525 to the client optimizer 120 via the unicast processors 528. If a determination is made at block 648 that a multicast opportunity exists and should be exploited, the content data block may be multicast to one or more clients at block 656 (e.g., all users subscribing to a feed, all users deemed to be potentially interested in the content, all clients sharing the forward link, etc.). In some embodiments, multicasting the data at block 656 involves communicating the content block data over one or more multicast service flows 515 to the client optimizer 120 via the multicast processors 530.

In certain embodiments, the fingerprint generated in block 620, or another representation of the data (e.g., the byte sequence itself, a compressed version or a portion of the byte sequence, or a different types of fingerprint) is stored at the server-side for later use by the communications system 500. For example, storage of relevant information may be useful in generating or identifying future multicast opportunities, tracking and/or characterizing network usage, prefetching, etc. Further, embodiments may store the Client Set ID and/or may store the data representation in association with the Client Set ID.

It will be appreciated that, in some embodiments, multicasting or unicasting data is implemented in different ways. For example, in the satellite communications system 200 of FIG. 2, some or all of the receivers (e.g., user systems 110) in a spot beam 235 may inherently be capable of receiving at least a portion of any traffic being sent over the spot beam 235 by virtue of being tuned to the appropriate carrier, able to receive data at the current modcode point, etc.; effectively, the satellite communications system 200 broadcasts everything over the air. As such, as discussed above with reference to FIG. 1B, unicasting or multicasting to one or more user systems 110 may, in fact, involve broadcasting the data over the satellite link and also broadcasting control data to direct receivers to either accept or ignore relevant portions of the broadcast data.

In one illustrative embodiment, it is determined that content requested by one user has a high probability of being accessed by a group of non-requesting users sharing a satellite spot beam on the communications system 500 (e.g., because it is part of a popular content set). The content is broadcast over the satellite link with a stream identifier that designates it as a multicast stream. The stream identifier may be the same as or different from the Content Set ID. Control data is also sent directing user systems 110 associated with the interested users to "listen" to the multicast stream (e.g., to accept, rather than ignore, data with that stream identifier as it is received). In effect, this creates a multicast group of the interested users. In different embodiments, the control data may be communicated to the multicast group either as respective unicast service flows 525 to each client via the unicast processors 528 or as part of a multicast control channel sent over a multicast service flow 515 via the multicast processors 530. It will be appreciated that, for the sake of bandwidth efficiency, embodiments typically send the control data over the multicast control channel. For example, all the user systems 110 may be constantly listening to the multicast control channel to find out (e.g., among other things) which streams they should accept. Of course, other implementations are possible according to various embodiments for unicasting or multicasting the data over various unicast service flows 525 and/or multicast service flows 515 to the client optimizer(s) 120.

Once the data is received at the client optimizer 120, it may be stored at the client-side (e.g., blocks of the data may be stored and indexed by the client dictionary 435). In certain embodiments, storage in the client dictionary 435 ultimately causes a record of the data to be reflected at the server optimizer 130 if a model of the client-side client dictionary 435 is updated (e.g., through synchronization of the modeler module 532). When it is determined in block 648 that the data will be multicast in block 656 (e.g., and/or when the data is determined to be unicast in block 652), the data may be compressed and/or otherwise coded before it is sent over the client-server communication link 125. In one embodiment, the data is zip coded prior to being sent over the client-server communication link 125. When the zipped data is received at the client optimizer 120, the data is added to the client dictionary 435.

It is worth noting that the use of fingerprinting (e.g., and/or other dictionary coding techniques) to make multicasting and related determinations may provide a number of features. One feature is that deltacasting opportunities may be identified and/or exploited even where there is little or no access to certain metadata. For example, as discussed above, the server optimizer generates signatures based on byte level data and does not require knowledge of "header portion" information (e.g., file types, proprietary tags, protocol tags, etc.) to make its determinations.

Another feature is that fingerprinting techniques may allow deltacasting opportunities to be identified, even where the content source or other "header portion" (e.g., metadata) information is different. For example, say viewers are watching the same television show at the same time from different sources (e.g., different television channels are broadcasting the same content, different websites are mirroring the same content, etc.). Fingerprinting techniques can find matching blocks, as the blocks will match even where the content sources are different. Similarly, deltacasting opportunities may be identified even where cache-busting, anonymizer, spoofing, mirroring, and/or other techniques are used (e.g., to alter URLs, to implement content data network (CDN) functionality, etc.).

Still another feature is that deltacasting techniques may be used transparently to preserve communications from the perspective of end users and content sources. In particular, an end user and a content source may effectively experience the same byte-for-byte communications with or without deltacasting. For example, even though requests and/or responses are intercepted according to deltacasting embodiments, when a user requests data from a content source, the content source may ultimately provide the same bytes to the end user as if there were a unicast link between the end user and the content source.

It is also worth noting that embodiments allow substantially transparent optimization of communications while preserving certain legal and business relationships, including, copyright, digital rights management, subscription, and/or other obligations. For example, as discussed above, content data is stored in dictionaries effectively as dissociated blocks of data, such that the content can only be recreated from those blocks using appropriate dictionary references (e.g., indexes). According to various embodiments, those dictionary references are unavailable to clients without a new request from the content source.

In one illustrative embodiment, a first user watches a movie through a popular video-on-demand website by logging into the website using credentials (e.g., a user name and password) and viewing the movie through an embedded player surrounded by banner advertisements. Based on one or more determinations discussed above, the content set for the website is multicast to the first (requesting) user and to a second (non-requesting) user, and is stored in the second user's client dictionary 435. The second user's client dictionary 435 may now include data blocks from a movie that includes copyrighted material, from a web session authenticated according to another user's credentials, from advertisements that may be cycled and/or tracked, from web objects that are designated in metadata as "un-cacheable" etc. As discussed above, embodiments of the client dictionary 435 store the data blocks in such a way that it may be effectively impossible for the first user to access the movie content directly from the client dictionary 435.

Instead, if the second user later requests the movie, the second user's experience may be much the same as that of the first user (e.g., and much the same as it would have been had the data not been stored in the client dictionary 435). For example, the second user may still visit the website using a web browser and may still log in with credentials. If authorized, the second user may still request an authorized, licensed copy of the movie file from the website, which may then be viewed in the embedded player surrounded by banner advertisements. However, as the data is received in response to the request, deltacasting techniques are used to fingerprint the data and identify the data as already being stored in the second user's client dictionary 435. The data may then be communicated to the second user accordingly, for example, by highly compressing the data according to a model of the client dictionary 435 stored at the server side of the communications system 500 (e.g., the client dictionary model 632).

As such, the use of deltacasting techniques may preserve legal and other obligations for content transactions. In the above example, the second user is unable to access copyright and/or unauthorized material from the client dictionary 435. Further, forcing the second user to access the content as intended by the content provider (e.g., through the provider's website) may allow the content provider to preserve advertising, hosting, and/or other relationships. For example, if the content provider happens to offer an advertisement that is already stored in the client dictionary, the advertisement may still be requested over the content network link 135 (e.g., thereby providing any associated advertisement tracking, revenue, etc.) while also being highly compressed over the client-server communications link 125.

It will now be appreciated that use of deltacasting techniques to identify and/or exploit multicasting opportunities provides certain features. However, using only the byte-level information may provide little or no content awareness. As such, according to various embodiments, deltacasting techniques are used to handle data blocks traversing the communications stem 500 according to their byte-level data (e.g., transparently and/or agnostically), and certain blocks are characterized as parts of content sets and handled accordingly to provide set-level awareness. For example, as described above, embodiments may implement a transparent optimizer that can perform set-level handling even with a dictionary of substantially unordered data blocks and with little or no knowledge of what content those blocks represent.

In one illustrative embodiment, a user requests a popular webpage, and the response includes blocks of data relating to a number of different types of content originating from a number of different content sources. The optimizer components (e.g., the server optimizer 130) treat each block effectively as a meaningless sequence of bytes, such that fingerprints are generated and some or all multicasting determinations are made with little or no consideration of what the byte sequence represents (e.g., its metadata, file type, etc.). For example, the optimizer components may function without determining whether the response data includes five or fifty separate objects; whether the objects are of certain types; whether the objects were retrieved from one or more content sources; whether cache busting, anonymizer, spoofing, and/or other techniques were used, whether there is any authentication requirement for accessing the data, etc. Even without this knowledge, however, if the popular webpage is determined to be a content set (e.g., as described above), the byte sequence can be handled as part of its respective content set.

The set-level handling may provide a number of different types of functionality. One type of functionality relates to identifying and exploiting content popularity and related metrics. Even without an object-level awareness of the content traversing the communications system 500 (e.g., without an awareness of which content objects are represented by the blocks of data stored at the client dictionaries, etc.), popularity and/or other metrics can be evaluated at the set level. For example, as discussed above, a list of popular webpages or feeds may be maintained, various statistics may be gathered, etc. The metrics may be used for many types of applications, including for web tracking (e.g., for reporting web traffic statistics), finding usage correlations between users, satisfying subscriptions (e.g., where users have subscribed to a particular feed), etc.

Another type of functionality relates to storage management. For example, a user may set preferences (e.g., or have preferences set by a service provider, have preferences dynamically adjusted according to usage or other factors, etc.) as to storage capacity designated for certain types of use. In one embodiment, a user selects a number of feeds and/or websites to be automatically updated by a pre-positioning client. Each feed or website may be associated with a bin (e.g., space within the user's client dictionary 435) having a designated capacity. Similarly, a service provider may set certain bins in the client dictionary 435 for pre-positioning certain types of data that is likely to be requested by users. For example, the first Megabyte of data for the top one-hundred movie downloads of the day may be anticipatorily multicast to all users and stored in a designated bin in their respective client dictionaries 435.

Still another type of functionality relates to using set-level awareness to maintain a high-level awareness of the contents of a client dictionary 435. In one embodiment, a browser plug-in may be provided that augments the user's web browsing experience according to high-level awareness of dictionary contents. For example, when a result of a web search points to a webpage stored as a content set in the client dictionary 435, the search result listing may indicate as such (e.g., the result may be displayed in a different color, highlighted or flagged, listed separately, priced differently, etc.). Similarly, other types of content interfaces (e.g., media players, feed readers, applets, etc.) may be configured to provide the user or any other entity with a set-level indication of client dictionary 435 contents.

In another embodiment, the set-level awareness is used to affect a relationship between the user and a service or content provider. For example, the user may contract with a service provider according to a Fair Access Policy (FAP), which designates resource usage policies for the user (e.g., the amount of download bandwidth a user is allowed over each 24-hour period). In one embodiment, users are encouraged to use locally stored data by providing a set-level indication of the client dictionary 435 contents and treating requests for the content as FAP-free or FAP-discounted (e.g., less bandwidth is used to satisfy the content set request, and the FAP hit for requesting the content is adjusted accordingly).

Yet another type of functionality relates to using set-level awareness to police content set determinations. In some cases, even where a content set is identified, it may be handled differently according to how the content set is sourced by content sources, used by users, etc. In one example, it is determined that each time a popular webpage is requested, over ninety-percent of the content set associated with the website is changed (e.g., the website shows the most popular movie download across the web at the time the request is made, such that the content set may significantly change for each subsequent request). The optimizer components may be unaware of which part of the content set is changing (e.g., because of a lack of object-level awareness), but the content set-level changes may nonetheless be determined to be so significant as to outweigh any efficiencies gained through further set-level handling. For example, in this and other cases, policing the content set may cause it to be removed from a list of pre-positioning sets, to not be indicated as available in the client dictionary 435, to not be offered as FAP-free or FAP-discounted, etc.

It will be appreciated from the above systems, methods, features, etc. that set-level awareness in the deltacasting context many types of content sets are possible and set-level handling can be implemented in many ways to provide many types of functionality, according to various embodiments. In particular, some embodiments can use content set based deltacasting techniques to facilitate anticipatory pre-positioning of content local to clients of a communications system. For example, various factors, including some relating to set-level awareness, may be used to determine (e.g., according to a cost-benefit analysis) whether it is efficient to anticipatorily multicast content to users.

In some embodiments, anticipatory multicasting determinations are facilitated by functionality of a pre-positioning client. FIG. 7A shows a simplified block diagram of a communications system 700a having an illustrative server-side pre-positioning client 720, according to various embodiments. The communications system 700a facilitates communications between a user system 110 and content servers 150 via a client optimizer 120, a server optimizer 130, a pre-positioning client 720, and a network 140. The client optimizer 120 and the server optimizer 130 are configured to effectively provide an optimizer tunnel 105 between the user system 110 and the content server 150.

In some embodiments, the pre-positioning client 720 is in a server system 220 at the server-side of the communications system 700a, along with, and in communication with, the server optimizer 130. In some embodiments, the server optimizer 130 is the server optimizer 130 of FIG. 5. As shown, however, embodiments of the client optimizer 120 include additional functionality implemented by a content set processor 740, which may, in some embodiments, be in communication with subscription data 730. As described more fully below, the pre-positioning client 720 may be a server-side or a client-side proxy or other component having links into the client optimizer 120 (e.g., and the server optimizer 130 in some embodiments). Some embodiments of the user system 110 implement a portal viewer 750. Embodiments of the portal viewer 750 are implemented as part of the client GUI 512 or the web browser 514 of FIG. 5.

Embodiments of the communications system 700a facilitate communication of content set data 710 from content servers 150 to user systems 110. Many of the descriptions herein of pre-positioning functionality are described in the context of feeds (e.g., RSS feeds) having channels and items, and to which users may have subscribed. However, these descriptions are intended only as examples and should not be construed as limiting the scope of the embodiments. Rather, the content set data 710 may typically include data from any type of content set in any content set format. For example, the content set data 710 may include really simple syndication (RSS) feeds with channels and items, webpages with associated web objects, etc. Further, while some embodiments are described herein in the context of pre-positioning (e.g., using pre-positioning clients 720, etc.), other embodiments may communicate content set data 710 to user systems 110 as a result of many other different types of triggering events (e.g., requests of links by users, requests from servers, pushes from content sources, etc.).

Even further, some embodiments are described with reference to subscription data 730, illustrated as being stored at the user system 110. In fact, the subscription data 730 should be construed to include any type of explicit indication (e.g., to the pre-positioning client 720) of a user's desire to receive particular content set data. For example, the subscription data 730 may be provided by a user (e.g., through a portal or by another method), generated by monitoring user activity, etc.

According to embodiments illustrated by FIG. 7A, the communications system 700a may pre-position content set data 710 at user system 110 to improve the efficiency of the communications system 700a (e.g., bandwidth usage). In some embodiments, the communications system 700a is configured to make available a set of content sets. For example, one thousand feed channels (content sets) are made available—five-hundred channels are reserved for content-provider-generated channels generated by content providers over the network 140 (e.g., "News.com Headlines"), three-hundred channels are reserved for user-created channels generated by one or more users of communications system 700a services (e.g., "John and Sally's Favorite Videos on the Web"), and the remaining two-hundred channels are reserved for service-provider-generated channels generated by one or more providers of communications services over the communications system 700a (e.g., a "Sports Headlines" channel that includes a culled list of items from multiple related content-provider-generated channels).

Users may subscribe to one or more of these channels (e.g., through the portal viewer 750), resulting in a set of subscription data 730 for the user of user system 110. In some embodiments, additional filtering is provided by the subscription data 730. For example, a user may specify further filtering preferences (e.g., subscribe to the "Sports Highlights" channel, but filter for items relating to "Denver Broncos"), time to live preferences (e.g., consider "World News Headlines" channel items stale after twelve hours), bin size preferences (e.g., allot 25 Gigabytes of storage space to "Viral Videos" channel), etc. In other embodiments, additional subscriptions and/or filtering preferences may be generated, stored, controlled, and/or dictated by other components of the communications system 700a. For example, the pre-positioning client 720 may determine that a particular channel is popular enough to warrant pre-positioning the channel to all users, regardless of user-provided subscription data 730.

In some embodiments, users ultimately interact with the content set data 710 through the portal viewer 750. In one embodiment, the content set data 710 is a set of RSS feeds, and the portal viewer 750 is an RSS reader. In another embodiments, the content set data 710 is a webpage and the portal viewer 750 is a web browser. The portal viewer 750 may use metadata, and/or other sources of descriptive information, to build a GUI for the user or to otherwise indicate relevant set-level information to the user. For example, the portal viewer 750 may structure the content set data 710 as separate channel areas, each having regions for displaying respective logos, descriptions, and/or other channel information. Items associated with each channel may be subordinated under their respective channels.

Embodiments of the pre-positioning client 720 may receive content set data 710 from content providers 150 (e.g., over the network 140). The pre-positioning client 720 communicates portions of the content set data 710 to the client optimizer 120, typically via the server optimizer 130. As described in more detail below, various techniques are used to determine whether it is appropriate (e.g., efficient) to anticipatorily multicast and pre-position the content set data 710 to one or more non-requesting user systems 110. In some embodiments, the anticipatory pre-positioning determination is made completely or partially by the pre-positioning client 720.

In certain embodiments, deltacasting techniques are used to transparently send the content set data 710 to user systems 110. The client optimizer 120 may receive the content set data 710 and process the content set data 710 using the content set processor 740. Embodiments of the content set processor 740 process the content set data 710 at least partially according to the subscription data 730. For example, the content set processor 740 may determine according to the subscription data 730 that a user of the user system 110 wants a certain item from a certain channel. The item may be pre-positioned (e.g., anticipatorily stored) at the user system 110.

The portal viewer 750 may also be updated according to the processed content set data 710 (e.g., according to subscription data and/or descriptive data associated with the content set, where applicable). For example, a user subscribes to a content-provider-generated "World News" channel that is filtered both by the pre-positioning client 720 (e.g., to pre-position only the most popular items) and by the content set processor 740 (e.g., to prioritize items containing the keyword "Canada"). The portal viewer 750 may show the user a channel titled "My World News" that includes only those items from the "World News" channel that meet all the filter criteria.

Various embodiments of the communications system 700*a* are implemented with different topologies. In some embodiments, many pre-positioning clients 720 run (e.g., in parallel) to provide certain functionality. For example, a video hosting website is configured so that approximately one minute is required to download each one minute of video from items on its content set channel, regardless of bandwidth, bit rate, etc. If a single pre-positioning client 720 were to pre-position three hours-worth of video from this channel, the pre-positioning client 720 would be tied up for approximately three hours. In embodiments having multiple parallel pre-positioning clients 720, one pre-positioning client 720 may be used to pre-position video data from that channel, while other pre-positioning clients 720 continue to pre-position content set data 710 from other channels.

In other embodiments, the pre-positioning client 720 is located at the client-side, rather than at the server-side, of the communications system 700*a*. FIG. 7B shows a simplified block diagram of a communications system 700*b* having a client-side pre-positioning client 720 for use with various content set-based embodiments. Components of the communications system 700*b* of FIG. 7B may be substantially the same as the respective components of communications system 700*a* of FIG. 7A.

One difference between the implementations of FIGS. 7A and 7B is in the data flow between the server optimizer 130, the client optimizer 120, and the pre-positioning client 720, particularly over the client-server communication link 125. According to embodiments of the communications system 700*a* of FIG. 7A, the server optimizer 130 and the pre-positioning client 720 may communicate substantially directly on the server-side of the communications system 700*a*. All pre-positioning decisions may be made at the server system 220, and the pre-positioning client 720 may communicate pre-positioning directions locally to the server optimizer 130. Further, the client optimizer 120 may be configured to handle certain transport functions, such as communicating across the client-server communication link 125 whether packets were successfully received by the client optimizer 120.

According to embodiments of the communications system 700*b* of FIG. 7B, the server optimizer 130 and the pre-positioning client 720 may communicate only across the client-server communication link 125, but the pre-positioning client 720 may communicate with the client optimizer 120 substantially directly on the client-side of the communications system 700*b*. Pre-positioning decisions may be made at the user system 110, and the pre-positioning client 720 may then have to communicate pre-positioning directions across the client-server communication link 125 to the server optimizer 130. Further, the pre-positioning client 720 may be configured to handle certain transport functions, such as communicating across the client-server communication link 125 whether packets were successfully received by the client optimizer 120.

The system embodiments shown in FIGS. 7A and 7B represent only two types of topologies for implementing pre-positioning functionality. Other functional blocks may be included, components may be relocated, and/or other modifications may be made to the communications systems 700 without departing from the scope of the invention. Further, embodiments may provide different types of pre-positioning functionality for different contexts. For example, pre-positioning may be used to satisfy explicit requests for content sets (e.g., according to subscription data 730), to anticipate future requests for content sets, and/or in other contexts where forward link capacity could be saved by anticipatorily multicasting content sets to non-requesting users.

Figure 8:
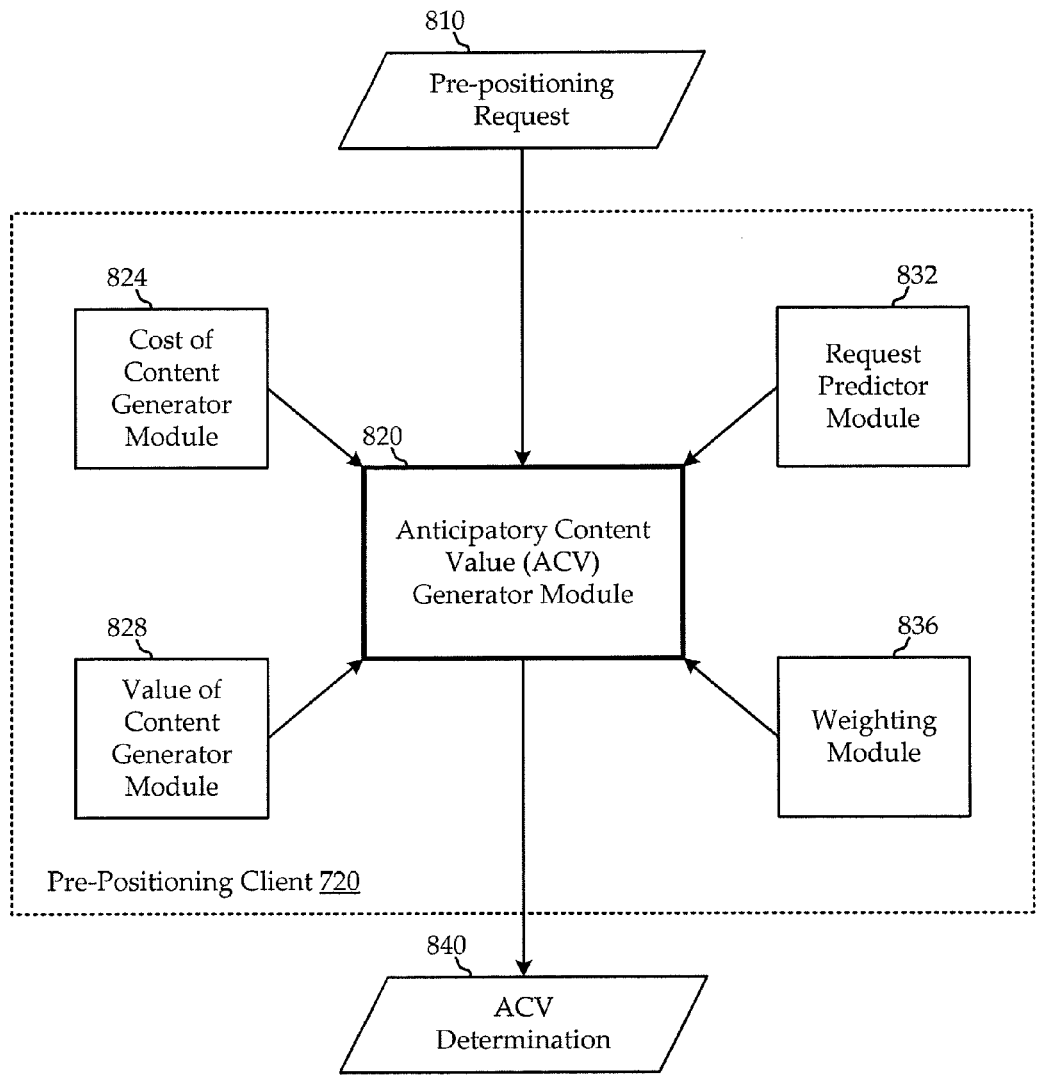
FIG. 8 shows a functional block diagram of an embodiment of an anticipatory content value (ACV) generator module, implemented in a pre-positioning client, according to various embodiments.

As discussed above (e.g., with reference to blocks 644, 646, and 648 of the method 600 of FIG. 6), pre-positioning determinations involve determination of an ACV, which may be implemented by an ACV generator. FIG. 8 shows a functional block diagram of an embodiment of an ACV generator module 820, implemented in a pre-positioning client 720, according to various embodiments. Implementation of the ACV generator module 820 in the pre-positioning client 720 is intended merely to be illustrative, and other embodiments of ACV generator modules 820 may be implemented in any other useful location in a communications system (e.g., in the client optimizer 120, in the server optimizer 130, etc.).

Embodiments of the ACV generator module 820 receive a pre-positioning request 810 and output an ACV determination 840. The type and content of the pre-positioning request 810 may be different, depending, for example, on the pre-positioning context, the type of content set, etc. In one embodiment, the pre-positioning request 810 is a directive from the pre-positioning client 720 to begin a pre-positioning routine. This directive may be issued by the pre-positioning client 720, or from some other component in communication with the pre-positioning client 720 (e.g., the server optimizer 130), as a result of any useful type of trigger event. For example, the trigger event may be a particular time of day (e.g., the pre-positioning routine begins every night at 2:00 am), a particular system load (e.g., when a certain amount of excess capacity is detected on a shared link), etc.

In another embodiment, the pre-positioning request 810 occurs as part of a multicast determination. For example, at block 644 of the method 600 of FIG. 6, evaluating multicasting opportunities according to a content set includes issuing a pre-positioning request 810 to generate an ACV determination 840 at block 646 of the method 600. The ACV determination 840 may then be used to influence the determination in block 648 of the method 600 of FIG. 6 as to whether to exploit the multicast opportunity.

In various embodiments, the ACV generator module 820 is in communication with a cost of content generator module 824, a value of content generator module 828, a request predictor module 832, and/or a weighting module 836. Embodiments of the cost of content generator module 824 may evaluate parameters, including costs relating to licensing the content, using channel capacity (e.g., a cost of dedicating bandwidth to a multicast channel, rather than a unicast channel, the cost of supporting the bandwidth in the spot beam, etc.), using server-side or client-side storage capacity (e.g., a cost of storing content at the server system 220, at the user system 110, etc.), a likelihood of the content changing over time (e.g., how much of the content set will change between the time it is pre-positioned and the time it is requested), etc. Embodiments of the value of content generator module 828 may evaluate parameters, including an objective and/or subjective determination of users' willingness to pay for the content, the potential effect of the content on the user's experience of using satellite communications services, etc. Embodiments of the request predictor module 832 may evaluate parameters, including probabilities relating to future requests for the particular content by particular users over specific times, etc.

Embodiments of the weighting module 836 may generate weighting factors to apply to parameters evaluated by the other modules. For example, channel capacity may be a significantly more important consideration than client dictionary capacity, and may be weighted accordingly by the weighting module 836. In some embodiments, the weighting module 836 generates additional or alternate weightings based on factors, such as an ability of a user system 110 to exploit characteristics of a local area network ("LAN") or an enterprise arrangement. For example, these factors may be determined (e.g., set) by a particular entity generating the ACV, as described above, to tune the ACV to meet their goals.

Embodiments of the pre-positioning client 720 use data from some or all of these modules to formulate an appropriate ACV determination 840. Other components of a communications system may then perform functions according to the ACV determination 840. For example, a server system 220 (e.g., components of the server system 220 of FIG. 2, the server optimizer 130 of FIG. 5, etc.) may use the ACV determination 840 in making multicast determinations, user grouping determinations, modcode selection determinations, FAP accounting determinations, etc.

Figure 9:
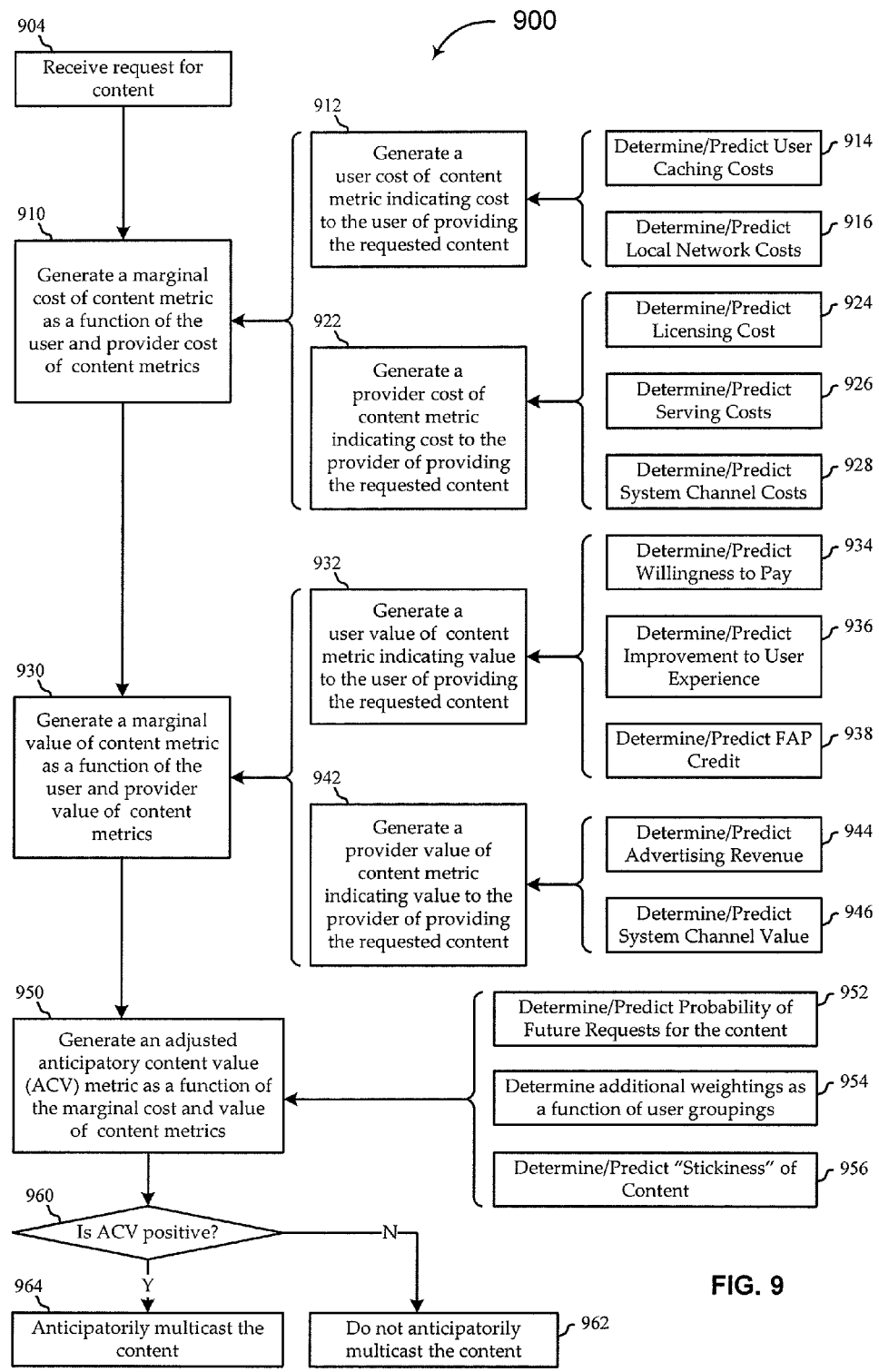
FIG. 9 shows an illustrative flow diagram of a method for making ACV determinations from a server-side perspective, according to various embodiments.
Figure 10:
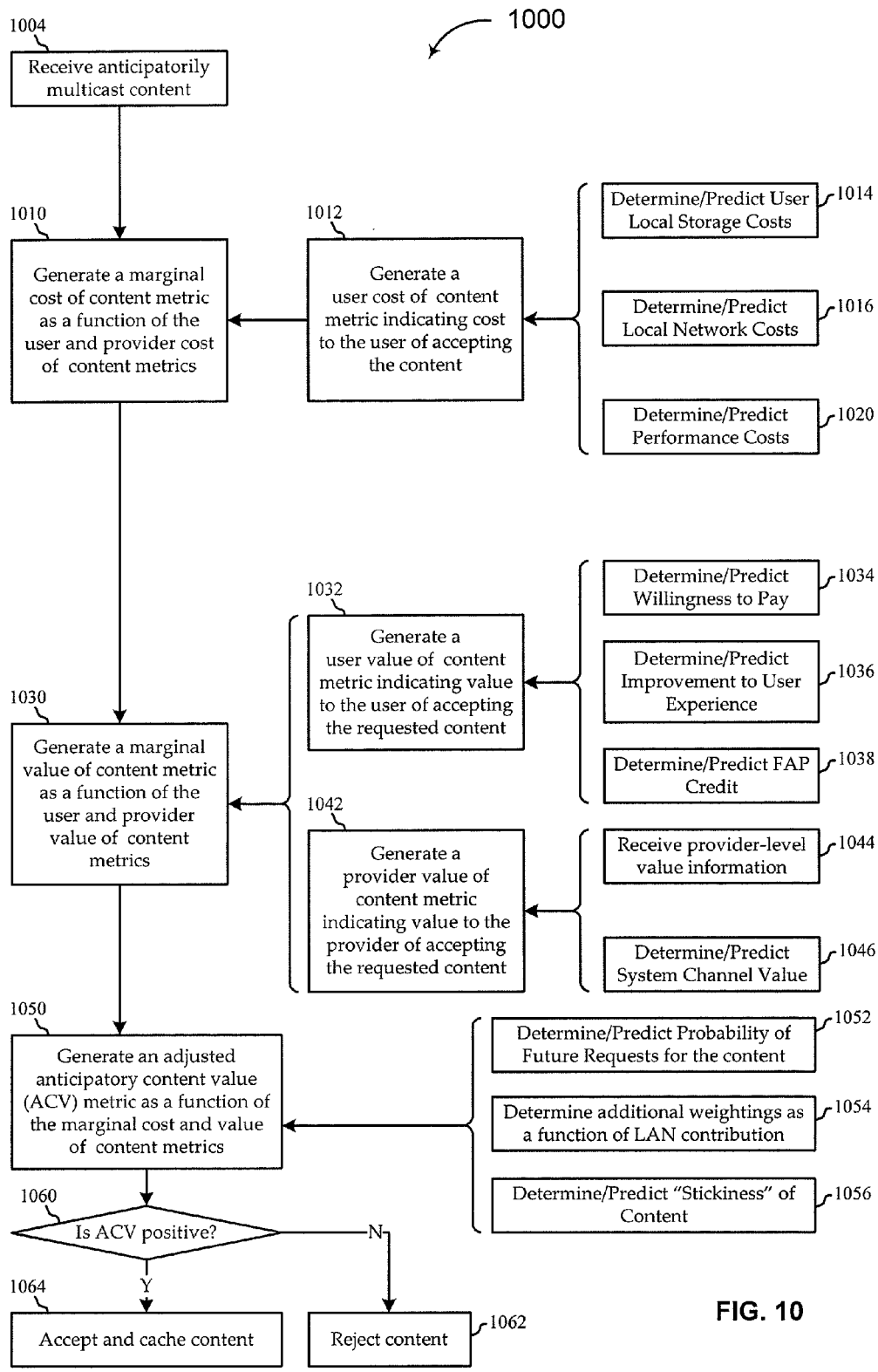
FIG. 10 shows an illustrative flow diagram of a method for making ACV determinations from a client-side perspective, according to various embodiments.

Functionality of the ACV generator module 820 will be further appreciated through FIGS. 9 and 10, which show various embodiments of methods for making ACV determinations from a server-side perspective (e.g., by a server-side pre-positioning client 720) or from a client-side perspective (e.g., by a client-side pre-positioning client 720), respectively. FIG. 9 shows an illustrative flow diagram of a method 900 for making ACV determinations from a server-side perspective, according to various embodiments. The method 900 begins at block 904 by receiving a pre-positioning request (e.g., the pre-positioning request 804 of FIG. 8).

At block 910, a marginal cost of content metric is generated (e.g., by the cost of content generator module 824 of FIG. 8). In some embodiments, the marginal cost of content metric is generated at block 910 by accounting for both user costs at block 912 and provider costs at block 922. It is worth noting that, where there is an actual request for a content set, embodiments of the method 900 are configured such that the ACV will always come out in favor of communicating the content set to those requesting users. Embodiments of the method 900 are described as determining whether or not to also communicate the content to non-requesting users in anticipation of future requests by those non-requesting users. As such, references to "users" in the context of the method 900 intend to refer to one or more non-requesting users (e.g., that share a forward link with each other and/or with any requesting users).

At block 912, a user cost of content metric is generated, indicating one or more costs the user may incur if the content is provided to the user. In some embodiments, generating the user cost of content metric includes determining or predicting the cost to the user of storing the content at block 914 (e.g., in the client dictionary). The cost evaluated at block 914 may be a function of the size of the content file and/or the size of the user's local storage (e.g., total remaining capacity, capacity of a particular bin associated with the content set, etc). In one embodiment, information is maintained at the server system 220 to monitor client-side storage capacity (e.g., as part of the client dictionary model, etc.). For example, users may opt to have large bins to store large amounts of anticipatory content. Extensive local storage may provide the user with certain benefits, like apparently faster access to the pre-positioned content, certain contractual benefits (e.g., a service provider may reward the user for allowing anticipatory caching of content sets through FAP discounts, reduced advertising, etc.), etc.

In some embodiments, generating the user cost of content metric at block 912 includes determining or predicting costs to the user's local network at block 916. The cost evaluated at block 916 may relate to functional capabilities of the user's user terminal 230 or CPE 260, characteristics of a LAN, etc. In one embodiment, the cost to the user's local network is affected by extra processing required by the user system 110 to evaluate the anticipatory content. For example, upon receipt, the user system 110 may have to evaluate (e.g., demodulate, parse, etc.) the service flow along with multiple other service flows to determine whether to accept or reject the content and/or how to route the content (e.g., to a CPE 260). In another embodiment, the cost to the user's local network is affected by characteristics of a LAN (e.g., or WAN, or other network) of which the user is a part.

In still another embodiment, the cost to the user's local network is affected by use of bandwidth or FAP allocated to that user. For example, service providers may not count pre-positioning bandwidth against bandwidth or FAP allocated to the user for normal usage of the communications system, particularly when the pre-positioning is purely anticipatory. Rather, the user may only be "charged" for the pre-positioned content when the content is actually requested and accessed by the user. In various embodiments, when the user ultimately accesses the pre-positioned content, the user may be charged as if the content had not been pre-positioned (e.g., compression benefits to the system are not passed on to the end consumer) or according to the pre-positioning (e.g., pre-positioned content is given an FAP discount).

At block 922, a provider cost of content metric is generated, indicating one or more costs the provider may incur if the content is provided to the user. In some embodiments, generating the provider cost of content metric includes determining or predicting costs the provider may incur in licensing the content at block 924. For example, the provider may have to pay a license fee for each user that receives the content. Of course, as described above (e.g., with respect to FIG. 12), content may be provided to users in such a way as to be inaccessible to the user until an actual request is received. In these and other similar circumstances, it may be possible for the provider to contract for the content so as to pay license fees only for actual requests (i.e., not for anticipatory communications). It will be appreciated that "licensing" may be broadly construed to include any types of arrangements between a provider of communication services and a provider of content. For example, the content may be purchased, leased, assigned, etc., according to various embodiments.

As noted above, use of deltacasting techniques (e.g., storage of content as dissociated byte sequences in the client dictionary, rather than in an object cache) may preserve some of the licensing and other content relationships of the provider. For example, each time a user requests the pre-positioned content, a request may still be made to the content source, and the pre-positioned content may be used only to provide compression benefits (e.g., the content is not served from a local cache). As such, content providers may be able to account for the requests, so that licensing fees are only charged for the content that is actually requested (i.e., not just anticipatorily pre-positioned).

In some embodiments, generating the provider cost of content metric includes determining or predicting costs the provider may incur in serving the content at block 926. In certain embodiments, server usage costs the provider. For example, the provider may directly incur server costs from leasing server space, or may indirectly incur server costs as a function of opportunity cost (e.g., data that could be stored at the server if the content at issue were not stored there). The cost of serving the content may further be affected by bandwidth usage between the content server and the provider, if the content server is located remote to the server system 220 (e.g., as server space leased from a provider on the "cloud").

In some embodiments, generating the provider cost of content metric includes determining or predicting costs the provider may incur as a result of using channel capacity (e.g., bandwidth) to anticipatorily communicate the content at block 928. For example, some embodiments of communications systems may have actual or effective limits on the number of service flows supported, on the number of service flows that can be multicast service flows, on which forward links (e.g., carriers, spot beams, etc.) are available for communicating with a given user, etc. These types of channel characteristics may affect the cost of multicasting the content to a non-requesting user. In some embodiments, the cost of channel capacity is affected by determinations of whether the content can be compressed, scalably encoded (e.g., by using base layers and enhancement layers, etc.), or made to more optimally use bandwidth by other techniques.

In other embodiments, grouping users in certain ways may affect the cost of channel capacity. In certain embodiments, users are grouped to optimize the modcode that can be used for the multicast service flow, which may allow optimized bandwidth usage (e.g., less average overhead per frame for robust communication). For example, some or all of the user base of a communications system may be grouped by certain characteristics, like link conditions. In one embodiment, components determine that a group of users can effectively handle higher throughput (e.g., due to an FAP that allows higher bandwidth usage, due to more reliable communication links that allow for modcodes with larger payload per packet, etc.), and may group the users accordingly.

Typically, a multicast stream may be adaptively coded and/or modulated to be received by the worst-case user system 110 (e.g., the user system 110 manifesting the highest average packet loss). By grouping users as a function of certain link conditions, it may be possible to increase the overall throughput of the system by communicating with certain groups of users at higher modcodes, and with other groups of users at lower modcodes (e.g., using a multi-carrier approach, or multiple multicast service flows). It is worth noting that pre-positioned data may typically be locally stored in anticipation of future requests, and compression benefits may be achieved even where some of the pre-positioned packets are not received by non-requesting users. As such, it may be desirable to communicate content sets at modcodes likely to result in packet loss by some of the non-requesting users. For example, a user that loses some packets may still get compression benefits from any packets that are received and stored in the client dictionary.

In other embodiments, user groupings are determined according to content set preferences. As described above, content set preferences may be derived in a number of ways. In certain embodiments, subscription information is provided by users and stored in association with those users. In other embodiments, other types of preferences may be derived from the subscription information or from usage habits. In one example, it may be predicted that a first fan who subscribes to ten different NASCAR-related content feeds is likely to request a popular new NASCAR movie that is not available through any of the feeds. In another example, a second fan who clicks on a link to a popular NASCAR website almost every day may be grouped with the first fan, such that certain downloads by the first fan are considered likely to be requested by the second fan. Similarly, a user determined to receive iTunes updates may be grouped with other users determined to receive substantially the same iTunes updates.

It will be appreciated that many types of groupings are possible, and the groupings may be used in many different ways. For example, content providers may provide the group of NASCAR fans with certain NASCAR-related programming, different content listings, advertisements, and specials for NASCAR merchandise, etc. Similarly, content providers may determine that NASCAR fans are likely to request a certain genre of on-demand movies. The groupings may also be used for other types of predictions. For example, link demand may be shifted in anticipation of a likelihood of the group of iTunes users downloading the latest patch for iTunes, or NASCAR fans tuning into a highly publicized race.

As described above, the user cost of content generated in block 912 and the provider cost of content generated in block 922 are used to generate the marginal cost of content metric in block 910. At block 930, a marginal value of content metric is generated (e.g., by the value of content generator module 828 of FIG. 8). In some embodiments, the marginal value of content metric is generated at block 930 by accounting for both user values at block 932 and provider values at block 942.

At block 932, a user value of content metric is generated, indicating one or more benefits the user may incur if the content is provided to the user. In some embodiments, generating the user value of content metric includes determining or predicting the user's willingness to pay at block 934. It is worth noting that the willingness to pay may include one or more objective or subjective determinations intended to determine the value a user places on the content. For example, a user may be willing to pay more for on-demand new-release movies than for long-tail content. In various embodiments, the willingness to pay may be determined as a function of characteristics of the specific user (e.g., viewing habits, preference settings, etc.), of a "typical" user (e.g., a profile of a paradigmatic user based on geography, demographics, time of day, type of equipment or service, etc.), of user groupings (e.g., grouped according to service contracts, preferences, social networking groups, etc.), etc.

In some embodiments, generating the user value of content metric includes determining or predicting, at block 936, improvements to the user's experience as a result of providing the content to the user. For example, anticipatorily multicast data may typically be received by a user and locally stored without the knowledge of the user. If the user ultimately does request the content, it may be compressed according to pre-positioned data blocks stored in the user's client dictionary. As such, the user may experience an apparent improvement in speed and network experience than had the content not been pre-positioned.

In some embodiments, generating the user value of content metric includes determining or predicting, at block 938, any available FAP credits or other service benefits to the user as a result of providing the content to the user. For example, anticipatory multicasting and caching of content may give more control to the service provider(s) over scheduling links, oversubscribing bandwidth, load balancing, etc. In some cases, this may effectively reduce certain costs of service provision. Various techniques are possible according to various embodiments for redeeming these cost reductions or passing them on to the customer. For example, contractual provisions may reduce service rates for customers that opt to have large local dictionaries, FAP accounting may be different for use of pre-positioned content, etc.

In certain embodiments, users are provided with some visibility into the pre-positioning, and may use that information to optimize their own value. For example, as described above, users may experience augmented browsing functionality, portal viewer functionality, etc., according to set-level awareness of dictionary contents. In one embodiment, an electronic program guide provided to the user shows a list of available on-demand movies, where non-pre-positioned movies are priced at $8.99 and pre-positioned movies are priced at $1.99. Of course, the user may or may not be made aware of any relationship between the pricing and the presence or absence of the data in the client dictionary.

At block 942, a provider value of content metric is generated, indicating one or more benefits the provider may incur if the content is provided to the non-requesting user. In some embodiments, generating the provider value of content metric includes determining or predicting advertising revenue that may be generated from the provision of the content at block 944. For example, advertisers may pay to have the content provided to users. In certain embodiments, advertising revenue is affected by whether the destination user is a requesting or a non-requesting user, advertisement content may change depending on whether users will be viewing the content substantially upon receipt or storing the content in anticipation of a future request. In one embodiment, advertising revenue is not assessed until an actual request for the content is received.

In some embodiments, generating the provider value of content metric includes determining or predicting the value to system channel capacity that may be generated from the provision of the content at block 946. For example, as described above with reference to block 928, various channel characteristics may affect the cost of multicasting the content to a non-requesting user. The same or other characteristics may also affect the value of anticipatory multicasting to the communications system. For example, channel capacity may be optimized through techniques, including grouping users, compressing or scalably encoding content, time shifting content delivery (e.g., to times when the channel is being underutilized), load balancing, oversubscription of capacity, etc.

As described above, the user value of content generated in block 932 and the provider value of content generated in block 942 are used to generate the marginal value of content metric in block 930. The marginal value of content metric generated in block 930 and the marginal cost of content metric generated in block 910 are used to generate an ACV metric (e.g., using the ACV generator module 820 of FIG. 8). In various embodiments, other factors are used to adjust the ACV metric.

In some embodiments, the ACV metric is adjusted as a function of a probabilistic determination, made at block 952. The probabilistic determination seeks to determine a likelihood that the content at issue will ultimately be requested by a non-requesting user. It will be appreciated that there may be greater overall value to anticipatorily multicasting the content (e.g., to either or both of the provider and the user) when there is a high probability that the content will be later requested by the user. For example, as described above, pre-positioning content sets according to user subscriptions may increase the probability that the pre-positioned content set will be requested by the user. It will also be appreciated that this determination at block 952 may be implemented as part of another determination (e.g., as part of determining the user's willingness to pay in block 934 or as part of generating the provider value of content metric in block 942).

In some embodiments, the ACV metric is adjusted as a function of one or more weightings relating to user groupings. For example, in one embodiment, the marginal cost and value metrics generated in blocks 910 and 930, respectively, are determined at a single-user level. This may allow processing to be implemented more easily and rapidly. The results may then be adjusted as a function of results of other users (e.g., in a particular group of users) to further optimize the ACV determination. In other embodiments, the ACV metric is adjusted at block 954 by grouping users when users are part of a subnet (e.g., a LAN), part of an enterprise service contract (e.g., users are branch offices of an enterprise customer), etc.

In some embodiments, the ACV metric is adjusted at block 956 by determining or predicting the "stickiness" of the content being evaluated. The stickiness of content may relate to a number of different types of content characteristics, including the likelihood of the content to change over time (e.g., the "freshness" of the content). It may be more valuable to anticipatorily multicast content that will stay substantially static between the time it is anticipatorily communicated and the time it is likely to be actually requested. For example, data representing a particular on-demand movie is highly unlikely to change over time. The stickiness of content may also relate to factors, such as, whether the content is predicted to be requested for long periods of time.

In the embodiment of FIG. 9, the ACV metric generated at block 950 is assumed to be positive when the value outweighs the cost and negative when the cost outweighs the value. It is worth noting, however, that many other types of ACV metric are possible according to other embodiments. For example, the ACV metric may be positive when the cost outweighs the value, positive only when the cost outweighs the value by a certain amount, etc. Alternatively, the ACV metric may always be a value ranging from "0" to "100," where a higher value indicates a higher anticipatory content value. In one embodiment, each factor of the various determinations is normalized and/or weighted, such that each of the marginal cost and value metrics generated in blocks 910 and 930, respectively, indicates a normalized score (e.g., the marginal cost metric and marginal value metric are on comparable scales). The metrics may then be re-weighted, added, compared, or otherwise processed to generate the ACV metric.

In some embodiments, a determination is made at block 960 of whether the ACV metric is positive. At block 962, where the ACV metric is not positive (i.e., where the cost of anticipatorily multicasting the content to the non-requesting user outweighs the benefit), the content is not anticipatorily multicast to the non-requesting user(s). In certain embodiments, the method 900 is aborted or otherwise terminated at that point. At block 964, where the ACV metric is positive (i.e., where the value of anticipatorily multicasting the content to the non-requesting user outweighs the cost), the content may be anticipatorily multicast to the non-requesting user(s). As discussed above (e.g., with reference to blocks 644, 646, and 648 of the method 600 of FIG. 6), even if the ACV indicates to anticipatorily multicast the content, further determinations may be made.

It will be appreciated that steps of the method 900, including generation of the ACV metric 950, may be implemented and/or exploited in different ways. For example, in certain embodiments described above, the ACV is used to determine whether or not to anticipatorily multicast the content set data to one or more users. In other embodiments, an ACV is generated at the client side of the communications system to determine whether to accept multicast data. For example, a determination may be made to anticipatorily multicast certain content set data to a particular user with or without using an ACV, but the user may still decide to effectively ignore the data (e.g., by opting not to listen to traffic associated with a particular Content Set ID, by not storing the content set data in the client dictionary, etc.).

FIG. 10 shows an illustrative flow diagram of a method 1000 for making ACV determinations from a client-side perspective, according to various embodiments. The method 1000 begins at block 1004 by receiving anticipatorily multicast content. For example, content is received by a user system 110 (e.g., by a client optimizer 120) over a communications link, where the user system 110 is associated with a non-requesting user. It is worth noting that, where the content is received in response to an actual request (i.e., not in anticipation of a possible future request), the method 1000 may not be invoked. It is also worth noting that, although not shown, the method may include pre-processing, post-processing, or otherwise handling the received data to support steps of the method 1000 subsequent to receiving the content set at block 1004.

At block 1010, a marginal cost of content metric is generated (e.g., by the cost of content generator module 824 of FIG. 8). Embodiments of block 1010 (e.g., and its related steps) may be implemented in substantially the same way as embodiments of block 910 of FIG. 9. In some embodiments, the marginal cost of content metric is generated at block 1010 by accounting for various user costs at block 1012.

In some embodiments, generating the user cost of content metric includes determining or predicting the cost to the user of locally storing the content at block 1014 (e.g., as discussed above with reference to block 814 of FIG. 9). Certain embodiments exploit local knowledge of system characteristics to determine costs associated with local storage. For example, because the method 1000 is implemented at the client side of the communications system, the determination of storage costs at block 1014 may account for access to additional storage (e.g., browser cache, application storage, CPE 260 storage, etc. that may be unknown to the server-side of the communications system).

It is worth noting that receipt and storage of certain content may generally affect receipt and/or storage of other content. For example, users may be presumed to have a predetermined storage capacity (e.g., at least for some period of time) to use for a client dictionary. The client dictionary may likely fill up, so that previously stored data blocks will have to be removed to make space for storing new data blocks. As such, the cost of storage of content may, in certain embodiments, be largely affected by the cost of displacing currently stored content.

The cost of removing currently stored content may be determined in a number of ways. For example, some embodiments determine the cost of removing the content using many of the same factors used to determine whether to have communicated the content in the first place, as described with reference to FIG. 9. Other embodiments account for how the content has been used and/or other ways in which the value of the content may have changed since it was stored. For example, the content may lose value if it is no longer fresh, if it has not been accessed ever or for a long time, if user preferences have changed, etc.

In some embodiments, generating the user cost of content metric at block 1012 includes determining or predicting costs to the user's local network at block 1016 (e.g., as in block 916 of FIG. 9). As with the determination in block 1014, the determination of costs to the user's local network at block 1016 may account for client-side knowledge about its associated local network that may be unknown to remote entities (e.g., unknown to a provider operating through the server-side of the communications system). For example, certain techniques may be used by the user system 110 to perform subnet routing, distributed caching, shared byte caching, IP spoofing, peer-to-peer file sharing, etc. Some or all of these techniques may shield certain information about the local network from the server-side of the communications system.

In other embodiments, generating the user cost of content metric at block 1012 includes determining or predicting costs to local performance at block 1020. As above, the determination of costs to performance at block 1020 may account for client-side knowledge about client-side components being used. For example, running pre-positioning routines and/or other functions described above may cause one or more components to become activated or more highly utilized (e.g., it may spin up a hard disk drive, cause a mobile device to activate its radio for receipt of the data, increase processor usage, etc.). Higher utilization of certain components may degrade system performance (e.g., tie up a processor), drain battery life, etc. As such, ACV determinations may be affected by the types of components or devices being used, the time of day, etc.

It is worth noting that certain embodiments may also account for various provider costs. However, since many provider costs have typically already been incurred by the time the data is received by the user, those costs may not have much impact on the ACV determination. As such, provider costs may be evaluated as effective limitations on benefits. For example, if anticipatorily communicated content is rejected, the content may have to be retransmitted later when an actual request is received. In some cases (e.g., where the content is expected to remain substantially static over time), retransmitting the content may reduce the efficiency of the provision of communication services. As such, rejecting the content may not cause costs to be incurred now, but may limit potential future benefits of pre-storing the content.

As described above, the user cost of content generated in block 1012 (e.g., and possibly some provider costs) are used to generate the marginal cost of content metric in block 1010. At block 1030, a marginal value of content metric is generated (e.g., by the value of content generator module 828 of FIG. 8). In some embodiments, the marginal value of content metric is generated at block 1030 by accounting for both user values at block 1032 and provider values at block 1042.

At block 1032, a user value of content metric is generated, indicating one or more benefits the user may incur if the content is accepted by the user. As in the generation of the user value of content metric in block 932 of FIG. 9, the user value of content metric may be generated in block 1032 by determining or predicting the user's willingness to pay for the content at block 1034, improvements to the user's experience from accepting the content at block 1036, any available FAP credits or other service benefits to the user from accepting the content at block 1038, and/or any other useful determination of user value. It will be appreciated that the implementation of blocks 1034, 1036, and/or 1038 may be similar to that of blocks 934, 936, and/or 938, respectively. However, additional or different information may be available for making those determinations or predictions as a result of local access to components of the user system 110 and other components of its local network.

At block 1042, a provider value of content metric is generated, indicating one or more benefits the provider may incur if the content is accepted by the non-requesting user. In some embodiments, generating the provider value of content metric includes receiving provider-level value information at block 1044. For example, metadata sent with the content may indicate advertisement revenue-related information. In some embodiments, at block 1046, generating the provider cost of content metric includes determining or predicting savings the provider may incur as a result of anticipatorily using channel capacity (e.g., bandwidth). As at block 1044, this determination (or prediction) can be implemented using local data (e.g., local monitoring of the satellite link to track certain link characteristics) and/or data received from the server-side of the communications system.

As described above, the user value of content generated in block 1032 and the provider value of content generated in block 1042 are used to generate the marginal value of content metric in block 1030. The marginal value of content metric generated in block 1030 and the marginal cost of content metric generated in block 1010 are used to generate an ACV metric (e.g., using the ACV generator module 820 of FIG. 8). In various embodiments, other factors are used to adjust the ACV metric. As with blocks 952 and 956 of FIG. 9, embodiments of the ACV metric are adjusted as a function of a probabilistic determination made at block 1052 and as a function of a content stickiness determination in block 1056, respectively. In some embodiments, the ACV metric is adjusted as a function of one or more weightings relating to subnet-related information at block 1054. For example, local information may be used to determine effects on the ACV metric of downstream routing of the content within the subnet, availability of the content in shared storage (e.g., a local distributed byte cache), statistical re-weightings based on the behavior of the subnet as a group, etc.

In the embodiment of FIG. 10, the ACV metric generated at block 1050 is positive when the value outweighs the cost and negative when the costs outweighs the value. In some embodiments, a determination is made at block 1060 of whether the ACV metric is positive. At block 1062, where the ACV metric is not positive (i.e., where the cost of anticipatorily multicasting the content to the non-requesting user outweighs the benefit), the content is rejected. Rejecting the content may be implemented in various ways according to various embodiments. For example, the content may be discarded, stored (e.g., temporarily) in a particular location (e.g., for future reference, for logging, for further analysis, for statistical processing, etc.), etc. In certain embodiments, the method 1000 is aborted or otherwise terminated at that point. At block 1064, where the ACV metric is positive (i.e., where the value of anticipatorily multicasting the content to the non-requesting user outweighs the cost), the content may be accepted by the non-requesting user. For example, the non-requesting user may store the content in the client dictionary, opt to effectively subscribe to all data carrying the associated Content Stream ID, etc.

It will be appreciated that various types of ACV are possible, and different types of ACV can be made according to some or all of the factors discussed above with reference to FIGS. 9 and 10. Moreover, some of the ACV factors may depend on the type of content set being considered and on the availability of descriptive information for characterizing the content set. For example, when a user requests a webpage by clicking on a link through a web portal, the webpage may be identified as a content set and evaluated according to an ACV to determine whether the content set should be multicast to other non-requesting users along with the requesting user. As a transparent man-in-the-middle, embodiments of the server optimizer 130 may have limited access to descriptive information. For example, the server optimizer 130 may have no object-level descriptive information and limited set-level descriptive information. While certain ACV factors may be evaluated without that type of information (e.g., channel capacity may be evaluated without any object-level or set-level awareness of the content), other ACV factors may be difficult or impossible to evaluate.

Figure 11A:
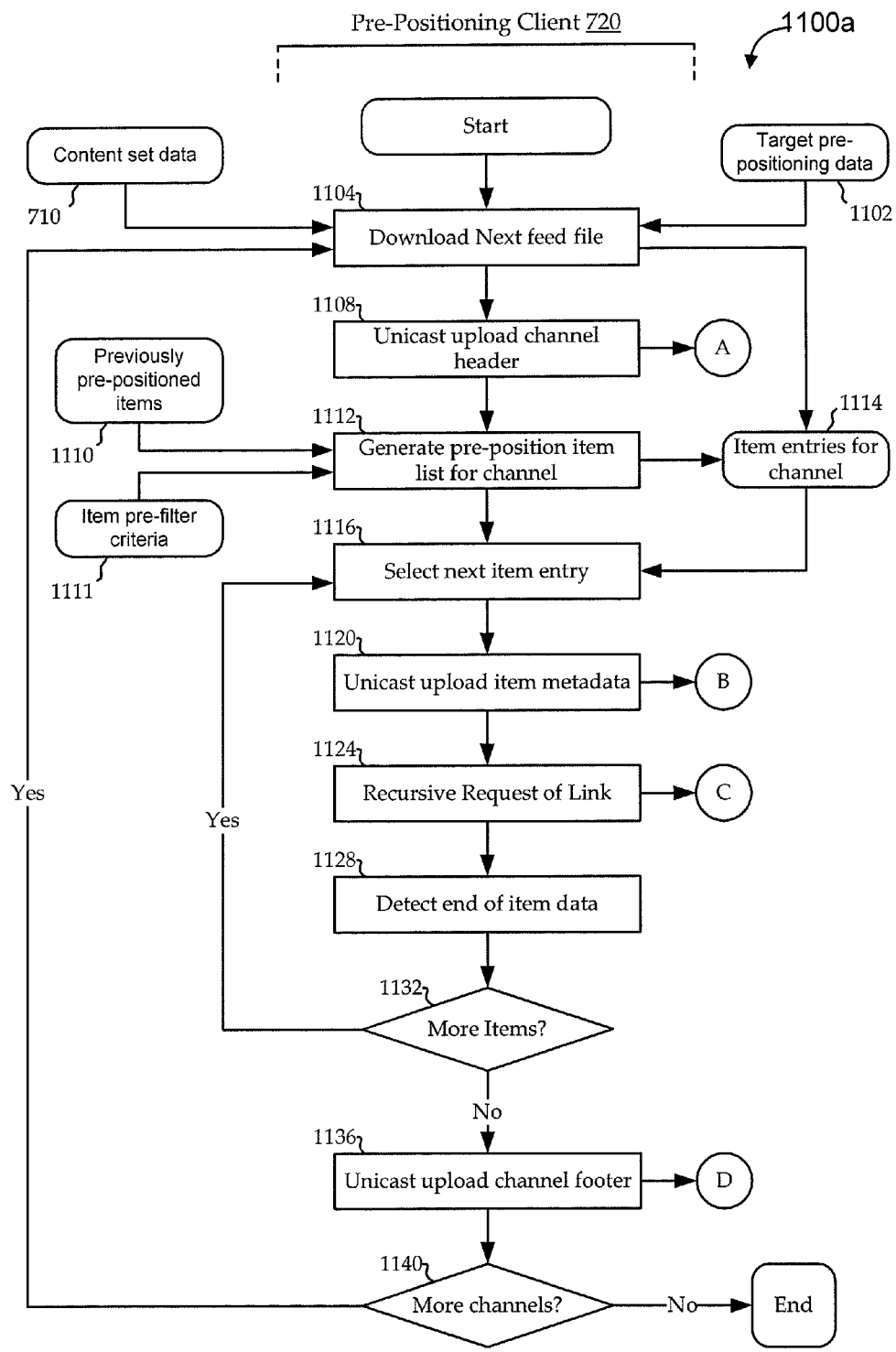
FIGS. 11A and 11B show a flow diagram of a method for feed-based pre-positioning, according to various embodiments.
Figure 11B:
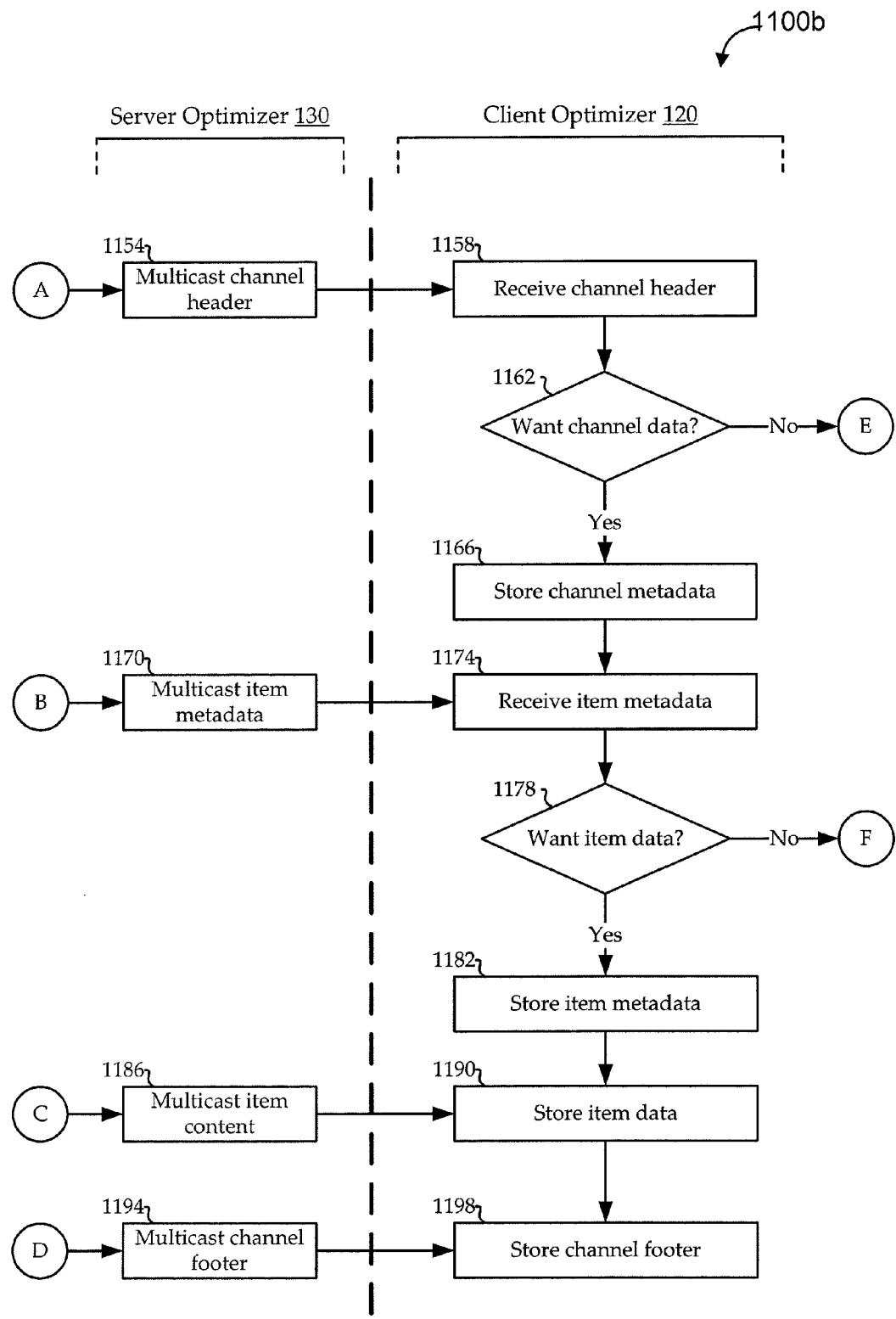

Some other types of content sets, however, may provide additional levels of descriptive information for the content set. For example, various types of feeds include specific organizational formats with specific types of associated metadata. FIGS. 11A and 11B show a flow diagram of a method 1100 for feed-based pre-positioning, according to various embodiments. For the sake of clarity, the method 1100 is described with reference to the communications systems 700 of FIG. 7A or 7B, and may assume certain pre-positioning functionality described with reference to FIGS. 8-10. For example, portions of the method 1100a shown in FIG. 11A may be implemented by the pre-positioning client 720, and portions of the method 1100b shown in FIG. 11B may be implemented by the server optimizer 130 or the client optimizer 120, as indicated in the respective figures. The feeds used as content sets in FIGS. 11A and 11B are assumed to have a structure similar to that of an RSS feed. In particular, the content set data 710 is assumed to have a certain data structure, including one or more channels, each including one or more items, each of the channels and items being characterized by a set of channel metadata and item metadata, respectively.

Channel metadata may include any useful information for characterizing the channel, like a channel title (e.g., "News.com Headlines"), a link (e.g., to a URL pointing to a website associated with the channel (e.g., "http://www.news.com/"), and/or a description of the channel (e.g., "Today's headlines from around the world, brought to you by News.com."). Additional or alternate types of channel metadata may include the language the channel is written in, a copyright notice, email addresses (e.g., for managing editors, web masters, etc.), a publication date for channel content, a timestamp for the last time the channel was changed, a category into which the channel belongs, information on the program used to generate the channel, documentation for the content set file format, "time to live" information indicating how long to store channel data before refreshing, images (e.g., a thumbnail logo image for the channel), ratings, etc. Similarly, item metadata may include any useful information for characterizing each item, like an item title (e.g., "Stocks Rise 4% in After-Hours Trading"), a link to the item (e.g., a URL, like "http://www.news.com/headlines/afterhourstrading.html"), a description or synopsis of the item, an author and/or publisher of the item (e.g., and/or an email), a category for the item, comments relating to the item, descriptions of enclosures and/or other media objects attached to or associated with the item, a unique item identification string, a publication timestamp, a source of the item (e.g., an associated channel from which the item was received), etc. It will be appreciated that any useful types of channel or item metadata can be included without departing from embodiments of the invention. Further, those of skill in the art will appreciate that other data structures may be used without departing from the scope of the embodiments.

It is worth noting that method 1100a and method 1100b are described as one method 1100 to provide a system-level view of the method 1100 for the sake of clarity. It is further worth noting that method 1100 steps that refer to communications between the server optimizer 130 and the client optimizer 120 may be implemented as communications over the client-server communication link 125. Method 1100 steps that refer to communications between the server optimizer 130 and the pre-positioning client 720 may be implemented as direct communications on the server-side of the communications system 700 (e.g., as illustrated in FIG. 7A), or as communications over the client-server communication link 125 (e.g., as illustrated in FIG. 7B).

Embodiments of the method 1100 begin at block 1104 by downloading the next feed file (e.g., an RSS file). For example, the pre-positioning client 720 receives content set data 710 from one or more content servers 150 (e.g., over the network 140), including channel metadata, item metadata, and item content data. As discussed above, the next feed file may be downloaded at block 1104 as a result of one or more different types of triggering events. For example, the pre-positioning client 720 may be configured to run a periodic pre-positioning routine, during which feed files are downloaded from content servers for pre-positioning.

In some embodiments, the pre-positioning client 720 also receives target pre-positioning data 1102. The target pre-positioning data 1102 may be determined according to ACV factors, and, in certain embodiments, as part of the ACV determination (e.g., of FIGS. 9 and 10). Embodiments of the target pre-positioning data 1102 may indicate to the pre-positioning client 720 various parameters affecting how much content set data 710 should be pre-positioned, and/or where and when to pre-position content set data 710 over the communications system 700. For example, the target pre-positioning data 1102 may include data on link conditions (e.g., when more effective bandwidth is available, more data can be pre-positioned), the number of users connected to the communications system 700, the number of pre-positioning clients 720 available for pre-positioning, etc. In certain embodiments, the target pre-positioning data 1102 may be further affected by numbers and types of subscriptions, payment by content providers, etc. It will be appreciated that the downloading in 1104 may effectively include a decision block (not shown) for determining whether more content set data 710 should be downloaded and/or prepared for pre-positioning by the pre-positioning client 720 according to the target pre-positioning data 1102.

At block 1108, the channel header is uploaded to the communications system 700 for pre-positioning. For example, as discussed above with respect to fingerprint generation, data packets traversing the communications system 700 include header-portion data and content-portion data. As used herein, the header-portion data includes metadata and other non-content data in headers, footers, and/or other portions of the datagrams. As also discussed above, header-portion data in the context of the content set data 710 includes channel and item metadata. While the channel metadata can be communicated in any useful way, there may typically be channel metadata that can be considered the "channel header" and other channel metadata that can be considered the "channel footer." For example, the channel header may include all the channel metadata that is useful for characterizing the channel, including some or all of the types of channel metadata discussed above. The channel footer may typically include data indicating the end of the channel feed and/or any other related information.

In some embodiments, the pre-positioning client 720 unicasts the channel header to the server optimizer 130 (e.g., the pre-positioning client 720 has a private unicast channel, like a persistent private IP channel, with the server optimizer 130) in block 1108. Turning to FIG. 11B (via reference block "A"), at block 1154, the server optimizer 130 receives the unicast channel header and multicasts the channel header to the client optimizers 120. At block 1158, the client optimizer 120 receives the channel header. The client optimizer 120 may then determine, at block 1162, whether data from that channel is desired. For example, subscription data 730 is used by the feed processor 740 in the client optimizer 120 to determine whether this is a channel in which the user system 110 is interested.

If this is not a channel of interest (e.g., this is not a channel to which the user system 110 has subscribed), the method 1100 may terminate. For example, this may indicate that the user system 110 is not interested in this feed, and it may be inefficient to process or store the channel metadata, to further determine whether there is interest in any particular items of the feed, etc. In some embodiments, after determining that the channel data is not wanted by the user system 110 associated with the client optimizer 120 at block 1162, the method 1100 returns to block 1104 to wait for the next feed.

In certain embodiments, many pre-positioning clients 720 run in parallel and the multicast channel headers are received and evaluated (e.g., block 1158 and block 1162 will be performed) by many client optimizers 120. As such, certain blocks of the method 1100 represent multiple occurrences of the block (e.g., parallel, asynchronous) in one or more locations of the communications system 700. For example, when the method 1100 is described as returning to block 1104 after determining that the channel is not of interest in block 1162, this description may be from the perspective of a single client optimizer 120 and/or pre-positioning client 720. In fact, thousands of other client optimizers 120 may be at one or more stages of the method 1100 (e.g., performing the determination in block 1162, receiving an entirely different feed from a different pre-positioning client 720, etc.). These types of embodiments may be particularly useful where the pre-positioning client 720 is running an automatic (e.g., periodic) pre-positioning routine to push a large amount of content from a large number of content sources to a large number of users.

If a determination is made at block 1162 that the channel data is desired by the client optimizer 120, the channel header (e.g., some or all of the channel metadata) may be processed and/or stored at block 1166. The channel metadata may be stored locally at the user system 110. In some embodiments, the channel metadata may be processed for use by the portal viewer 750. For example, the channel metadata may be used to update a channel title, logo, "last updated" date, etc. on the portal viewer 750.

Returning to FIG. 11A, at block 1112, an item list for the channel is generated. In some embodiments, feeds are provided at a level that is desirable to end users, such that users subscribed to the channel will likely be interested in most or all of the items provided on the channel. For example, enough feeds (or an appropriate selection of feeds) may be provided so that a NASCAR aficionado can subscribe to a feed that is specifically geared toward NASCAR aficionados. In these embodiments, it may be undesirable or unnecessary to pre-filter channel items.

In other embodiments, it may be desirable for various reasons to pre-filter which items on which channels are made available according to item pre-filter criteria 1111. In one example, the pre-positioning client 720 has access to a general feed from a content provider 150 for all world news headlines, and the pre-positioning client 720 pre-filters the feed to generate sub-channels (e.g., to help support filtering by client optimizers, as described more fully below). In another example, the pre-positioning client 720 receives sports highlight video feeds from a number of sources and acts as a sort of clearinghouse for the highlight videos. The pre-positioning client 720 may cull the videos to filter out similar videos (e.g., there may be twenty different highlight reels for the same football game, all having much of the same footage, but from slightly different angles, in different video formats, etc.). In still other embodiments, item pre-filter criteria 1111 can be used to identify and filter content flagged as violating copyrights, privacy policies, end user agreements, service level agreements, etc. In yet other embodiments, item pre-filter criteria 1111 may be used to include only (or to prioritize by) the most popular items in the channel (e.g., according to ratings in the metadata, hit rates, etc.).

As discussed above, the feed (e.g., channel) includes a number of items, each characterized by item metadata and including item content (e.g., a media file). An item entries list 1114 for the channel may be received as part of the feed download in block 1104, and, in some embodiments, modified according to the item pre-filter criteria 1111. In certain embodiments, the item entries list 1114 may be further culled according to previously pre-positioned items 1110. The previously pre-positioned items 1110 may include any items that have already been pre-positioned either from a previously processed feed or at a previous time.

In one example, a user-generated channel includes "John and Sally's Favorite Viral Videos of the Week," and a content-provider-generated video includes the "Top 50 Web Videos of the Day." In some cases, one of "John and Sally's Favorite Viral Videos of the Week" also happens to be one of the "Top 50 Web Videos of the Day," such that those common items overlap among the channels. When the pre-positioning client 720 analyzes the item entries list 1114 for "John and Sally's Favorite Viral Videos of the Week," it may recognize that one or more of the items were already pre-positioned with the "Top 50 Web Videos of the Day" channel and is in the previously pre-positioned items 1110 list. In another example, forty-eight of the fifty items on the "Top 50 Web Videos of the Day" channel are unchanged from the previous day. Those forty-eight videos may already have been pre-positioned the previous day and may, therefore, be in the list of previously pre-positioned items 1110.

It is worth noting that, where many pre-positioning clients 720 are running on the communications system 700 (e.g., in parallel), it may be desirable for components of the system to maintain a master list of the previously pre-positioned items 1110 from all the different pre-positioning clients 720. This master list may be maintained by one or more of the pre-positioning clients 720 (e.g., using a synchronization routine), by the server optimizer 130, or in any other useful location. It is further worth noting that, in some cases, it may still be desirable to pre-position items, even when they are on the list of previously pre-positioned items 1110. For example, if previously pre-positioned items 1110 have become stale after some time, if client optimizers 120 are unavailable at certain times (e.g., in some embodiments, if a user system 110 is turned off or disconnected from the Internet), and/or in other cases, it may be desirable to re-pre-position one or more of the items.

When the item entries list 1114 has been generated at block 1112, the method 1100 may continue by selecting the next item in the item entries list 1114 at block 1116. At block 1120, item metadata for the item is uploaded. In some embodiments, the item metadata is uploaded as a unicast communication from the pre-positioning client 720 to the server optimizer 130. Turning again to FIG. 11B (via reference block "B"), at block 1170, the server optimizer 130 receives the unicast item metadata and multicasts the item metadata to the client optimizers 120. At block 1174, the client optimizers 120 receive the item metadata. The client optimizers 120 may then determine, at block 1178, whether the item is desired by the respective user system 110 (e.g., according to subscription data 730 as processed by the feed processor 740 in the client optimizer 120).

It will be appreciated that the determination at block 1178 may assess a number of types of factors. One type of factor may include various types of post-filters (e.g., at the client side of the communications system 700). In one illustrative embodiment, users (e.g., through the portal viewer 750) select or create filters to apply to items coming from some or all of the feeds. For example, a user may subscribe to the "World News" channel, then filter (e.g., only accept, prioritize according to, etc.) items relating to Europe (e.g., as determined by the item metadata).

Another type of factor may include dictionary bins sizing or prioritization. In one embodiment, users allocate bins for each channel or for certain types of items in the channel. The bins may be associated with size (e.g., only accept the first hundred Megabytes of items on this channel each day), time to live (e.g., only keep items from this channel in the client dictionary bin for three hours), priority (e.g., only accept additional items on this channel if they are newer (or more popular, etc.) than the items already in the dictionary, etc. Of course, any other useful types of factors are possible according to various embodiments.

Similar to what was described with reference to decision block 1162, if a determination is made at block 1178 that the item data is not desired, the method 1100 may either terminate or wait for the next item (e.g., return to block 1116). If a determination is made at block 1178 that the item data is desired, the method 1100 may proceed with storing and/or processing the item metadata at block 1182. The item metadata may be stored locally at the user system 110. In some embodiments, the item metadata may be processed for use by the portal viewer 750. For example, the item metadata may be used to update an item title, description, thumbnail image, "last updated" date, etc. on the portal viewer 750.

Further, if a determination is made at block 1178 that the item data is desired, the method 1100 may continue with retrieving that actual data associated with the item. It will be appreciated that an item may be comprised of a number of links. For example, in an RSS feed, accessing an item from a channel may take a user to a webpage with an embedded media player. The webpage may include text, advertisement banners, other embedded objects, etc. The media player may play a video advertisement, followed by the actual video file of interest. In this and other examples, it will be appreciated that the item may include more than just a single media file of interest.

Some typical RSS readers attempt to parse URLs to identify the content portion of the feed. However, as discussed above with reference to deltacasting techniques, the pre-positioning client 720 (e.g., as part of a transparent optimizer tunnel 105) may have little or no content awareness beyond the channel and item metadata. For example, while the pre-positioning client 720 may know that a client optimizer 120 wants a particular item according to its metadata description or title, the pre-positioning client 720 may be wholly unaware of which part of the large stream of item data includes the actual item content of interest.

Returning again to FIG. 11A, embodiments recursively request item links at block 1124 until the end of the item data is detected at block 1128. In some embodiments, all the recursively requested linked item data is agnostically downloaded, and the end of the item data is detected at block 1128 when no further data remains. In other embodiments, the end of the item data is detected at block 1128 in other ways. In one embodiment, a time threshold is established, such that the end of the item data is detected at block 1128 when no data is downloaded for some time duration. For example, where a linked webpage has a periodically refreshed advertisement banner, the data may never completely end. However, detection of a break in the data may indicate that the large content file intended for pre-positioning has most likely been downloaded (e.g., any additional data is most likely additional advertisements). In another embodiment, the method 1100 watches for a relatively large item to be downloaded and assumes that the large item is the item content intended for pre-positioning. These and/or other techniques may be used so that the end of the item data is detected at block 1128 in an efficient data location (e.g., where pre-positioning will have a significant impact on the system efficiency).

Of course, as the item data is downloaded at block 1124, the item metadata may be uploaded. In some embodiments, the item metadata is uploaded as a unicast communication from the pre-positioning client 720 to the server optimizer 130. Turning again to FIG. 11B (via reference block "C"), at block 1186, the server optimizer 130 receives the unicast item content data and multicasts the item content data to the client optimizers 120. At block 1190, the client optimizers 120 receive, process, and/or store the item content data. For example, the item content data may be stored locally at the user system 110.

Notably, embodiments use deltacast techniques to multicast the item content data to the client optimizers 120 at block 1186. For example, as described above, some or all of the item content data is substantially agnostically multicast to the client optimizers 120, where the data is added to the client's delta dictionary (e.g., delta dictionary 435 of FIG. 5). In some embodiments, the proxy (e.g., the client optimizer 120 and/or the server optimizer 130) knows nothing about the byte sequence that is ultimately added to the delta dictionary. In other embodiments, the proxy has minimal awareness, for example, of a relationship between the byte sequence and the item and/or channel (e.g., and respective metadata). Further, pursuant to certain deltacasting techniques, the multicast data may be compressed in one or more ways for communication over the client-server communication link 125.

For example, in a typical deltacasting embodiment, the server optimizer 130 receives byte sequences from the network 140 and generates fingerprints. According to some feed-based embodiments, the server optimizer 130 is made aware of actions of each pre-positioning client 720. When a byte sequence is received at the server optimizer 130 as part of a session, the server optimizer 130 may know that the session resulted in a request from the pre-positioning client 720 for a particular feed item, and may be able to associate it accordingly.

Returning yet again to FIG. 11A, embodiments determine whether any more items are in the item entries list 1114 for the channel at block 1132. If items remain for pre-positioning according to the item entries list 1114, the method 1100 may return to block 1116 and select the next item in the item entries list 1114. In some embodiments, if no further items remain in the item entries list 1114 for the channel, the channel footer is uploaded at block 1136. As discussed above, the channel footer may include an actual footer in the data structure for the feed, or the channel footer may include some other designation of the end of the channel data. In some embodiments, the channel footer is uploaded as a unicast communication from the pre-positioning client 720 to the server optimizer 130. Turning yet again to FIG. 11B (via reference block "D"), at block 1194, the server optimizer 130 receives the channel footer and multicasts the channel footer to the client optimizers 120. At block 1198, the client optimizers 120 receive, process, and/or store the channel footer.

In some embodiments, the method 1100 continues at block 1140 of FIG. 11A by determining whether more channels are queued for pre-positioning. For example, certain embodiments of the pre-positioning client 720 constantly cycle through the channels repeatedly (e.g., or completely or partially in parallel). Other embodiments of the pre-positioning client 720 perform the method 1100 periodically. For example, the pre-positioning client 720 may update all the channel pre-positioning every hour, according to channel metadata (e.g., where the metadata defines a refresh schedule), according to a schedule defined at the server optimizer 130, according to a particular time of day (e.g., during a two-hour window at night when links of the communications system 700 are under-subscribed), etc. Accordingly, if no more channels are queued for pre-positioning, the method 1100 may either end or start over at the beginning of the channel list. If channels remain, the method 1100 may return to block 1104 for downloading of the next feed file.

It will be appreciated that, in communications systems (e.g., communications system 700) implementing feed-based deltacasting techniques (e.g., embodiments of the method 1100), delta dictionaries at the various user systems 110 may include pre-positioned feed data 710. The pre-positioned content set data 710 may be exploited by the communications system 700 in various ways according to embodiments of the invention.

In one set of embodiments, the pre-positioned content set data 710 in the delta dictionaries is exploited in the ways described above with reference to general deltacasting. As discussed with reference to the method 600 of FIG. 6, data is received at a server optimizer and, assuming the data is determined to be a multicast candidate, fingerprints are generated. In one embodiment, the data is received in response to a request from a user system 110. The fingerprints may be analyzed to determine, at the byte sequence level, whether the response data is already stored at the requesting user system 110 (e.g., in the respective client delta dictionary). If so, a highly compressed version of the response data may be communicated to the requesting user system 110.

In this way, storing content set data 710 by embodiments of the method 1100 of FIG. 11 may effectively help populate delta dictionaries for use in general deltacasting determinations. Notably, certain feeds may represent data that is more likely to be requested by users. For example, if the feed is intended to include popular videos on the web, it may inherently include popular downloads. Similarly, use of the portal viewer 750 may provide a kind of "walled garden" effect, guiding users to more commonly request certain items that are included in certain feeds. As such, populating the delta dictionaries with content set data 710 may effectively increase the probability that requested data will have been stored at the requester's user system 110 as a result of pre-positioning (e.g., particularly since users that are more likely to request a particular web object may also be more likely to subscribe to feeds that point to that object).

In another set of embodiments, the stored content set data 710 in the delta dictionaries is exploited through the portal viewer 750. When a user accesses the portal viewer (e.g., through a web browser, a desktop application, etc.), the user may be presented with a set of items categorized by channels. In some embodiments, when the user selects one of the items, a request is issued to the Internet and processed according to general deltacasting techniques (e.g., according to the method 600 of FIG. 6). For example, clicking on a link to an item in a feed may still direct the user to an associated webpage, where certain byte sequences are determined to represent objects that are not multicast candidates (e.g., which may then be unicast to the requester), other byte sequences are determined not to match blocks in the client delta dictionary (e.g., associated objects have changed since the pre-positioning and are unicast to the requester or multicast according to whether a multicast opportunity is identified and exploited), and still other byte sequences are determined to match blocks in the client delta dictionary (e.g., associated objects were pre-positioned and a highly compressed version can be unicast to the requester).

As discussed above, some optimizations of the communications system (e.g., those resulting from deltacasting techniques) can be magnified by the "walled garden" effect of the portal viewer 750. Of course the portal viewer 750 may only be a partially walled garden, in that users may be implicitly or explicitly guided toward certain content while still having full access to other content. For example, bandwidth savings resulting from deltacasting may relate to how often a requested object is found already to be locally stored at the requester's delta dictionary, and the probability that a requested object will be found already to be locally stored at the requester's delta dictionary may be increased by guiding users to make requests from among a smaller subset of objects. Embodiments of the portal viewer 750 can be used to guide users to a smaller subset of objects.

In one embodiment of the portal viewer 750, a convenient layout and/or a substantially customized content list resulting from feed-based techniques may implicitly encourage users toward the associated subset of feed data 710. Other implicit and/or explicit techniques may also be used. For example, locally stored content in the delta dictionary may be indicated in some way by the portal viewer 750. In one embodiment, the portal viewer 750 is associated with a web search application (e.g., as an application running in the background of a standard web browser, as a stand-alone search application, etc.) and may be configured to prioritize or highlight (e.g., change the color of, flag, separate out, etc.) search results that point to locally stored content. In another embodiment, pre-positioned content is priced differently (e.g., accessing pre-positioned content costs less money, results in a smaller hit to a user's FAP, etc.), and the portal viewer 750 is configured to indicate the pricing to the user.

It is worth noting that additional techniques may be used to further optimize pre-positioning functionality. For example, user systems 110 are likely to fail to receive at least some packets multicast to them as part of an anticipatory pre-positioning of content. Typically, various protocols may be used to retransmit missing (e.g., dropped) packets. However, when the packets are sent purely anticipatorily (i.e., without any explicit request from the user), it may be inefficient to use additional system resources to retransmit missing packets to those non-requesting users.

In some embodiments, a novel transport protocol is provided to track which user systems 110 are actually requesting particular content (i.e., rather than being sent content anticipatorily), and to retransmit only to those user systems 110. In certain embodiments, missing packets are retransmitted to other (e.g., non-requesting) user systems 110 only when those user systems 110 actually request the content. In other embodiments, missing packets may be retransmitted to other (e.g., non-requesting) user systems 110 when opportunities arise for multicasting the missing packets efficiently (e.g., when a request is received by another user, packets are retransmitted to those users that dropped the packets during the previous transmission).

In one embodiment, the user that originally requests the content issues requests for retransmission of any packets that were not successfully retrieved. Each packet is uniquely identified using a fileID and packetID. The same fileID and packetID are used for all retransmissions, so that once a user has a valid copy of the packet, it can ignore subsequent retransmitted copies. Users that are anticipatorily storing the content (for possible, but not certain, future use) may store copies of some or all packets that are successfully received. The stored packets may include original transmissions and/or any retransmissions. If a user subsequently requests the content (e.g., which could be several hours or days later), it may upload a request for any packets that are missing (e.g., from its client dictionary). In certain embodiments, some or all of the retransmits are multicast, so that any other users listening to the multicast can download the retransmitted packets, if needed. Some embodiments of the transport protocol include deterministic packetization techniques for handling use of packet numbers, rather than file offsets and lengths. For example, a deterministic packetization algorithm may be provided to ensure that a request for "packet 171" always refers to the same byte range.

The above description is intended to provide various embodiments of the invention, but does not represent an exhaustive list of all embodiments. For example, those of skill in the art will appreciate that various modifications are available within the scope of the invention. Further, while the disclosure includes various sections and headings, the sections and headings are not intended to limit the scope of any embodiment of the invention. Rather, disclosure presented under one heading may inform disclosure presented under a different heading. For example, descriptions of embodiments of method steps for handling overlapping content requests may be used to inform embodiments of methods for handling anticipatory requests.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments. Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps and means.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. Similarly, terms like "cache" are intended to broadly include any type of storage, including temporary or persistent storage, queues (e.g., FIFO, LIFO, etc.), buffers (e.g., circular, etc.), etc. The term "machine-readable medium" includes, but is not limited to, portable or fixed storage devices, optical storage devices, wireless channels, and/or various other storage mediums capable of storing that contain or carry instruction(s) and/or data.

Further, certain portions of embodiments (e.g., method steps) are described as being implemented "as a function of" other portions of embodiments. This and similar phraseologies, as used herein, intend broadly to include any technique for determining one element partially or completely according to another element. For example, a method may include generating a fingerprint from a first request and generating a determination "as a function of" the fingerprint. In various embodiments, the determination may be made in any way, so long as the outcome of the determination generation step is at least partially dependant on the outcome of the fingerprint generation step.

While the principles of the disclosure have been described above in connection with specific apparatuses and methods, it is to be clearly understood that this description is made only by way of example and not as limitation on the scope of the disclosure.

What is claimed is:

1. A method for pre-positioning content over a communications system having a communications path between a server side of the communications system and a plurality of clients, the communications path comprising a shared forward link over which bandwidth resources are shared during a multicast communication, the method comprising:

intercepting a data block at the server side of the communications system, the data block comprising a header portion and a content portion and being communicated as part of a content set over the communications path, the content set comprising a plurality of content objects and being identified by a content set identifier, the content set identifier being associated with a set-level profile characterizing the content set;

associating the data block with the content set identifier;

generating a fingerprint using byte-level information comprised by the content portion of the data block;

generating an anticipatory content value (ACV) metric at least partially according to the set-level profile associated with the content set identifier by estimating a future compression gain achieved by pre-positioning the content set in anticipation of estimated future requests for the content set as a function of a percentage of the content set anticipated to change in relation to the estimated future requests for the content set, the future compression gain being estimated according to the set-level profile associated with the content set identifier, such that the ACV metric is functionally related to the future compression gain;

determining whether to anticipatorily pre-position the content set over the communications path according to the ACV metric; and when it is determined to anticipatorily pre-position the content set over the communications path according to the ACV metric, determining whether to multicast the data block over the communications path to a client of the plurality of clients according to the fingerprint.

2. The method of claim 1, wherein generating the ACV metric further comprises:
estimating the estimated future requests anticipated for the content set;
estimating a cost of downloading the content set as pre-positioned content over the communications path in relation to the estimated future requests for the content set; and
estimating the percentage of the content set anticipated to change in relation to the estimated future requests for the content set,
such that the future compression gain is functionally related to the estimated number of future requests anticipated for the content set divided by the estimated cost of downloading the content set and the estimated percentage of the content set anticipated to change.

3. The method of claim 1, wherein generating the ACV metric comprises:
generating a cost of content metric indicating an anticipated cost resulting from pre-positioning the content set prior to a request for the content set;
generating a value of content metric indicating an anticipated benefit resulting from pre-positioning the content set prior to a request for the content set; and
performing a cost-benefit analysis according to the cost of content metric and the value of content metric,
wherein at least one of the cost of content metric or the value of content metric is generated according to the set-level profile associated with the content set identifier.

4. The method of claim 1, further comprising: when it is determined to multicast the data block: multicasting the data block over the communications path; and using the content set identifier to determine whether the client of the plurality of clients accepts the data block multicast over the communications path.

5. The method of claim 4, wherein using the content set identifier to determine whether the client of the plurality of clients accepts the data block multicast over the communications path comprises:
determining, at the server side of the communications system, whether to include the client of the plurality of clients in a multicast group,
wherein the data block is multicast over the communications path according to the multicast group.

6. The method of claim 5, further comprising:
detecting a link condition affecting communications over the communications path with at least a portion of the multicast group; and
selecting a modcode as a function of the link condition,
wherein the data block is multicast over the communications path further according to the modcode.

7. The method of claim 4, wherein using the content set identifier to determine whether the client of the plurality of clients accepts the data block multicast over the communications path comprises:
determining, at the client of the plurality of clients, whether to locally store the data block according to the content set identifier.

8. The method of claim 1, wherein the set-level profile comprises set-level metadata.

9. The method of claim 1, wherein:
the communications system has a first communications path comprising a first shared forward link over which bandwidth resources are shared during a multicast communication between the server side of the communications system and a first set of clients and a second communications path comprising a second shared forward link over which bandwidth resources are shared during a multicast communication between the server side of the communications system and a second set of clients;
the data block is intercepted in response to a request for the content set by one of the first set of clients; and
the determining whether to anticipatorily pre-position the content set comprises determining whether to anticipatorily pre-position the content set over the second communications path according to the ACV metric.

10. The method of claim 1, wherein the content set identified by the content set identifier dynamically changes along with changes to the content objects comprised by the content set.

11. The method of claim 1, wherein determining whether to multicast the data block over the communications path to the client of the plurality of clients according to the fingerprint comprises:
using the fingerprint to determine whether the data block matches byte-level information being communicated to another client of the plurality of clients over the communications path via an active session stream.

12. The method of claim 1, wherein determining whether to multicast the data block over the communications path to the client of the plurality of clients according to the fingerprint comprises:
using the fingerprint to determine whether the traffic is currently stored in the client of the plurality of clients dictionary configured to store data local to the client of the plurality of clients.

13. The method of claim 1, further comprising:
downloading the content set by recursively requesting downloads of the plurality of content objects comprised by the content set,
wherein the intercepting the data block occurs while downloading the content set.

14. The method of claim 1, wherein the content set comprises a content feed or a webpage 15. A server system for multicasting over a communications system having a communications path between a server side of the communications system and a plurality of clients, the communications path comprising a shared forward link over which bandwidth resources are shared during a multicast communication, the server system comprising:
an optimizer module, stored in a memory at the server side of the communications system, the optimizer module, when executed, causing a processor to:
intercept a data block comprising a header portion and a content portion, the data block being communicated as part of a content set over the communications path, the content set comprising a plurality of content objects and being identified by a content set identifier, the content set identifier being associated with a set-level profile characterizing the content set;
associate the data block with the content set identifier; and
generate a fingerprint using byte-level information comprised by the content portion of the data block;
an anticipatory content value (ACV) generator module, stored in the memory, communicatively coupled with the optimizer module, the ACV generator module, when executed, causing the processor to:
generate an ACV metric at least partially according to the set-level profile associated with the content set identifier by estimating a future compression gain achieved by pre-positioning the content set in anticipation of estimated future requests for the content set as a function of a percentage of the content set anticipated to change in relation to the estimated future requests for the content set, the future compression gain being estimated according to the set-level profile associated with the content set identifier, such that the ACV metric is functionally related to the future compression gain; and a pre-positioning module, stored in the memory, communicatively coupled with the ACV module, the pre-positioning module, when executed, causing the processor to:

determine whether to anticipatorily pre-position the content set over the communications path according to the ACV metric; and when it is determined to anticipatorily pre-position the content set over the communications path according to the ACV metric, determines whether to multicast the data block over the communications path to a client of the plurality of clients according to the fingerprint.

16. The server system of claim 15, wherein the ACV generator module is further configured to:

generate a cost of content metric indicating an anticipated cost resulting from pre-positioning the content set prior to a request for the content set;

generate a value of content metric indicating an anticipated benefit resulting from pre-positioning the content set prior to a request for the content set; and perform a cost-benefit analysis according to the cost of content metric and the value of content metric, wherein at least one of the cost of content metric or the value of content metric is generated according to the set-level profile associated with the content set identifier.

17. The server system of claim 15, wherein the pre-positioning module is further configured to:

multicast the data block over the communications path when it is determined to multicast the data block; and use the content set identifier to determine whether the client of the plurality of clients accepts the data block multicast over the communications path.

18. The server system of claim 15, wherein the ACV generator module is further configured to:

estimate the estimated future requests anticipated for the content set;

estimate a cost of downloading the content set as pre-positioned content over the communications path in relation to the estimated future requests for the content set; and estimate the percentage of the content set anticipated to change in relation to the estimated future requests for the content set, such that the future compression gain is functionally related to the estimated number of future requests anticipated for the content set divided by the estimated cost of downloading the content set and the estimated percentage of the content set anticipated to change.

* * * * *